US012632363B2

(12) United States Patent
Chau et al.

(10) Patent No.: US 12,632,363 B2
(45) Date of Patent: May 19, 2026

(54) DYNAMIC MULTI-STAGE QUALIFICATION ANALYSIS FOR MULTIPLE PROGRAMS

(71) Applicant: Synchrony Bank, Stamford, CT (US)

(72) Inventors: David Chau, Stamford, CT (US); Julia Shen, Stamford, CT (US); Xuhui Li, Stamford, CT (US); Syed Kamran, Stamford, CT (US); Nayan Sharma, Stamford, CT (US); Richard Carrasco, Stamford, CT (US); Satish Kumar Reddy Baradi, Stamford, CT (US); Manoj Chavali, Stamford, CT (US); SurendraNag Mandalaneni, Stamford, CT (US); William Kievit, Stamford, CT (US); Jake Miller, Stamford, CT (US); Joseph Gauthier, Stamford, CT (US); Natalie Bayer, Stamford, CT (US); Florin Arghirescu, Stamford, CT (US); Seamus Sullivan, Stamford, CT (US); Sarath Vadakapurapu, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 0 days.

(21) Appl. No.: 19/045,999

(22) Filed: Feb. 5, 2025

(65) Prior Publication Data

US 2025/0291702 A1      Sep. 18, 2025

Related U.S. Application Data

(60) Provisional application No. 63/564,163, filed on Mar. 12, 2024.

(51) Int. Cl.
*G06N 20/00* (2019.01)
*G06F 11/3604* (2025.01)
(Continued)

(52) U.S. Cl.
CPC ......... *G06F 11/3604* (2013.01); *G06N 20/00* (2019.01); *G06Q 30/0185* (2013.01);
(Continued)

(58) Field of Classification Search
CPC ............... G06F 11/3604; G06N 20/00; G06Q 30/0185; G06Q 30/0621; G06Q 30/0631; G06Q 40/03
See application file for complete search history.

(56) References Cited

U.S. PATENT DOCUMENTS

| | | | |
|---|---|---|---|
| 8,626,587 B2 | 1/2014 | Kandanala et al. | |
| 10,671,749 B2 | 6/2020 | Felice-Steele | |
| (Continued) | | | |

FOREIGN PATENT DOCUMENTS

| | | |
|---|---|---|
| CN | 111222993 A1 | 6/2020 |
| WO | 2021263195 A1 | 12/2021 |
| (Continued) | | |

OTHER PUBLICATIONS

Office Action mailed Jul. 23, 2025 in U.S. Appl. No. 19/046,103.
(Continued)

*Primary Examiner* — Ziaul A Chowdhury
(74) *Attorney, Agent, or Firm* — Polsinelli LLP

(57) ABSTRACT

Systems and methods are described for analyzing user data, for instance for eligibility of a user for one or more programs. The user data is analyzed in two or more stages, with each stage including rules and/or program qualification criteria specific to that stage. In some examples, the systems and methods used trained machine learning models for at least one stage of the analysis. The systems and methods disclose identifying one or more programs that the user is eligible for, and in some cases, applying the one or more programs to the user's account.

30 Claims, 17 Drawing Sheets

(51) Int. Cl.
    *G06Q 30/018*      (2023.01)
    *G06Q 30/0601*    (2023.01)
    *G06Q 40/03*      (2023.01)

(52) U.S. Cl.
    CPC ..... *G06Q 30/0621* (2013.01); *G06Q 30/0631*
           (2013.01); *G06Q 40/03* (2023.01)

(56)          References Cited

U.S. PATENT DOCUMENTS

| | | | |
|---|---|---|---|
| 11,044,106 B2 | 6/2021 | Tomaselli | |
| 11,055,794 B1 | 7/2021 | Wang et al. | |
| 11,210,687 B2 | 12/2021 | Kesiboyana | |
| 11,238,532 B2 | 2/2022 | De Suza | |
| 11,295,235 B2 * | 4/2022 | Guim Bernat | G06F 3/0673 |
| 11,315,179 B1 | 4/2022 | Rehder | |
| 11,494,836 B2 | 11/2022 | Cella | |
| 11,663,662 B2 | 5/2023 | Chen | |
| 11,823,261 B2 | 11/2023 | Ludwig | |
| 11,922,495 B1 | 3/2024 | Hernandez | |
| 12,406,271 B2 | 9/2025 | Daley | |
| 2010/0131390 A1 | 5/2010 | Emswiler | |
| 2012/0317015 A1 | 12/2012 | Cohen et al. | |
| 2014/0019293 A1 | 1/2014 | Brownley et al. | |
| 2020/0234310 A1 | 7/2020 | Daley et al. | |
| 2020/0252224 A1 | 8/2020 | Tomaselli | |
| 2020/0349642 A1 | 11/2020 | Kumar et al. | |
| 2020/0372575 A1 | 11/2020 | Kesiboyana | |
| 2021/0201404 A1 * | 7/2021 | Schwartz | G06N 20/00 |
| 2021/0319385 A1 | 10/2021 | Chau | |
| 2022/0318640 A1 * | 10/2022 | Malur Srinivasan | |
| | | | G06F 18/285 |
| 2022/0351284 A1 | 11/2022 | Canon Paez | |
| 2022/0391973 A1 | 12/2022 | Peters | |
| 2022/0414528 A1 | 12/2022 | Chhibber | |
| 2023/0005055 A1 | 1/2023 | Chen | |
| 2023/0186383 A1 | 6/2023 | Ludwig | |
| 2023/0252115 A1 | 8/2023 | Ports | |
| 2023/0342844 A1 * | 10/2023 | Cappitta | H04L 63/0838 |
| 2023/0396438 A1 | 12/2023 | Mahoney | |
| 2024/0045855 A1 | 2/2024 | Kondakindi | |
| 2024/0144050 A1 | 5/2024 | Wang | |
| 2024/0193432 A1 | 6/2024 | Bean | |
| 2024/0193681 A1 | 6/2024 | Dao | |
| 2024/0221022 A1 * | 7/2024 | Saunkeah | G06Q 30/0236 |
| 2024/0257250 A1 | 8/2024 | Tso | |
| 2025/0055878 A1 | 2/2025 | Bahl | |
| 2025/0124277 A1 * | 4/2025 | Man | G06N 20/00 |
| 2025/0231775 A1 * | 7/2025 | Tao | G06N 3/08 |
| 2025/0232503 A1 * | 7/2025 | Lim | G06F 3/04895 |

FOREIGN PATENT DOCUMENTS

| | | | |
|---|---|---|---|
| WO | 2022256477 A1 | 12/2022 | |
| WO | 2023/091519 A1 | 1/2023 | |
| WO | 2023/286019 A1 | 1/2023 | |

OTHER PUBLICATIONS

Office Action mailed Mar. 5, 2025 in U.S. Appl. No. 18/758,703.
Office Action mailed Mar. 28, 2025 in U.S. Appl. No. 19/046,103.
International Search Report and Written Opinion issued Sep. 23, 2024 in International Application PCT/US2024/036114.
"Crib, Rachel. ""5 Innovations that Deliver the Digital Banking of the Future."" University Wire, May 30, 2023. https://dialog.proquest.com/professional/docview/2820290765?accountid=131444. (Year: 2023)".
Office Action mailed Sep. 26, 2025 in U.S. Appl. No. 18/758,703.
Notice of Allowance mailed Oct. 24, 2025 in U.S. Appl. 19/046,103.

* cited by examiner

200

Analysis Subsystem 230

First Stage 235
Internal Risk Analysis 240A
Partner Data Share 240B

Second Stage 245
Card / CRMS Analysis 250A
Duplicate Check 250B
Internal Fraud Check 250C
Acct. Exposure Analysis 250D
Location Analysis 250E Third Stage 255
Filtering Decisioning 260

Fourth Stage 265
External Analysis 270

Fraud Check Subsystem 275

Choreography Subsystem 215

Data Component Handler (DCH) Subsystem 225

AI Engine(s) 295
(e.g., trained ML model(s))

Decision 290

Request 210

User Interface 285

Evaluation Subsystem 220

Core Subsystem 205

Request 210 | Decision 290
(e.g., Kafka, MQ)

Data Store 280

FIG. 2

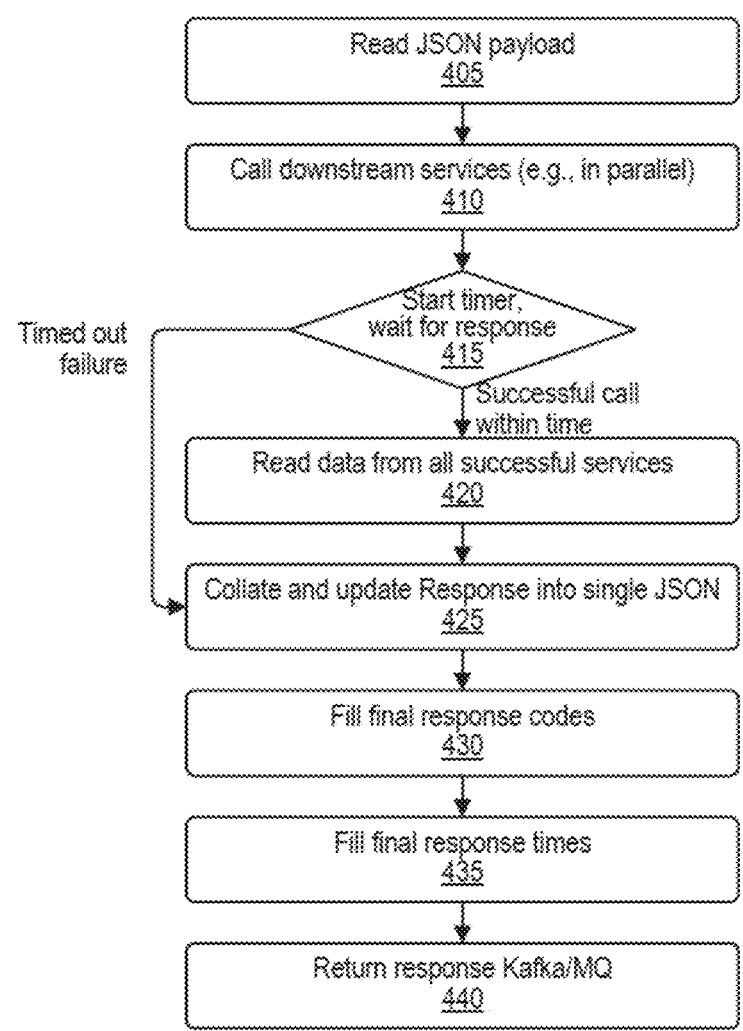
FIG. 4

1500

Analyze user account data according to a first set of rules to perform a preliminary validation that a user account is eligible for a program to be applied to the user account, wherein the user account data is associated with the user account, wherein the user account data does not include information from an external analysis system
1505

Preliminary validation decision
1510

Ineligible

Eligible

Retrieve secondary user account data from the external analysis system via the communication interface and over the network
1515

Analyze the user account data and the secondary user account data according to a second set of rules to perform a secondary validation that the user account is eligible for the program to be applied to the user account
1520

Secondary validation decision
1525

Ineligible

Eligible

Apply the program to the user account
1530

Prevent the program from being applied to the user account
1535

FIG. 15

DYNAMIC MULTI-STAGE QUALIFICATION ANALYSIS FOR MULTIPLE PROGRAMS

CROSS-REFERENCE TO RELATED APPLICATIONS

The present patent application claims the priority benefit of U.S. Provisional Patent Application No. 63/564,163 filed Mar. 12, 2024 and titled "Systems and Methods for Automated Qualification Analysis," the disclosure of which is incorporated by reference herein.

BACKGROUND

Field of the Invention

The present disclosure generally pertains to generating analyses of user accounts dynamically within time constraints as data comes in, based on the time constraints and asynchronous receiving of the data. More specifically, the present disclosure pertains to generating an analyses of a user dynamically based on a duration of time available for responding to a request, in multiple stages, and in some cases for multiple products, programs, and/or services at once.

Description of the Related Art

Cards, such as cards and debit cards, can be used by customers during transactions with merchants at terminals. Terminals can read information from cards using card reader devices. Card reader devices include magnetic stripe reader devices that read card information from a magnetic stripe of a card that is swiped through a slot, Europay-Mastercard-Visa (EMV) chip reader devices that read card information from an EMV chip of a payment card that is inserted into a slot, or near field communication (NFC) reader devices that read card information wirelessly from an NFC-enabled card or other NFC device. Card reader devices read the card information from a card, then send that card information to a server associated with a processing entity in order to process the transaction by transferring asset(s) from a transferor account to a transferee account.

Cards or lines of credit can be provided to users by entities such as financial institutions or merchants. Traditionally, these entities undergo a thorough but lengthy analysis of a user before providing the user with a card, a line, or another modification to an existing account. This thorough analysis can be slow and inefficient, for example including waiting long periods of time (e.g., days) for data that may or may not end up being important for the analysis. Because of this, such analyses typically cannot be performed quickly (e.g., while a client is in a particular location). Alternately, these entities could undergo a shortened analysis of a user, which can lack thoroughness and miss important information even in situations when some of that information could be quickly obtained. By skipping what may be important data, such analyses can therefore have a low level of accuracy.

Some organizations have membership or loyalty programs that clients can register for, either through payment or for free. A client registered with a membership or loyalty program with a particular organization can receive benefits from the merchant, for example after the client transfers at least a certain amount of assets to the organization. Some cards may be branded or labeled according to a particular organization. Organizations with such branded cards may likewise grant benefits to clients. Some organizations even allow clients to sign up for a branded card within their locations. However, such organizations generally do not have access to detailed financial data for clients, and are not able to perform thorough analyses of the clients. Organizations may also have a limited amount of time to decide whether to offer a benefit to a client, for instance based on an amount of time that the client is physically present at the organization's location.

SUMMARY

Systems and methods are described for analyzing user data, for instance for eligibility of a user for one or more programs. The user data is analyzed in two or more stages, with each stage including rules and/or program qualification criteria specific to that stage. In some examples, the systems and methods used trained machine learning models for at least one stage of the analysis. The systems and methods disclose identifying one or more programs that the user is eligible for, and in some cases, applying the one or more programs to the user's account.

In some aspects, the techniques described herein relate to an apparatus for account analysis, the apparatus including: a communication interface coupled to a network; a memory that stores instructions; and a processor that executes the instructions, wherein execution of the instructions by the processor causes the processor to: analyze user account data according to a first set of rules to perform a preliminary validation that a user account is eligible for a program to be applied to the user account, wherein the user account data is associated with the user account, wherein the user account data does not include information from an external analysis system; in response to the preliminary validation that the user account is eligible for the program, retrieve secondary user account data from the external analysis system via the communication interface and over the network; analyze the user account data and the secondary user account data according to a second set of rules to perform a secondary validation that the user account is eligible for the program to be applied to the user account; and in response to the secondary validation that the user account is eligible for the program, apply the program to the user account.

In some aspects, the techniques described herein relate to a method of account analysis, the method including: analyzing user account data according to a first set of rules to perform a preliminary validation that a user account is eligible for a program to be applied to the user account, wherein the user account data is associated with the user account, wherein the user account data does not include information from an external analysis system; in response to the preliminary validation that the user account is eligible for the program, retrieving secondary user account data from the external analysis system via a communication interface and over a network; analyzing the user account data and the secondary user account data according to a second set of rules to perform a secondary validation that the user account is eligible for the program to be applied to the user account; and in response to the secondary validation that the user account is eligible for the program, applying the program to the user account.

In some aspects, the techniques described herein relate to a non-transitory computer readable storage medium having embodied thereon a program, wherein the program is executable by a processor to perform a method of account analysis, the method including: analyzing user account data according to a first set of rules to perform a preliminary validation that a user account is eligible for a program to be applied to the user account, wherein the user account data is associated with the user account, wherein the user account data does not include information from an external analysis system; in response to the preliminary validation that the user account is eligible for the program, retrieving secondary user account data from the external analysis system via a communication interface and over a network; analyzing the user account data and the secondary user account data according to a second set of rules to perform a secondary validation that the user account is eligible for the program to be applied to the user account; and in response to the secondary validation that the user account is eligible for the program, applying the program to the user account.

In some aspects, the techniques described herein relate to a method for automated multi-program qualification analysis, the method including: receiving user information that is associated with one or more assets of a user, wherein the user information continues to be received over time; receiving update data for qualification criteria corresponding to a plurality of programs, wherein the qualification criteria include program-agnostic qualification criteria and program-specific qualification criteria, and wherein the qualification criteria change over time based on the update data; dynamically analyzing the user information and the qualification criteria in a first analysis, wherein the first analysis compares the user information to the program-agnostic qualification criteria to generate a preliminary decision of user eligibility for the plurality of programs; dynamically analyzing the user information and the qualification criteria in a second analysis, wherein the second analysis includes using a trained machine learning (ML) model to process the preliminary decision and the user information and the program-specific qualification criteria in real-time as the user information and the update data for the qualification criteria continue to be received, and wherein the trained ML model identifies a qualification decision indicating a subset of the plurality of programs that the user qualifies for; outputting recommendations for the subset of the plurality of programs; and dynamically updating the trained ML model in real-time based on feedback associated with the recommendations, as the user information continues to be received over time and as the qualification criteria continues to change over time, to improve accuracy of the trained ML model for one or more additional qualification decisions.

In some aspects, the techniques described herein relate to a system for automated multi-program qualification analysis, the system including: at least one memory storing instructions; and at least one processor, wherein execution of the instructions by the at least one processor causes the at least one processor to: receive user information that is associated with one or more assets of a user, wherein the user information continues to be received over time; receive update data for qualification criteria corresponding to a plurality of programs, wherein the qualification criteria include program-agnostic qualification criteria and program-specific qualification criteria, and wherein the qualification criteria change over time based on the update data; dynamically analyze the user information and the qualification criteria in a first analysis, wherein the first analysis compares the user information to the program-agnostic qualification criteria to generate a preliminary decision of user eligibility for the plurality of programs; dynamically analyze the user information and the qualification criteria in a second analysis, wherein the second analysis includes using a trained machine learning (ML) model to process the preliminary decision and the user information and the program-specific qualification criteria in real-time as the user information and the update data for the qualification criteria continue to be received, and wherein the trained ML model identifies a qualification decision indicating a subset of the plurality of programs that the user qualifies for; output recommendations for the subset of the plurality of programs; and dynamically update the trained ML model in real-time based on feedback associated with the recommendations, as the user information continues to be received over time and as the qualification criteria continues to change over time, to improve accuracy of the trained ML model for one or more additional qualification decisions.

In some aspects, the techniques described herein relate to a non-transitory computer readable storage medium having embodied thereon a program, wherein the program is executable by a processor to perform a method of automated multi-program qualification analysis, the method including: receiving user information that is associated with one or more assets of a user, wherein the user information continues to be received over time; receiving update data for qualification criteria corresponding to a plurality of programs, wherein the qualification criteria include program-agnostic qualification criteria and program-specific qualification criteria, and wherein the qualification criteria change over time based on the update data; dynamically analyzing the user information and the qualification criteria in a first analysis, wherein the first analysis compares the user information to the program-agnostic qualification criteria to generate a preliminary decision of user eligibility for the plurality of programs; dynamically analyzing the user information and the qualification criteria in a second analysis, wherein the second analysis includes using a trained machine learning (ML) model to process the preliminary decision and the user information and the program-specific qualification criteria in real-time as the user information and the update data for the qualification criteria continue to be received, and wherein the trained ML model identifies a qualification decision indicating a subset of the plurality of programs that the user qualifies for; outputting recommendations for the subset of the plurality of programs; and dynamically updating the trained ML model in real-time based on feedback associated with the recommendations, as the user information continues to be received over time and as the qualification criteria continues to change over time, to improve accuracy of the trained ML model for one or more additional qualification decisions.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative embodiments of the present application are described in detail below with reference to the following figures:

FIG. 2 is a block diagram illustrating a system architecture of a choreography subsystem, in accordance with some examples.

FIG. 4 is a flow diagram illustrating a process associated with the data component handler subsystem, in accordance with some examples.

FIG. 15 is a flow diagram illustrating a process for multi-stage account analysis, in accordance with some examples.

DETAILED DESCRIPTION

Systems and methods are described for analyzing user data, for instance for eligibility of a user for one or more programs. The user data is analyzed in two or more stages, with each stage including rules and/or program qualification criteria specific to that stage. In some examples, the systems and methods used trained machine learning models for at least one stage of the analysis. The systems and methods disclose identifying one or more programs that the user is eligible for, and in some cases, applying the one or more programs to the user's account.

The systems and methods described herein produce various technical improvements. Technical improvements provided by a systems and methods described herein may include, for example, improved efficiency in generating and providing an analysis of a client, for example based on determination of optimal actions for generating the analyses (e.g., whether to wait to receive a particular dataset to use for generating an analysis based on an estimated time to receive the dataset and/or an estimated importance of the dataset to generating the analysis) within a duration of time available for responding to the request. Technical improvements also include increased reliability in providing the analysis, since the duration of time available for responding to the request is adhered to and the dynamic time-dependent asynchronous analysis system flexibly handles issues such as nonresponsive data sources without sacrificing provision of the analyses in a timely manner. The efficiency and reliability here also does not sacrifice security, as discussed herein with respect to fraud detection rules 560 for example, and allows the analysis for the analyses generated by the dynamic time-dependent asynchronous analysis system to be as thorough as possible given the duration of time available for responding to the request. Further technical improvements include increased efficiency and reliability for client devices that send the request for the analyses of the user and that receive the analyses of the user from the dynamic time-dependent asynchronous analysis system. Because these client devices can perform transactions such as providing users with cards or lines of credit, the technical improvements to the dynamic time-dependent asynchronous analysis system mean improvements to the efficiency and reliability of systems for provision of cards, lines of credit, or other transactions. Technical improvements also include increased accuracy, as trained machine learning models can be updated (e.g., via further training and/or fine-tuning) and improved over time to reduce inaccuracies. Technical improvements also include improved efficiency, as the systems and methods disclosed herein can analyze a single set of user data in multiple ways to automatically check whether the user eligible or not for multiple products, programs, and/or services at once.

Figure 1:
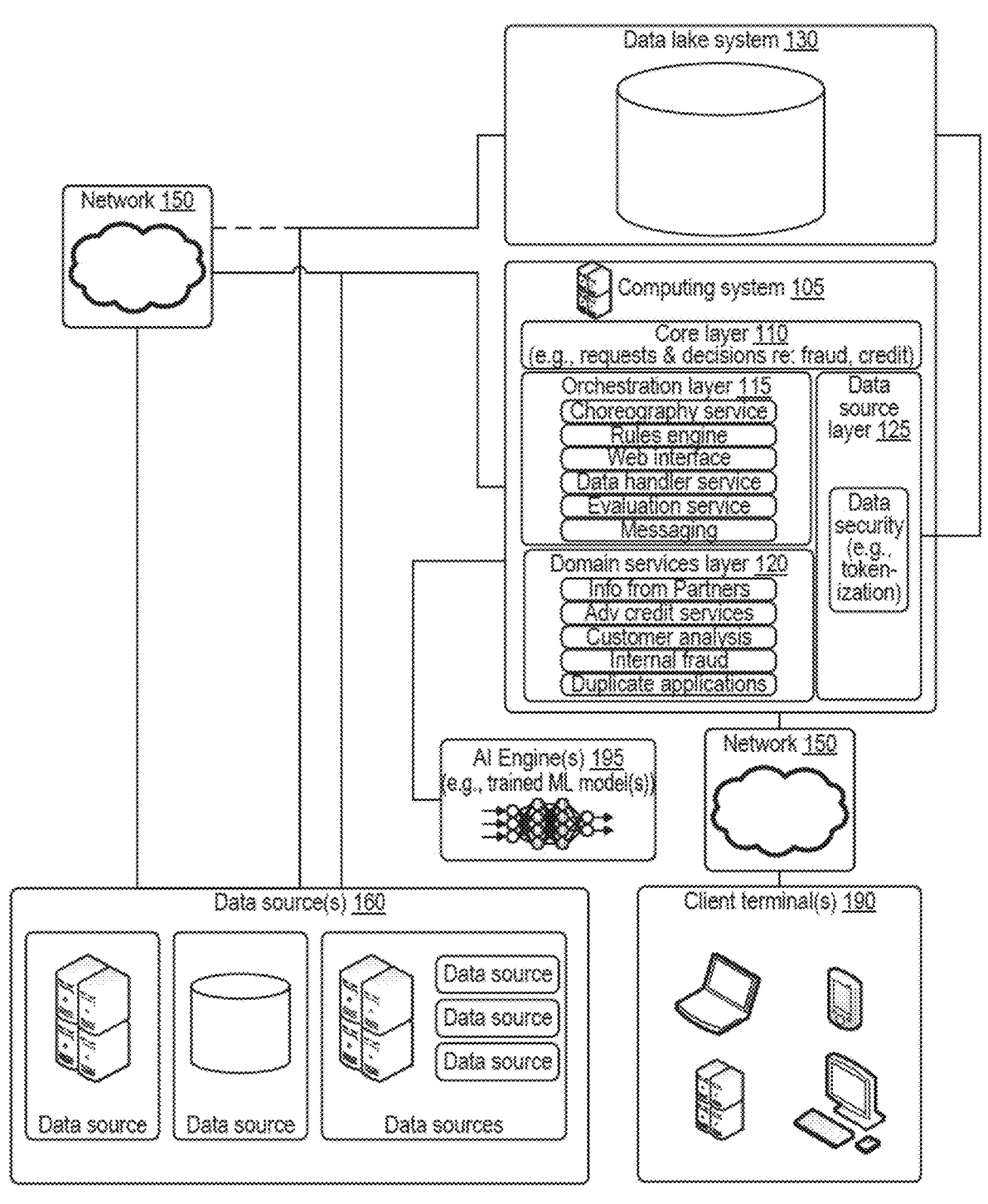
FIG. 1 is a block diagram illustrating a system architecture of a user analysis and decisioning system, in accordance with some examples.

FIG. 1 is a block diagram illustrates a system architecture 100 for a user analysis and decisioning system. In particular, the architecture 100 of FIG. 1 includes a computing system 105 coupled to a data lake system 130. The computing system 105 and the data lake system 130 are coupled to one or more data source(s) 160, either directly, through a network connection over a network 150 (e.g., a public network 150 such as the Internet and/or a private network 150 such as a LAN and/or WLAN), or some combination thereof. The computing system 105 is coupled to one or more client terminals 190 over a network connection over a network 150 (e.g., a public network 150 such as the Internet and/or a private network 150 such as a LAN and/or WLAN). In some cases, the computing system 105 may be referred to as the remote computing system, the network computing system, the server system, the unit of compute, the unit of computing, or some combination thereof. The system architecture 100 may include one or more computing systems 1700.

The computing system 105 includes various systems running various system layers, including a core layer 110, an orchestration layer 115, a domain services layer 120, and a data source layer 125. The core layer 110 may receive (e.g., from client terminals 190) requests for analyses and decisions about a user, the analyses and decisions generally relating to fraud, account worthiness (e.g., creditworthiness), financial well-being, other types of analyses, or some combination thereof. The orchestration layer 115 includes tools enabling the core layer 110 to generate the analyses and decisions, including a choreography service that queues and schedules requests and analysis generation, a rules engine that provides rules for making analyses and decisions, a web interface for the client terminal(s) 190, a data handler that handles receipt of data from the data lake system 130 and transmission of data to the data lake system 130, an evaluation service that generates analyses based on the data from the data lake system 130 and the rules from the rules engine, and a messaging service that allows the various layers and services of the computing system 105 to interact with one another and with the data lake system 130. The domain services layer 120 provide services for the client terminal(s) 190 using the orchestration layer 115 and data source layer 125, such as sharing of information from partner organizations, advanced services, customer analyses, internal fraud analyses, and duplicate applications. The data source layer 125 interacts with and handles receipt of data from the data lake system 130 and transmission of data to the data lake system 130, and may include data security precautions such as a firewall and/or a data tokenization service. In some examples, the rules of the rules engine of FIG. 1 may include the rules associated with the analyses of FIG. 2 (e.g., of the analysis subsystem 230, the fraud check 275, and/or the AI engine(s) 295), the user-based rules 550, the request-based rules of FIG. 5, the transaction-based rules 555, the fraud detection rules 560, the product qualification criteria 720, the product qualification criteria 730, the product qualification criteria 740, the product qualification criteria 750, the rule 1220, the rule 1225, the rule 1230, the qualification criteria 1245, the qualification criteria 1250, the qualification criteria 1260, the qualification criteria 1265, the qualification criteria 1275, the criteria 1280, the qualification criteria 1290, the qualification criteria 1295, the first set of rules of operation 1505, the second set of rules of operation 1520, the qualification criteria of operation 1610, other rules discussed herein, other product qualification criteria discussed herein, or combinations thereof.

The computing system 105 can include, or can have access to (e.g., via a network or other coupling to additional computer system(s)), artificial intelligence (AI) algorithms and/or machine learning (ML) models via AI engine(s) 195. In some examples, the AI engine(s) 195 can include one or more trained ML model(s), such as the trained ML model(s) 640 and/or the trained ML model(s) 1325. In some examples, the computing system 105 can use the AI engine(s) 195 to make decisions, for instance about whether a user or request is likely to be associated with a fraud attempt, and/or whether a user is qualified for one or more products, services, and/or programs. In some examples, the computing system 105 can use the AI engine(s) 195 to make such decisions based on rules associated with the rules engine of the orchestration layer 115, based on product qualification criteria associated with a product or program, or other rules or criteria discussed herein. In some examples, the AI engine(s) 195 include the AI engine(s) 295, or vice versa.

The data lake system 130 may include one or more databases, for example one or more time-series databases. The data lake system 130 may retrieve, organize, and store data. The data that is retrieved, organized and stored by the data lake system may include data from the various data sources 160, data (e.g., requests) received from client terminals 190), data (e.g., decisions and analyses and analyses) generated by the computing system 105, or some combination thereof.

The data sources 160 may include various types of data sources. For example, a set of one or more computers included in the data sources 160 may itself be a data source. A hard drive or other computer-readable storage medium may be a data source, particularly when read by a computing device of the data sources 160. A set of one or more computing devices included in the data sources 160 may include multiple disparate data sources, for example one data source with transaction history, one data source with address changes, one data source with name changes, and so forth. The computing system 105 and data lake system 130 may retrieve data from any combination of the various data sources, and various types of data sources, of the data sources 160.

The client terminals 190, which may be referred to as client devices, may include various computing devices used by clients. The client terminals 190 may transmit requests to the computing system 105 over the network 150, and may receive responses back from the computing system 105 over the network 150. The requests may be requests for analyses of one or more users, and the responses may be the analyses of the one or more users as generated by the computing system 105. In some cases, client terminals 190 may be POS devices at merchant locations, where the merchant is trying to determine whether to allow a customer to enroll in a card and/or account associated with the merchant, and is relying on receiving an analysis of the customer to make this determination.

As discussed further herein, these analyses may be generated by the computing system 105 based on a variety of types of information about the user retrieved by the computing system 105 from the data lake system 130 and/or data sources 160. The analyses may include account scores or scores corresponding to an account worthiness of the user. The analyses may be decisions, which may be made based on whether or not the account scores or scores exceed or fall below a predetermined account score or score threshold. The decisions may include decisions as to whether or not to grant the user a new account (e.g., a new card associated with an account), a limit increase (e.g., on an existing account), or some combination thereof.

The computing system 105, data lake system 130, client terminals 190, and data sources 160 all may include one or more computing system 1700 and/or may include at least a subset of the components of a computing system 1700.

FIG. 2 is a block diagram illustrating a system architecture of a decisioning system 200. In some examples, the decisioning system 200 includes a core subsystem 205, a choreography subsystem 215, an evaluation subsystem 220 (EVS), a data component handler subsystem 225 (DCH), an analysis subsystem 230, a fraud check 275 subsystem, a data store 280, a user interface 285, AI engine(s) 295, or a combination thereof. The decisioning system 200 may include one or more computing systems 1700.

A decisioning process (which can be referred to as a choreography process or choreography flow) conducted using the decisioning system 200. In some examples, the decisioning process can include the evaluation subsystem 220 and/or the analysis subsystem 230 synchronizing with an external system (not shown) to retrieve the latest updated rules and/or product qualification criteria associated with different products.

The decisioning product can include receipt of a request 210 by the choreography subsystem 215 (e.g., by the evaluation subsystem 220) from the core subsystem 205. In some examples, the request 210 can be communicated through a messaging service, message broker, event store service, and/or stream-processing service, such as Apache® Kafka®, IBM® Message Queue (MQ), or Rabbit Message Queue (RabbitMQ™). In some examples, the request 210 is a JavaScript Object Notation (JSON) request, and is this transmitted and/or received in JSON format. Once the choreography subsystem 215 (e.g., the evaluation subsystem 220) receives the request 210, the evaluation subsystem 220 reads a client service configuration from the data store 280. The data store 280 can include database, such as a MySQL database. The data store 280 can include a cache, such as a Redis (REmote DIctionary Server) cache. In some examples, the evaluation subsystem 220 attempts to retrieve the client service configuration from a cache (e.g., for improved read speed), and retrieves the client service configuration from a database if the client service configuration if the client service configuration is not in the cache.

In some examples, the evaluation subsystem 220 determines a choreography priority and/or template indicating which determinations (e.g., which rules or product qualification criteria) are to be prioritized and/or evaluated by the data component handler subsystem 225 to generate a decision 290 in response to the request 210. The evaluation subsystem 220 can send the request 210 to the data component handler subsystem 225, in some cases with the choreography priority and/or template. In some examples, the evaluation subsystem 220 can transfer the request 210 (e.g., with the choreography priority and/or template) to the data component handler subsystem 225 in JSON format, for instance over messaging service(s) such as Kafta®, MQ, and/or RabbitMQ™.

The data component handler subsystem 225 receives the request 210 (e.g., with the choreography priority and/or template) from the evaluation subsystem 220. The data component handler subsystem 225 interfaces with the analysis subsystem 230, the fraud check 275, the data store 280, and/or the engine(s) 295 to generate the decision 290 that is responsive to the request 210. In some examples, the request 210 can inquire as to whether a specific user is eligible and/or qualified to receive a specific product, program, or service. The decision 290 can identify, based on applicable rules and/or qualification criteria, whether the specific user is eligible and/or qualified to receive one or more product(s), program(s), and/or service(s).

In some examples, the data component handler subsystem 225, the analysis subsystem 230, the data store 280, and/or the engine(s) 295 can be used to generate the decision 290 in a multi-stage process that can be choreographed by the data component handler subsystem 225 (and/or other subsystems of the choreography subsystem 215). In some examples, the choreography priority and/or template that is generated by the evaluation subsystem 220 and communicated from the evaluation subsystem 220 to the data component handler subsystem 225 along with the request 210 can be used by the data component handler subsystem 225 to choreograph the multi-stage process for determining the decision 290.

In some examples, the analysis subsystem 230 can perform various analyses of the user data from the request 210, for instance in comparison to certain rules and/or qualification criteria (e.g., for various products, programs, and/or services). These analyses can be divided into a first stage 235, a second stage 245, a third stage 255, and a fourth stage 265. In some cases, these different stages of analyses performed using the analysis subsystem 230 can be performed in order, with each subsequent stage only performed if the user was determined to pass the previous stages (e.g., was preliminarily judged to be eligible and/or qualified based on the rules and/or qualification criteria of the previous stages).

In some examples, the first stage 235 includes an internal risk analysis 240A. Ins some examples, the internal risk analysis 240A can include whether risk analysis data corresponding to the user is already available for the user, either internally or through a service provider (e.g., LexisNexis® risk solutions) that the analysis subsystem 230 has access to. In some examples, the first stage 235 includes a partner data share 240B process, in which the analysis subsystem 230 retrieves data from partners (e.g., merchants or other organizations that partner with the entity running the decisioning system 200) to determine if recent decisions or analyses are available corresponding to the user. If, at the first stage 235, the analysis subsystem 230 determines (e.g., through the internal risk analysis 240A or the partner data share 240B) that recent (e.g., more recent than a threshold time) decisions or analyses are found that disqualify the user, the data component handler subsystem 225 can also decide (in the decision 290) to disqualify the user for the same reasons. If, at the first stage 235, the analysis subsystem 230 determines (e.g., through the internal risk analysis 240A or the partner data share 240B) that recent (e.g., more recent than a threshold time) decisions or analyses are found that find the user trustworthy and/or eligible, the data component handler subsystem 225 can proceed to the second stage 245.

In some examples, the second stage 245 can be associated with a Customer Relationship Management Software (CRMS). In some examples, the second stage 245 can include a card and/or CRMS analysis 250A, in which various aspects of the user's account(s), card(s), and/or loan(s) (e.g., revolving loans, installment loans) are checked, for instance whether the user is hitting a top spending or loan limit for any individual card, whether the user is hitting a top spending or loan limit for all of their cards combined, or the like. For instance, in some examples, users may be prohibited from applying for a new credit card if the user already has access to $500 k or more (e.g., via credit limits) across all of the cards they already have. The second stage 245 can include a duplicate check 250B that determines whether the request 210 is a duplicate of another request. For instance, the request 210 may be the user's application to apply for the product, program, or service. In some examples, the product, program, or service does not allow duplicate applications that are identical to one another, to prevent overloading the system. In some examples, the product, program, or service does not allow duplicate applications that share characteristics but are not identical to one another, to prevent fraud attempts or attempts to game the system. In some examples, the card and/or CRMS analysis 250A can match the identity of the user to other identifiers associated with the user, such as the user's social security number, LexisNexis® ID, or other identifiers, and can retrieve information about the user that is associated with those identifiers, for instance including information about loans or credit cards that the user has obtained through other services or platforms, information about potentially fraudulent activities associated with the user, purchase history information associated with the user, or a combination thereof.

The second stage 245 can include an internal fraud check 250C. In some cases, the internal fraud check 250C can check characteristics and/or attributes of the user (e.g., from the request 210 and/or associated metadata) against known characteristics and/or attributes of fraud perpetrators. For instance, the internal fraud check 250C can check an IP address of the user (e.g., associated with generation and/or submission of the request 210) against known IP addresses of fraud perpetrators. In some examples, the second stage 245 can include an account exposure analysis 250D. Exposure, in the context of the account exposure analysis 250D, can refer to potential risk of loss in case the user defaults on a loan. The account exposure analysis 250D can examine, and or aggregate loan balance(s) of, all accounts, cards, loans (e.g., revolving, installment) that the user has. The account exposure analysis 250D can use the resulting aggregated loan balance(s) to determine if a new line of credit could be extended to the customer (e.g., through a specific product, program, and/or service) securely, for instance without exceeding a maximum loan balance threshold, or without a predicted probability of default exceeding a maximum default probability threshold. In some examples, the loan balance threshold may be a threshold that is applicable to all users. In some examples, the loan balance threshold may be a threshold that is applicable to all user-specific, for instance related to the user's assets (e.g., bank account balance(s), home(s), car(s), and so forth), the user's income, the user's employment status, the similar data for other family member(s) of the user (e.g., a spouse if the user is married), or a combination thereof. The account exposure analysis 250D can aggregate and/or analyze the loan balance(s) over an account cycle for a given period (e.g., one or more days, one or more weeks, one or more months, one or more quarters, one or more years) for the user's accounts, cards, and/or loans, and determine whether a new line of credit could be extended to the customer (e.g., through a specific product, program, and/or service) securely, for instance without exceeding a maximum loan balance threshold, or without a predicted probability of default exceeding a maximum default probability threshold. In some examples, the predicted probability of default for a user can be determined using the ML model(s) 1325. For instance, in some examples, the score(s) 1332 can be, or can include, the predicted probability of default. In some examples, the predicted probability of default the fraud probability(s) 1338.

In some examples, the second stage 245 can include a location analysis 250E. The location analysis 250E can determine physical address and/or location coordinates from the user's device (e.g., based on the request 210 and/or associated metadata). The location analysis 250E can determine whether the physical address and/or location coordinates determined from the user's device (e.g., phone) align with a stated location that the user states in the request 210. The location analysis 250E can determine whether the physical address and/or location coordinates determined from the user's device (e.g., phone) match known locations associated with fraud perpetrators.

The third stage 255 can include a filtering decisioning 260 analysis. The filtering decisioning 260 analysis can go through various reasons why the user might be judged to be not eligible or not qualified, and analyzes each of these reasons in detail. The fourth stage 265 can include an external analysis 270. The external analysis 270 can request an analysis of trust and/or risk of the user from an external service provider. For instance, the external analysis 270 can include a credit score check, such as a check of a Fair Isaac Corporation (FICO) score, from a credit agency. In some examples, the external analysis 270 can include an external fraud check involving the fraud check 275 subsystem.

The AI engine(s) 295 which may include trained ML model(s) that can perform analyses and evaluation(s) for making decisions about whether a user qualifies for one or more products, making decisions about whether a probability that a user or request is associated with a fraud attempt, making decisions about whether user information meets certain product qualification criteria and/or other rules, or a combination thereof.

In some examples, certain analyses of the analysis subsystem 230 can use the AI engine(s) 295 for determination and/or generation of their analyses. For instance, in some examples, any of the individual analyses in the 230/and/or the fraud check 275 can use the AI engine(s) 295 for determination and/or generation of their analyses. In a first illustrative example, the filtering decisioning 260 can use the AI engine(s) 295 for determination and/or generation of its analysis. For instance, in some examples, during filtering decisioning 260, the AI engine(s) 295 can analyze user information about a user in comparison with previous eligibility and/or qualification decisions about the same user and other users. In some examples, the AI engine(s) 295 can identify that similar users have been found to be eligible and/or qualified, and/or ineligible and/or unqualified, and can generate a decision 290 as to the user's eligibility and/or qualification for one or more products, programs, and/or services accordingly.

In a second illustrative example, the external analysis 270 and/or the fraud check 275 can use the AI engine(s) 295 for determination and/or generation of their analyses. For instance, in some examples, during the external analysis 270 and/or the fraud check 275, the AI engine(s) 295 can analyze user information about a user in comparison with previous fraud check analyses of the same user and other users, and/or in comparison with previous external analyses of the same user and other users. In some examples, the AI engine(s) 295 can identify that similar users have been found to have high trust (e.g., exceeding a trust threshold) and/or low fraud probability (e.g., below a fraud probability threshold), and/or have been found to have low trust (e.g., below the trust threshold) and/or high fraud probability (e.g., exceeding the fraud probability threshold), and can generate a decision 290 as to the user's trustworthiness, fraud probability, and/or eligibility and/or qualification for one or more products, programs, and/or services accordingly.

In some examples, the evaluation subsystem 220 is a rule engine that determines which data requests must be made from the various data sources and/or services associated with the analysis subsystem 230, the fraud check 275 subsystem, the data store 280, the AI engine(s) 295, or a combination thereof. In some examples, the data component handler subsystem 225 is responsible for synchronous communications (e.g., a series of synchronous communications) with various data sources and/or services associated with the analysis subsystem 230, the fraud check 275 subsystem, the data store 280, the AI engine(s) 295, or a combination thereof. In some examples, the messaging service(s) are configured in a way so as to (1) manage the varying communications as different data sources return data and (2) enable a recursive capability of the evaluation subsystem 220 to perform nested logic. In some examples, the messaging service(s) have three queues—an evaluation queue associated with the evaluation subsystem 220, a data component queue associated with the data component handler subsystem 225, and a results queue associated with the decision 290. In some examples, the evaluation subsystem 220 is a consumer to the evaluation queue. The evaluation subsystem 220 reads the information and evaluates the types of data that the decision engine(s) (e.g., in the core subsystem 205, evaluation subsystem 220, the data component handler subsystem 225, and/or the analysis subsystem 230) use to generate the decision 290. The evaluation subsystem 220 is a producer to the data component queue and places the different data requests into that queue. The evaluation subsystem 220 appends rule identifiers it used to decide which data components to request, for instance to be used for audit. The data component handler subsystem 225 is a consumer of the data component queue, and reads requests for data from it. The data component handler subsystem 225 then requests the data from varying sources in the analysis subsystem 230, the fraud check 275 subsystem, the data store 280, the AI engine(s) 295, or a combination thereof. The data component handler subsystem 225 manages each request until completion. The data component handler subsystem 225 is also a producer for the evaluation queue. The data component handler subsystem 225 places the returned data appending the source identifier(s) into the evaluation queue, also preserving the keycode and the rules identifiers. In some examples, the evaluation subsystem 220 and/or the data component handler subsystem 225 can be producer(s) to the results queue. Once there are no more rules to enact, and all the data requests are completed, the evaluation subsystem 220 and/or the data component handler subsystem 225 can place all the data, including the keycode, the rules identifiers and the data source identifiers into the results queue.

In some examples, the core subsystem 205, an integration subsystem of the choreography subsystem 215, and/or the user interface 285, can be a consumer of the results queue. For instance, when the core subsystem 205 has waited a threshold amount of time (e.g., an allotted time for the decision 290), the core subsystem 205 requests the decision 290. The information is retrieved from the results queue.

Figure 3:
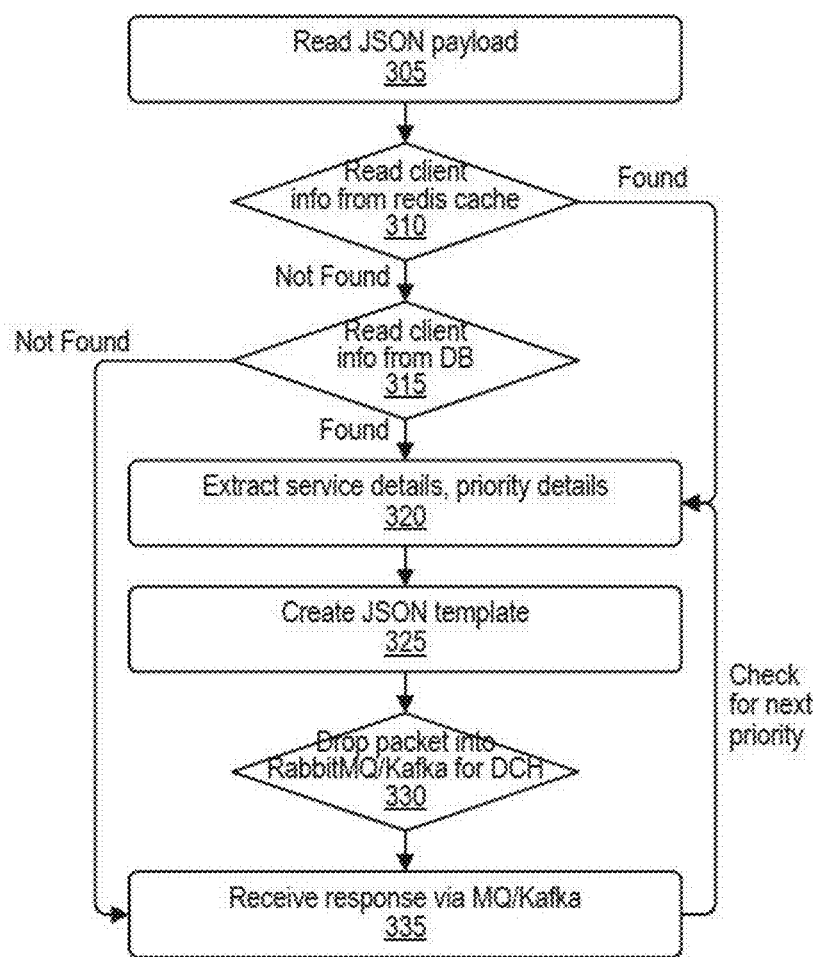
FIG. 3 is a flow diagram illustrating a process associated with the evaluation subsystem, in accordance with some examples.

FIG. 3 is a flow diagram illustrating a process 300 associated with the evaluation subsystem 220. The process 300 is performed by the choreography subsystem 215. In some examples, the process 300 is performed by the evaluation subsystem 220.

At operation 305, the choreography subsystem 215 (e.g., the evaluation subsystem 220) receives a message (e.g., as a JSON payload) from a messaging service (e.g., Kafka®, MQ, RabbitMQ™, or a combination thereof).

The evaluation subsystem 220 reads a client service configuration from the data store 280. The data store 280 can include database, such as a MySQL database. The data store 280 can include a cache, such as a Redis (REmote DIctionary Server) cache. For instance, at operation 310, the choreography subsystem 215 (e.g., the evaluation subsystem 220) attempts to retrieve the client service configuration from a cache (e.g., for improved read speed). If the choreography subsystem 215 (e.g., the evaluation subsystem 220) is able to retrieve the client service configuration from the cache at operation 310, then the process 300 proceeds from operation 310 to operation 320.

If the choreography subsystem 215 (e.g., the evaluation subsystem 220) is unable to retrieve the client service configuration from the cache at operation 310, then at operation 315, the choreography subsystem 215 (e.g., the evaluation subsystem 220) attempts to retrieve the client service configuration from a database. If the choreography subsystem 215 (e.g., the evaluation subsystem 220) is able to retrieve the client service configuration from the database at operation 315, then the process 300 proceeds from operation 315 to operation 320. If the choreography subsystem 215 (e.g., the evaluation subsystem 220) is unable to retrieve the client service configuration from the database at operation 310, then the process 300 proceeds from operation 315 to operation 335.

At operation 320, the choreography subsystem 215 (e.g., the evaluation subsystem 220) extracts service details and/or priority details from the client service configuration. The service details and/or priority details can identify the various services and/or analyses of the analysis subsystem 230, the fraud check 275, the data store 280, and/or the AI engine(s) 295. The service details and/or priority details can identify and the priority (e.g., ranking of importance) and/or order (e.g., temporal order) with in which the choreography subsystem 215 (e.g., the data component handler subsystem 225) is to request information about the user from the services and/or analyses of the analysis subsystem 230, the fraud check 275, the data store 280, and/or the AI engine(s) 295.

At operation 325, the choreography subsystem 215 (e.g., the evaluation subsystem 220) generates a choreography JSON template with the downstream service configuration based on the priority details and/or service details. At operation 330, the choreography subsystem 215 (e.g., the evaluation subsystem 220) sends the choreography JSON template to the data component handler subsystem 225, for instance through one or more messaging service(s) (e.g., Kafka®, MQ, RabbitMQ™, or a combination thereof). In some examples, the data component handler subsystem 225 uses the choreography JSON template to request information about the user from the services and/or analyses of the analysis subsystem 230, the fraud check 275, the data store 280, and/or the AI engine(s) 295 according to the service details and/or priority details in the choreography JSON template. At operation 335, the choreography subsystem 215 (e.g., the evaluation subsystem 220) receives a response (e.g., the decision 290 and/or information from the services and/or analyses of the analysis subsystem 230, the fraud check 275, the data store 280, and/or the AI engine(s) 295) from the data component handler subsystem 225, for instance through one or more messaging service(s) (e.g., Kafka®, MQ, RabbitMQ™, or a combination thereof).

In some examples, the process returns to operation 320 after operation 335. For instance, in some examples, the response that the choreography subsystem 215 (e.g., the evaluation subsystem 220) receives from the data component handler subsystem 225 is not a final decision. For instance, the response can include a preliminary decision based on partial information from the services and/or analyses of the analysis subsystem 230, the fraud check 275, the data store 280, and/or the AI engine(s) 295. The response can just be information from the services and/or analyses of the analysis subsystem 230, the fraud check 275, the data store 280, and/or the AI engine(s) 295, without a decision. In some examples, after receiving such a response, the choreography subsystem 215 (e.g., the evaluation subsystem 220) checks for the next priority and will update the json with the next priority service configuration and sends it to data component handler subsystem 225 (e.g., via the messaging service(s)) until all of the services and/or analyses of the analysis subsystem 230, the fraud check 275, the data store 280, and/or the AI engine(s) 295 are called by the data component handler subsystem 225 and the decision 290 is made (or ready to be made by another system).

FIG. 4 is a flow diagram illustrating a process 400 associated with the data component handler subsystem 225.

The process 400 is performed by the choreography subsystem 215. In some examples, the process 400 is performed by the data component handler subsystem 225.

At operation 405, the choreography subsystem 215 (e.g., the data component handler subsystem 225) receives and/or reads a JSON payload (e.g., from the evaluation subsystem 220), for instance including the request 210 of FIG. 2 and/or the choreography JSON template of operation 325 and operation 330.

At operation 410, the choreography subsystem 215 (e.g., the data component handler subsystem 225) calls the downstream services of the analysis subsystem 230, the fraud check 275, the data store 280, and/or the AI engine(s) 295. The services can include, for instance, the internal risk analysis 240A, the partner data share 240B, the card and/or CRMS analysis 250A, the duplicate check 250B, the internal fraud check 250C, the account exposure analysis 250D, the location analysis 250E, the filtering decisioning 260, the external analysis 270, the fraud check 275, analyses based on the data store 280, analyses based on the AI engine(s) 295, or a combination thereof.

The choreography subsystem 215 (e.g., the data component handler subsystem 225) can call at least some of the services in parallel. The choreography subsystem 215 (e.g., the data component handler subsystem 225) can call at least some of the services in series. In some examples, an order in which the choreography subsystem 215 (e.g., the data component handler subsystem 225) calls the services can be based on the service details and/or priority details from the client service configuration and/or the JSON payload. For instance, in some examples, the choreography subsystem 215 (e.g., the data component handler subsystem 225) can call at least some of the services in multiple stages. In an illustrative example, as illustrated in FIG. 2, in a first stage 235, the data component handler subsystem 225 can call the internal risk analysis 240A and the partner data share 240B in parallel. In a second stage 245, the data component handler subsystem 225 can call the card and/or CRMS analysis 250A, the duplicate check 250B, the internal fraud check 250C, the account exposure analysis 250D, and the location analysis 250E in parallel. In a third stage 255, the data component handler subsystem 225 can call the filtering decisioning 260 and/or the AI engine(s) 295. In a fourth stage 265, the data component handler subsystem 225 can call the external analysis 270, the fraud check 275, and/or the AI engine(s) 295.

At operation 415, the choreography subsystem 215 (e.g., the data component handler subsystem 225) initiates a timer, within which to wait for response(s) from the various services called. If the choreography subsystem 215 (e.g., the data component handler subsystem 225) fails to receive response(s) from the service(s) called in operation 410 by the time the timer expires (e.g., after counting a threshold amount of time), then the process 400 proceeds from operation 415 to operation 425.

If the choreography subsystem 215 (e.g., the data component handler subsystem 225) successfully receives response(s) from the service(s) called in operation 410 by the time the timer expires (e.g., after counting the threshold amount of time), then at operation 420, the choreography subsystem 215 (e.g., the data component handler subsystem 225) reads the data received from all the service(s) called in operation 410 that successfully returned data to the choreography subsystem 215 (e.g., the data component handler subsystem 225).

At operation 425, the choreography subsystem 215 (e.g., the data component handler subsystem 225) collates and/or aggregates any responses and/or data that it successfully receives from the services that were called in operation 410, as well as any errors associated with failure to receive responses and/or data from any services that were called in operation 410. In some examples, the choreography subsystem 215 (e.g., the data component handler subsystem 225) can place this collated and/or aggregated data into a single message, such as a JSON. In some examples, the choreography subsystem 215 (e.g., the data component handler subsystem 225) can update the JSON payload that it received in operation 405 (e.g., the request 210 and/or the JSON template of operation 325 and operation 330) to append and/or otherwise insert this collated and/or aggregated data into the JSON payload. At operation 430, the choreography subsystem 215 (e.g., the data component handler subsystem 225) can add codes into the message indicating status of each service, for instance indicating whether a message was successfully received in time, whether the service took too long, whether the service threw an error, and along with a code for any error that was thrown. At operation 435, the choreography subsystem 215 (e.g., the data component handler subsystem 225) can add times (e.g., timestamps) into the message indicating how long each service took to respond to the call(s) of operation 410. These times can be used by the choreography subsystem 215 to estimate how responsive each service will be in the future, for instance to base a prediction of how long a service will take to respond, or a recommendation as to whether to wait further for a service to respond or not (e.g., if a service is taking longer than a threshold time to respond).

In some examples, the choreography subsystem 215 (e.g., the data component handler subsystem 225) can also make a decision 290 based on the data from the services, and include the decision 290 in the message. In some examples, the choreography subsystem 215 (e.g., the data component handler subsystem 225) generates a decision 290 that the user is eligible and/or qualified unless something in the data from the services indicates that the user should not be judged to be eligible and/or qualified (e.g., over a threshold number of indicators of ineligibility, distrust, and/or disqualification). In some examples, the choreography subsystem 215 (e.g., the data component handler subsystem 225) generates a decision 290 that the user is ineligible and/or unqualified unless something in the data from the services indicates that the user should be judged to be eligible and/or qualified (e.g., over a threshold number of indicators of eligibility, trust, and/or qualification). In some examples, the choreography subsystem 215 (e.g., the data component handler subsystem 225) uses the AI engine(s) 295 to process the data from the services and generate the decision 290.

At operation 440, the choreography subsystem 215 (e.g., the data component handler subsystem 225) sends the message, for instance back to the evaluation subsystem 220, the core subsystem 205, the data store 280, and/or the user interface 285. In some examples, the choreography subsystem 215 (e.g., the data component handler subsystem 225) sends the message via messaging service(s) such as Kafta®, MQ, and/or RabbitMQ™.

Figure 5:
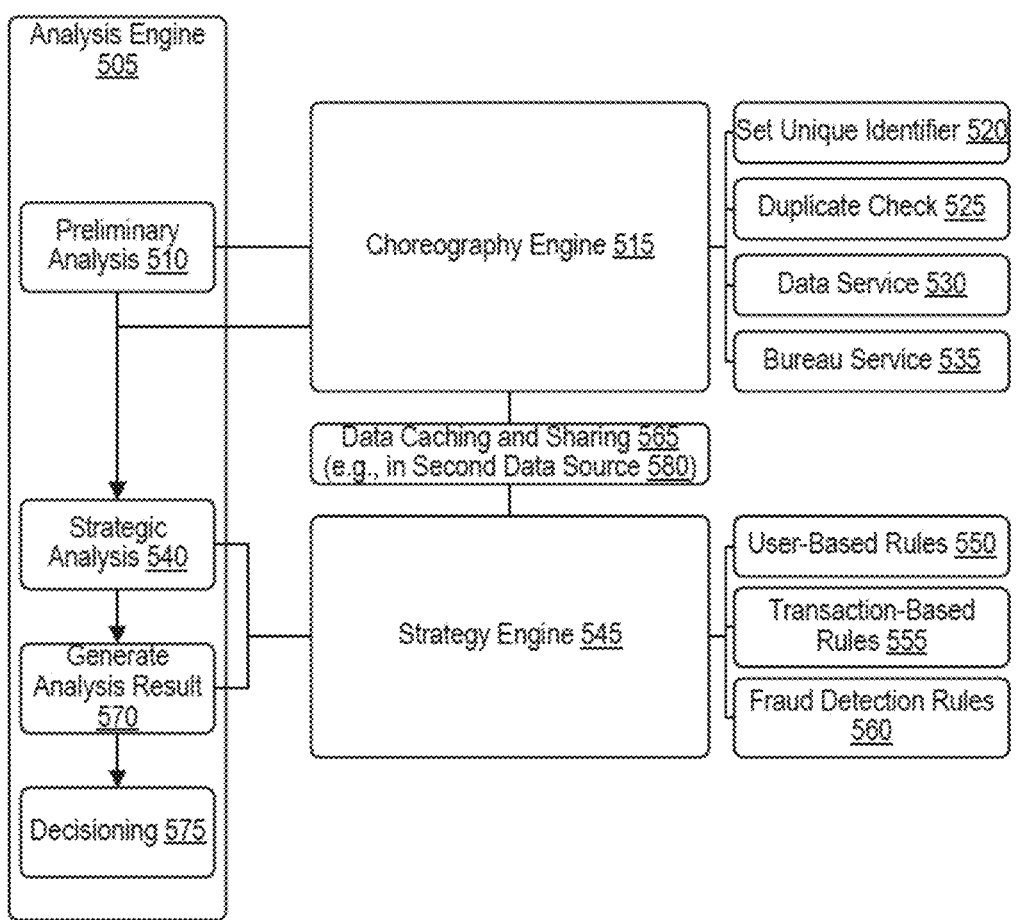
FIG. 5 is a block diagram illustrating a system architecture of a user analysis and decisioning system with an analysis engine, a choreography engine, and a strategy engine, in accordance with some examples.

FIG. 5 is a block diagram illustrating a system architecture of a user analysis and decisioning system 500 with an analysis engine 505, a choreography engine 515, and a strategy engine 545. The user analysis and decisioning system 500 includes an analysis engine 505. In some examples, the choreography subsystem 215 and/or analysis subsystem 230 can include the analysis engine 505, the choreography engine 515, and/or the strategy engine 545. The analysis engine 505 may include one or more computing systems 1700.

The user analysis and decisioning system 500 receives a request for an analysis of a user (e.g., as in the choreography subsystem 215 receiving the request 210 from the core subsystem 205). For example, the request for the analysis of the user can be received from a merchant device of a merchant who is requesting the analysis of the user before initiating and/or completing a transaction between the merchant and the user, from an account institution device of an account institution (e.g., card processors, card issuers, bureaus, lenders, credit owners) who is requesting the analysis of the user before initiating and/or completing a transaction between the account institution and the user, from a financial institution device of a financial institution (e.g., banks, credit unions, lenders) who is requesting the analysis of the user before initiating and/or completing a transaction between the financial institution and the user. Examples of transactions between the user and an entity (e.g., a merchant, an account institution, or a financial institution) with may include purchases by the user from the entity, rentals by the user from the entity, applications for credit (e.g., for a new line, a new loan, a new card) by the user from the entity, changes to credit (e.g., requesting a limit increase or other adjustment to a line) by the user from the entity, or a combination thereof.

The analysis engine 505 initiates and/or performs a preliminary analysis 510. The preliminary analysis 510 can include various checks of information supplied as part of the request and/or as part of the transaction. The checks performed by the preliminary analysis 510 can verify whether the user is eligible and/or authorized to make the transaction. For example, the preliminary analysis 510 can verify whether the user's age meets or exceeds a threshold age required for or otherwise corresponding to the transaction, such as 13, 14, 15, 16, 17, 18, 19, 20, 21, 22, 23, 24, 25, 26, 27, 28, 29, 30, or another threshold age. The checks performed by the preliminary analysis 510 can verify whether all information required to complete the transaction is received and is in the correct format. For example, if the transaction requires or otherwise corresponds to a form to be filled out, the checks performed by the preliminary analysis 510 can verify whether all of the fields in the form are filled in, and/or can verify whether all of the fields in the form are filled in with the correct type of information, or both. For instance, the preliminary analysis 510 can verify whether a "zip code" field is filled out and includes a 5-digit number, a "name" field is filled out and includes a string of text, a "birth date" field is filled out and includes enough digits of a number to form a date, a "social security number" field is filled out and includes a 9-digit number, and so forth. The checks performed by the preliminary analysis 510 can verify whether certain action required to complete the transaction, or otherwise corresponding to the transaction, have been performed. For example, if the transaction requires the user to pay a fee, the checks performed by the preliminary analysis 510 can verify, based on a fee payment history of the user and/or a fee receipt history (e.g., of the entity), whether the user has paid the fee.

The user analysis and decisioning system 500 includes a choreography engine 515, which can perform one or more additional analyses and one or more tasks associated with the preliminary analysis 510, the strategic analysis 540, or both. The choreography engine 515 can be used, for example, to set a unique identifier 520 for each user for which an analysis is requested and/or for which data is otherwise present. The unique identifier 520 can be generated to be truly unique. Setting a unique identifier 520 and associating analyses and data with the unique identifier 520 can provide a technical benefit over use of certain identifiers such as social security number (SSN) for this purpose, as malicious parties may attempt fraudulent activities by using another person's SSN or other information. In some examples, the unique identifier 520 can be an identifier associated with an external system, such as a LexisNexis® ID associated with a LexisNexis® system. Setting of, and use of, the unique identifier 520 can prevent such fraudulent activity from affecting the actual owner of the SSN. In some examples, the setting of the unique identifier 520 can correspond to the internal risk analysis 240A, the card and/or CRMS analysis 250A, the account exposure analysis 250D, other analyses of the analysis subsystem 230, a combination thereof.

The choreography engine 515 can perform a duplicate check 525 (e.g., duplicate check 250B). The duplicate check 525 can detect whether the request for the analysis, the transaction, or both are duplicates. If so, the choreography engine 515 can discard one of the requests for analysis and/or one of the transactions. For example, the duplicate check 525 can check whether more than one identical (or very similar with only minor differences such as metadata) credit line applications for a user have been received, and/or whether more than one identical (or very similar with only minor differences such as metadata) requests for analysis of the same user corresponding to the credit line applications have been received. Such duplicates may have been submitted erroneously, and discarding one or more so that only one is left can ensure that, for example, the entity does not open two or more lines of credit for the user when the user only wished to open one line of credit. In some examples, a request for confirmation can be sent to the user and/or the entity to verify whether a duplicate can be removed, and/or whether a duplicate was intended, to allow processing of duplicate actions if they are indeed intended. The duplicate check 525 can also be used to check for certain types of fraud, such as brute force attacks by a malicious party, in which much of the information submitted for a transaction by or on behalf of the malicious party may be identical but one or more fields (e.g., password, username, SSN) may change as a malicious party attempts to find a combination of information that works.

The choreography engine 515 can include a data service 530. The data service 530 can obtain, receive, retrieve, provide, and/or transmit information about the user. In some examples, the data service 530 can be queried by the entity (e.g., by the merchant, financial institution, account institution, or any other type of entity described above) using a first set of one or more pieces of information about the user, such as the user's name, date of birth, username, password, unique identifier 520, card number, bank account number, email address, mailing address, residence address, billing address, SSN, other information about a user discussed herein, or a combination thereof. In response to the query, the data service 530 can retrieve a second set of one or more pieces of information about the user from one or more data sources, and can provide the second set of one or more pieces of information about the user to the entity. The second set of one or more pieces of information about the user can include, for example, the user's name, date of birth, username, password, unique identifier 520, card number, bank account number, email address, mailing address, residence address, billing address, SSN, other information about a user discussed herein, or a combination thereof. In some examples, the data service 530 can correspond to the internal risk analysis 240A, the partner data share 240B, the CRMS analysis 250D, other analyses of the analysis subsystem 230, a combination thereof.

The choreography engine 515 can include a bureau service 535. The bureau service 535 can communicate with one or more credit bureaus. The bureau service 535 can send an identifier of the user to a bureau device associated with a credit bureau. The identifier of the user can be, for example, the user's name, date of birth, username, password, unique identifier 520, card number, bank account number, email address, mailing address, residence address, billing address, SSN, other information about a user discussed herein, or a combination thereof. The bureau device can identify an account score for the user, and can send the account score for the user to the bureau service 535 in response to receipt of the identifier of the user at the bureau device. The bureau device can identify the account score for the user using a hard credit check, a soft credit check, or some combination thereof. In some examples, the bureau service 535 can retrieve a cached version of the account score for the user instead of, or in addition to, obtaining the account score for the user from the bureau device. For instance, hard credit checks can in some cases impact a user's account score if they are performed too often in succession, and the cached version of the account score can be retrieved and/or used if a recent credit check was performed in order to avoid impacting the user's account score further. In some cases, the cached version of the account score can be retrieved and/or used if the bureau device is not responding with the account score quickly enough (e.g., based on an amount of elapsed time since an analysis of the user was requested approaching a duration of time available for the analysis engine to generate and provide its analysis of the user). In some examples, the account score may be a FICO® account score. In some examples, the bureau service 535 can correspond to the filtering decisioning 260, the external analysis 270, other analyses of the analysis subsystem 230, a combination thereof.

The choreography engine 515 can provide any information it obtains, such as the unique identifier 520, a determination by the duplicate check 525 as to whether a request/application/transaction is a duplicate, information about the user from the data service 530, and/or account scores from the bureau service 535, to the preliminary analysis 510 and/or to the strategic analysis 540.

If the one or more checks and analyses that are part of the preliminary analysis 510 and/or choreography engine 515 successfully verify that the user is authorized to make the transaction (and/or fail to identify anything disqualifying the user from authorization to make the transaction), the analysis engine 505 can proceed to a strategic analysis 540.

If the one or more checks and analyses that are part of the preliminary analysis 510 and/or choreography engine 515 fail to verify that the user is authorized to make the transaction (and/or successfully identify something disqualifying the user from authorization to make the transaction), the analysis engine 505 can proceed to generating an analysis 570 and/or decisioning 575, with the analysis and/or decision recommending that the user be declined for the requested transaction, for instance in real-time (or near real-time) as the analysis engine 505 receives data (e.g., from the data service 530 and/or the second data source 580 via the data caching and sharing 565) and/or waits to receive data (e.g., from the data service 530 and/or the second data source 580 via the data caching and sharing 565). This way, more resource-intensive analyses, such as some of those that may be performed as part of the strategic analysis 540 and/or the strategy engine 545, can be bypassed if the preliminary analysis 510 and/or choreography engine 515 already disqualify the user.

The strategic analysis 540 can include some further fraud detection and/or fraud protection analyses. For example, the strategic analysis 540 can include a 2-factor authentication or 3-factor authentication interface, in which the user and/or entity can be required to provide an authentication code from another device, such as a mobile handset. The strategic analysis 540 can be supported by the strategy engine 545. The strategy engine 545 can include user-based rules 550, request-based rules 555, and fraud detection rules 560. In some examples, the further fraud detection and/or fraud protection analyses of the strategic analysis 540 can correspond to the internal fraud check 250C, the filtering decisioning 260, the fraud check 275, the AI engine(s) 295, other analyses of the analysis subsystem 230, a combination thereof.

In some examples, the choreography engine 515 and the strategy engine 545 can be coupled using data caching and sharing 565. For instance, the chorography engine 515 can share information with the strategy engine 545 by sending the information to the strategy engine 545 and/or by caching the information in a data structure accessible to the strategy engine 545. In some cases, the strategy engine 545 can share information with the choreography engine 515 by sending the information to the choreography engine 515 and/or by caching the information in a data structure accessible to the choreography engine 515. In some examples, caching the information may be performed using replication of data in a data source, for instance using one-way replication of data from a primary data source to a second data source 580 to provide a backup data source to make a service "self-healing" in that the backup can be restored (or relied upon for information) in case of any issues.

The user-based rules 550 are related to the user themselves. Examples of the user-based rules 550 include checking whether the user is bankrupt or not, whether the user was recently bankrupt or not, whether the user is deceased or living, whether the user's file has been frozen, whether queries for information about the user result in errors or "no hit" responses, whether the user's account score exceeds a particular threshold or not, whether a slope of a trajectory the user's account score over time exceeds a particular threshold or not, which age group the user's age falls into, whether the user's aggregate credit limit (e.g., over one or more cards and/or lines of credit) exceeds a threshold, whether the number cards and/or lines of credit that the user has exceeds a threshold, whether the number cards that the user has and that are associated with a particular brand or merchant exceeds a threshold, other rules related to the user themselves, or a combination thereof. In some examples, such user-based rules can correspond to the internal risk analysis 240A, the card and/or CRMS analysis 250A, the internal fraud check 250C, the account exposure analysis 250D, the location analysis 250E, the filtering decisioning 260, other analyses of the analysis subsystem 230, a combination thereof.

The request-based rules 555 are related to the transaction that is being requested. For instance, if the transaction is that the user is applying for a card, the request-based rules 555 may be rules associated with eligibility for that particular card and/or related cards. Examples of the request-based rules 555 may include indications that, if a user does not meet certain requirements (e.g., an account score threshold), a different card may be offered to the user instead of the one requested. For example, if the user is applying for a dual card (DC) but is not eligible, then a private label card (PLCC) may be offered in place of the dual card. This offering of a different card or other product may be referred to as downselling. If the transaction is that the user is applying for a line of credit, the request-based rules 555 may be rules associated with eligibility for that particular line and/or related lines. In some examples, such request-based rules can correspond to the internal risk analysis 240A, the card and/or CRMS analysis 250A, the internal fraud check 250C, the account exposure analysis 250D, the location analysis 250E, the filtering decisioning 260, other analyses of the analysis subsystem 230, a combination thereof.

The fraud detection rules 560 may be specific to detection of fraud or likely fraud attempts. The fraud detection rules 560 may automatically identify certain types of fraud, such as brute force attacks in which many similar transaction requests are submitted sequentially with small changes in an attempt by a malicious party to find a combination that works. In some examples, the fraud detection rules 560 may be used to check whether a transaction request is coming from a geographical location that would be unusual for the user to be requesting such a transaction from, for example from another country or continent than the user is in. In some examples, the fraud detection rules 560 may request fraud checks from third parties that may perform, for example, background checks on a user. In some examples, such fraud detection rules 560 can correspond to the internal risk analysis 240A, the card and/or CRMS analysis 250A, the internal fraud check 250C, the account exposure analysis 250D, the location analysis 250E, the filtering decisioning 260, other analyses of the analysis subsystem 230, a combination thereof.

In some examples, any one of the user-based rules 550, the transaction-based rules 555, and/or the fraud detection rules 560 can include any one or more rules discussed with respect to the rules of the rules engine of FIG. 1, the analyses of FIG. 2 (e.g., of the analysis subsystem 230, the fraud check 275, and/or the AI engine(s) 295), the product qualification criteria 720, the product qualification criteria 730, the product qualification criteria 740, the product qualification criteria 750, the rule 1220, the rule 1225, the rule 1230, the qualification criteria 1245, the qualification criteria 1250, the qualification criteria 1260, the qualification criteria 1265, the qualification criteria 1275, the criteria 1280, the qualification criteria 1290, the qualification criteria 1295, the first set of rules of operation 1505, the second set of rules of operation 1520, the qualification criteria of operation 1610, or a combination thereof.

The information determined by the preliminary analysis 510, the choreography engine 515, the strategic analysis 540, and/or the strategy engine 545 may feed in to generating an analysis 570 of the user. The analysis of the user may include, for example, a score for the user as discussed herein. In some examples, the analysis of the user may be used in decisioning 575 to make a decision as to whether to recommend accepting or declining the transaction for the user (e.g., whether to recommend granting or declining a requested line for the user). For example, if the score exceeds a certain transaction-specific threshold (e.g., noted in the transaction-based rules 555), the decision may be to grant the transaction, and otherwise the decision may be to decline the transaction. In some examples, the analysis of the user may include a decision (e.g., as to whether to recommend accepting or declining the transaction for the user), in which case generating the analysis 570 may be part of decisioning 575.

Figure 6:
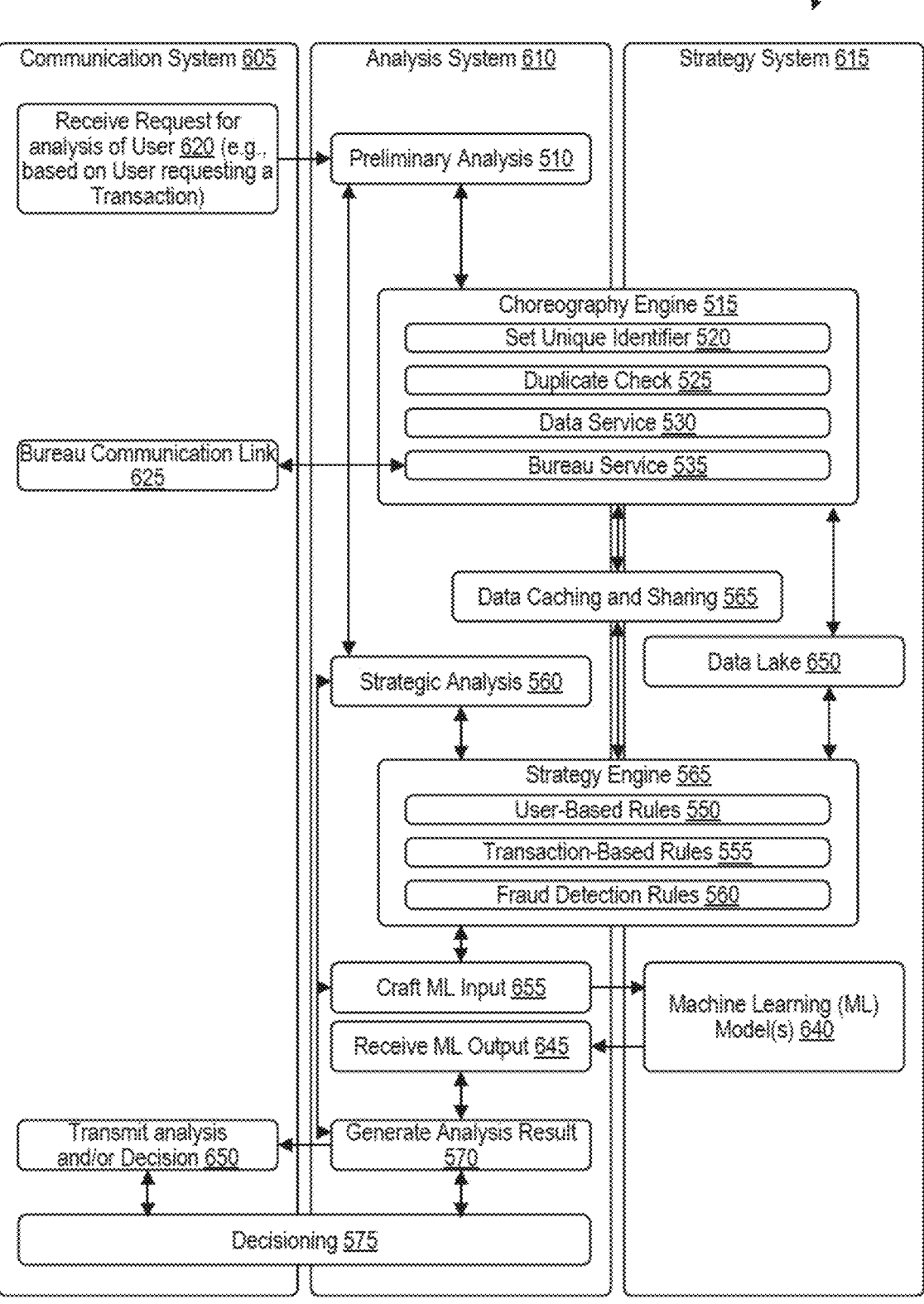
FIG. 6 is a block diagram illustrating a system architecture of a user analysis and decisioning system with a communication system, an analysis system, and a strategy system, in accordance with some examples.

FIG. 6 is a block diagram illustrating a system architecture of a user analysis and decisioning system 600 with a communication system 605, an analysis system 610, and a strategy system 615. The communication system 605, the analysis system 610, and the strategy system 615 may each include one or more computing systems 1700.

At operation 620, the communication system 605 receives, from a user device or a device associated with an entity (e.g., a merchant, a financial institution, and/or an account institution), a request for an analysis of the user. The request for the analysis of the user (at operation 620) may be received based on the user requesting a transaction, such as one or more purchases by the user from the entity, rentals by the user from the entity, applications for credit (e.g., for a new line, a new loan, a new card) by the user from the entity, changes to credit (e.g., requesting a limit increase or other adjustment to a line of credit) by the user from the entity, or a combination thereof. The requested analysis may take the form of a recommendation as to whether or not to approve the transaction, and/or may include information (e.g., a score for the user) based on which the entity can more efficiently decide whether or not to approve the transaction. In some cases, the request for the analysis of the user (at operation 620) can identify a duration of time available to the user analysis and decisioning system 600 to respond to the request for the analysis of the user (at operation 620) (e.g., with the requested analysis of the user).

In response to the request for the analysis of the user (at operation 620), the analysis system 610 can perform the preliminary analysis 510. The preliminary analysis 510 can include use of the choreography engine 515. The choreography engine 515 can be on the analysis system 610, on the strategy system 615, or partially on both. As discussed with respect to FIG. 5, the choreography engine 515 can set a unique identifier 520 for the user, perform the duplicate check 525, retrieve data as a data service 530, and communicate with one or more bureaus as the bureau service 535. In some examples, the bureau service 535 can communicate with the one or more bureaus through a bureau communication link 625 of the communication system 605.

The analysis system 610 can also perform the strategic analysis 540. The strategic analysis 540 can include use of the strategy engine 545. The strategy engine 545 can be on the analysis system 610, on the strategy system 615, or partially on both. As discussed with respect to FIG. 5, the strategy engine 545 can include, and perform analyses based on, user-based rules 550, transaction-based rules 555, and/or fraud detection rules 560. In some examples, any one of the user-based rules 550, the transaction-based rules 555, and/or the fraud detection rules 560 can include any one or more rules discussed with respect to the rules of the rules engine of FIG. 1, rules associated with the analyses of FIG. 2 (e.g., of the analysis subsystem 230, the fraud check 275, and/or the AI engine(s) 295), the product qualification criteria 720, the product qualification criteria 730, the product qualification criteria 740, the product qualification criteria 750, the rule 1220, the rule 1225, the rule 1230, the qualification criteria 1245, the qualification criteria 1250, the qualification criteria 1260, the qualification criteria 1265, the qualification criteria 1275, the criteria 1280, the qualification criteria 1290, the qualification criteria 1295, the first set of rules of operation 1505, the second set of rules of operation 1520, the qualification criteria of operation 1610, other rules discussed herein, other product qualification criteria discussed herein, or combinations thereof.

In some examples, the strategy system 615 may include machine learning (ML) model(s) 640 (e.g., the AI engine(s)

195, the AI engine(s) 295, the ML model(s) 640, the AI engine(s) 727, the AI engine(s) 737, the AI engine(s) 747, the AI engine(s) 757, the ML model(s) 1325). The ML model(s) 640 may include one or more artificial intelligence algorithms, one or more trained machine learning (ML) models trained using training data and generated based on one or more ML algorithms, one or more trained neural networks (NNs) trained using training data, or some combination thereof. The analysis system 610 can craft an ML input 635 as part of the strategic analysis 540, the strategy engine 545, and/or generation of the analysis 570. The ML input 635 may, for example, provide a predetermined set of one or more types of information about a user. For example, the ML input 635 may include the user's name, date of birth, username, password, unique identifier 520, card number, bank account number, email address, mailing address, residence address, billing address, SSN, other information about a user discussed herein, or a combination thereof. ML input 635 may include information about past analyses, requests for analyses, transactions, requests for transactions, decisions regarding those transactions, or combinations thereof. The ML model(s) 640 can generate an ML output 645, which the analysis system 610 can receive, parse, and/or interpret. For example, the ML model(s) 640 can be trained to estimate a user's eligibility for a transaction as its ML output 645 based on the ML input 635. Such training can be done based on training data with eligibility decisions for multiple users for the transactions of the same type alongside similar input information. The ML model(s) 640 can be trained to identify fraudulent activity as its ML output 645 based on the ML input 635. Such training can be done based on training data within which activities are tagged as fraudulent or not based on similar input information. The ML model(s) 640 can be trained to estimate an analysis 570 as its ML output 645 based on the ML input 635. Such training can be done based on training data within which analyses are identified based on similar input information.

The choreography engine 515 and the strategy engine 545 can share information through data caching and sharing 565 as discussed with respect to FIG. 5. The strategy system 615 may include a data lake 630, which may include aspects of the data lake system 130. The data lake 630 can be accessed by, and/or interacted with, by the choreography engine 515 and/or the strategy engine 545.

The analysis system 610 can generate the analysis 570. The information determined by the preliminary analysis 510, the choreography engine 515, the strategic analysis 540, and/or the strategy engine 545 may feed in to generating an analysis 570 of the user. The information from the ML output 645 and/or the data lake 630 can feed in to generating an analysis 570 of the user. The analysis of the user may include, for example, a score for the user as discussed herein. In some examples, the analysis of the user may be used in decisioning 575 to make a decision as to whether to recommend accepting or declining the transaction for the user (e.g., whether to recommend granting or declining a requested line of credit for the user). For example, if the score exceeds a certain transaction-specific threshold (e.g., noted in the transaction-based rules 555), the decision may be to grant the transaction, and otherwise the decision may be to decline the transaction. Decisioning 575 may occur on the analysis system 610, the communication system 605 (e.g., which may perform decisioning 575 with a merchant, financial institution device, or account institution device), or a combination thereof. In some examples, the analysis of the user may include a decision (e.g., as to whether to recommend accepting or declining the transaction for the user), in which case generating the analysis 570 may be part of decisioning 575. At operation 650, the communication system 605 may transmit the analysis and/or the decision to one or more recipient devices, such as a user device associated with the user, a merchant device associated with a merchant, a financial institution device associated with a financial institution, an account institution device associated with an account institution, or a combination thereof.

Figure 7:
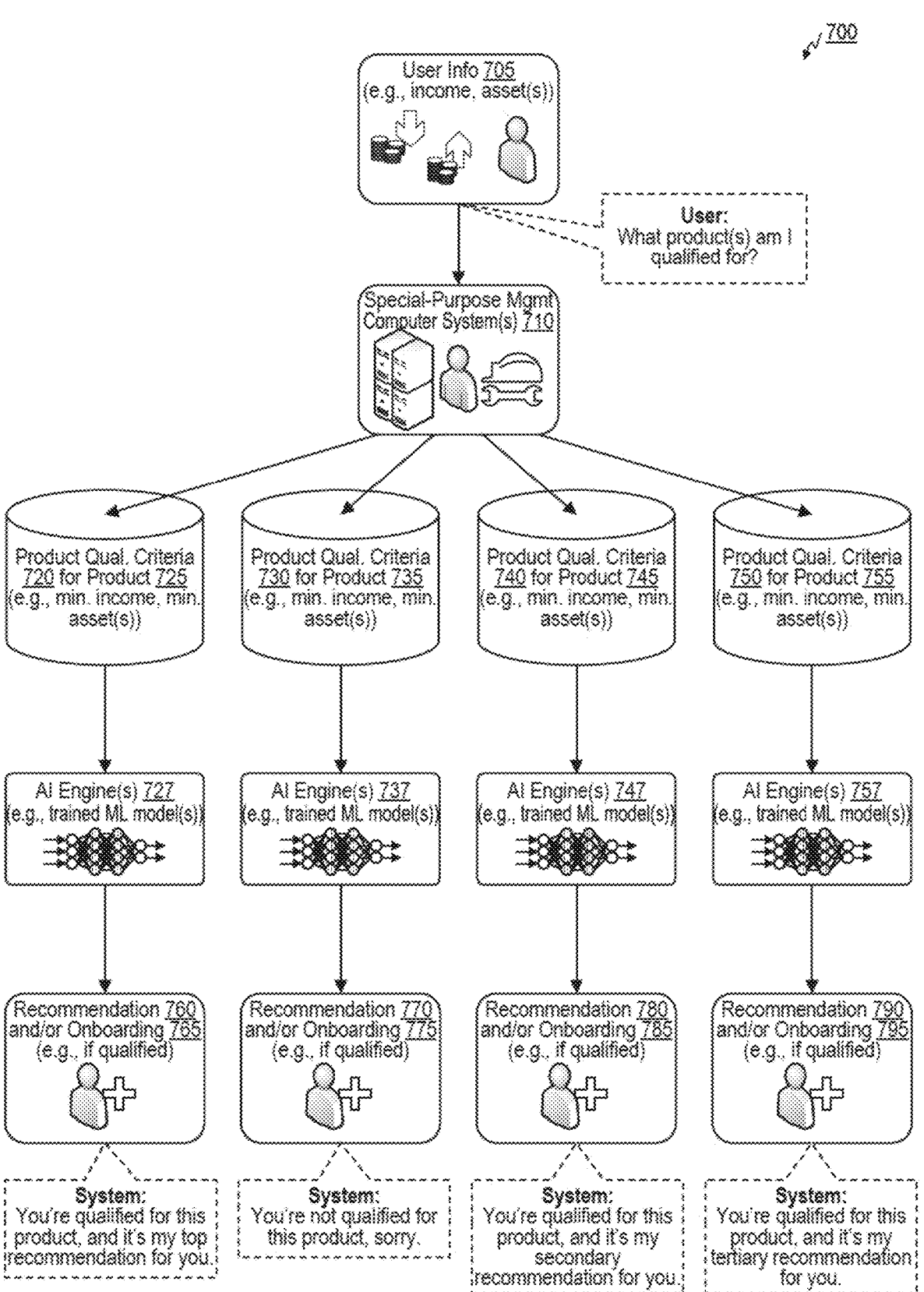
FIG. 7 is a block diagram illustrating an example architecture of a multi-product qualification analysis system that analyzes a single set of user information based on multiple sets of product qualification criteria to determine eligibility of a user for multiple different products, in accordance with some examples.

FIG. 7 is a block diagram illustrating an example architecture of a multi-product qualification analysis system 700 that analyzes a single set of user information 705 based on multiple sets of product qualification criteria (e.g., product qualification criteria 720, product qualification criteria 730, product qualification criteria 740, product qualification criteria 750) to determine eligibility of a user for multiple different products (e.g., product 725, product 735, product 745, product 755). The multi-product qualification analysis system 700 includes one or more special-purpose management computer system(s) 710 that receives user information 705 from one or more data sources. The user information 705 can include information about one or more users. In some examples, the user information 705 includes information about a specific user. The user information 705 can include user-specific information such as a name of a user, a mailing address of the user, a billing address of the user, an address of the user, a birth date of the user, an area (e.g., location coordinates, address, city, county, country, continent, region) of birth of the user, a home phone number of the user, an office phone number of the user, a cell phone number of the user, a phone number of the user, a location (e.g., location coordinates, address, city, county, country, continent, region, area) of the user (and/or of a user device of the user), a social security number (SSN) of the user, an individual taxpayer identification number (ITIN) of the user, a taxpayer identification number (TIN) of the user, a government-issued identification number of the user, an employer of the user, a race of the user, an ethnicity of the user, a gender of the user, a sex of the user, a height of the user, a weight of the user, an immigration status of the user, one or more political view(s) of the user, other demographic information associated with the user, other information associated with the user, or a combination thereof. It should be understood that the types of user information 705 that are obtained and/or used by the management computer system(s) 710 can be limited to comply with laws, privacy practices, user preferences, or combinations thereof. Any of the types of user information 705 identified above can be omitted based on laws, privacy practices, user preferences, or combinations thereof.

In some examples, the management computer system(s) 710 can receive at least some of the user information 705 from a user interface (UI), such as a graphical user interface (GUI), at a user device associated with the user. For instance, the UI of the user device can receive portion(s) of the user information 705 that are input (e.g., typed, selected, and/or otherwise identified) by the user, and the user device can provide these portion(s) of the user information 705 to the management computer system(s) 710. In some examples, the management computer system(s) 710 can receive at least some of the user information 705 from one or more external data sources, such as one or more database(s), server(s), data structure(s), or combinations thereof. The external data source(s) can be associated with one or more government(s), financial institution(s), credit bureau(s), bank(s), credit card companie(s), merchant(s), payment service(s), or combinations thereof. In some examples, the management computer system(s) 710 can receive a first portion of the user information 705 through a UI of the user device, can query external data source(s) using the first portion of the user information 705, and can receive a second portion of the user information 705 from the external data source(s) in response to the query. For instance, in an illustrative example, the management computer system(s) 710 can receive an SSN of the user from the user device (e.g., the SSN having been received by the UI of the user device), can query external data source(s) for other information about the user using the SSN of the user, and can retrieve the other information about the user (e.g., name, address, date of birth, phone number, etc.) from the external data source(s) based on the query.

The multi-product qualification analysis system 700 stores multiple sets of product qualification criteria (e.g., product qualification criteria 720, product qualification criteria 730, product qualification criteria 740, product qualification criteria 750) for multiple different products (e.g., product 725, product 735, product 745, product 755). In some examples, the multi-product qualification analysis system 700 includes one or more artificial intelligence (AI) engine(s) that the management computer system(s) 710 uses to compare the user information 705 to the various product qualification criteria (e.g., product qualification criteria 720, product qualification criteria 730, product qualification criteria 740, product qualification criteria 750) to identify whether the user (e.g., who is associated with the user information 705) qualifies for each of the products (e.g., product 725, product 735, product 745, product 755). The one or more AI engine(s) can include AI engine(s) 727 that the management computer system(s) 710 to compare the user information 705 to product qualification criteria 720 associated with a product 725 to identify whether the user (e.g., who is associated with the user information 705) qualifies for the product 725. The one or more AI engine(s) can include AI engine(s) 737 that the management computer system(s) 710 to compare the user information 705 to product qualification criteria 730 associated with a product 735 to identify whether the user (e.g., who is associated with the user information 705) qualifies for the product 735. The one or more AI engine(s) can include AI engine(s) 747 that the management computer system(s) 710 to compare the user information 705 to product qualification criteria 740 associated with a product 745 to identify whether the user (e.g., who is associated with the user information 705) qualifies for the product 745. The one or more AI engine(s) can include AI engine(s) 757 that the management computer system(s) 710 to compare the user information 705 to product qualification criteria 750 associated with a product 755 to identify whether the user (e.g., who is associated with the user information 705) qualifies for the product 755.

In some examples, the one or more AI engine(s) (e.g., AI engine(s) 727, AI engine(s) 737, AI engine(s) 747, AI engine(s) 757) are each separate AI system(s), for instance separate machine learning (ML) model(s). In some examples, two or more of the AI engine(s) (e.g., AI engine(s) 727, AI engine(s) 737, AI engine(s) 747, AI engine(s) 757) share at least one element, for instance sharing one or more ML model(s) used by each.

The multi-product qualification analysis system 700 (e.g., the management computer system(s) 710 and/or the AI engine(s)) can generate recommendation(s) for the products that the user is qualified for, for instance including a recommendation 760 for the product 725, a recommendation 770 for the product 735, a recommendation 780 for the product 745, and/or a recommendation 790 for the product

755. The recommendation for a specific product can include UI element(s) (e.g., button(s), switch(es), slider(s), checkbox(es), radio button(s), other UI element(s), or combination(s) thereof) that trigger onboarding of the user onto the specific product, for instance to sign the user up for the specific product, to present further information (e.g., terms and conditions) and/or form(s) for the user related to initiating the specific product for the user, to register the user in a database or other data structure associated with the specific product, other onboarding operation(s), or combinations thereof. For instance, the recommendation 760 for the product 725 can include a UI element to initiate onboarding 765 of the user onto the product 725, the recommendation 770 for the product 735 can include a UI element to initiate onboarding 775 of the user onto the product 735, the recommendation 780 for the product 745 can include a UI element to initiate onboarding 785 of the user onto the product 745, and the recommendation 790 for the product 755 can include a UI element to initiate onboarding 795 of the user onto the product 755.

In some examples, the multi-product qualification analysis system 700 (e.g., the management computer system(s) 710 and/or the AI engine(s)) can generate the recommendation(s) (e.g., the recommendation 760, the recommendation 770, the recommendation 780, and/or the recommendation 790) dynamically and in real-time as the user information 705 and/or the product qualification criteria (e.g., product qualification criteria 720, product qualification criteria 730, product qualification criteria 740, product qualification criteria 750) continue to be received by the multi-product qualification analysis system 700. For instance, elements of user information 705, such as tracked transactions in a transaction history associated with the user, can continue to come in over time, and the multi-product qualification analysis system 700 can rapidly accommodate to the changes in the user information 705 to ensure that up-to-date user information 705 is used in determining what the user is qualified for and/or in generating the recommendations. Similarly, the product qualification criteria can undergo changes overt time, and the multi-product qualification analysis system 700 can rapidly accommodate to the changes in the product qualification criteria to ensure up-to-date product qualification criteria are used in determining what the user is qualified for and/or in generating the recommendations.

In some examples, the AI engine(s) that the management computer system(s) 710 uses to compare the user information 705 to the various product qualification criteria (e.g., product qualification criteria 720, product qualification criteria 730, product qualification criteria 740, product qualification criteria 750) also use this comparison to rank the various products (e.g., product 725, product 735, product 745, product 755) based on various factors. The factors can include, for instance, a level of suitability of the user's needs (e.g., how well the product suits the user's needs), amount that the product allows a user to spend (e.g., credit limit, loan amount), amount of interest to be incurred through use of the product (e.g., total and/or across a specific period of time), user preference(s) as to types of products (e.g., user prefers credit cards over installment loans or vice versa), merchant preference(s) as to types of products (e.g., merchant prefers that purchases be made using installment loans over credit cards or vice versa), of level of adherence to a specific rule or set of rules, another factor, or a combination thereof. Once the AI engine(s) rank the products that the user is qualified for to generate a ranking of the products that the user is qualified for, the multi-product qualification analysis system 700 (e.g., the management computer system(s) 710 and/or the AI engine(s)) present the recommendation(s) for the product(s) (e.g., the recommendation 760 for the product 725, the recommendation 770 for the product 735, the recommendation 780 for the product 745, and/or the recommendation 790 for the product 755) in an ordered list that is ordered according to the ranking of the products.

In some examples, the products may include secured credit card(s), unsecured credit card(s), private label credit card(s) (PLCC(s)), annual percentage rate (APR) credit card(s), business credit card(s), personal credit card(s), charge cards, installment loan(s), personal loan(s) on credit card(s) (PLCC(s)), healthcare loan(s), pet care loan(s), mortgage(s), student loan(s), debt consolidation loan(s), cash advance(s), home equity loan(s), payday loan(s), secured personal loan(s), unsecured personal loan(s), revolving line(s) of credit, line(s) of credit, title loan(s), credit card loan(s), small business loan(s), credit builder loan(s), "pay later" loans, financial product(s), or combinations thereof.

In an illustrative example, a user may submit a request to the multi-product qualification analysis system 700 (e.g., to the management computer system(s) 710) to ask which product(s) the user is qualified for, based on user information 705. The request is represented in FIG. 7 by a callout box with dashed lines reading "User: What product(s) am I qualified for?" The multi-product qualification analysis system 700 (e.g., the management computer system(s) 710 and/or the AI engine(s)) can compare the user information 705 to the various product qualification criteria (e.g., product qualification criteria 720, product qualification criteria 730, product qualification criteria 740, product qualification criteria 750) for the various products (e.g., product 725, product 735, product 745, product 755) to generate recommendations (e.g., recommendation 760, recommendation 770, recommendation 780, recommendation 790) for the various products. The recommendations may be ordered according to a ranking of the products by the multi-product qualification analysis system 700 (e.g., the management computer system(s) 710 and/or the AI engine(s)) according to various factors discussed herein. The recommendations may have UI elements for onboarding (e.g., onboarding 765, onboarding 775, onboarding 785, onboarding 795), at least for the products that the user is qualified for. The recommendation 760 is represented in FIG. 7 by a callout box with dashed lines reading "System: You're qualified for this product, and it's my top recommendation for you," indicating that the user is qualified for the product 725, and that the multi-product qualification analysis system 700 ranks the product 725 most highly for the user. The recommendation 760 may include a button or other UI element to initiate onboarding 765 of the user onto the product 725. The recommendation 770 is represented in FIG. 7 by a callout box with dashed lines reading "System: You're not qualified for this product, sorry," indicating that the user is not qualified for the product 735. The recommendation 780 is represented in FIG. 7 by a callout box with dashed lines reading "System: You're qualified for this product, and it's my secondary recommendation for you," indicating that the user is qualified for the product 745, and that the multi-product qualification analysis system 700 ranks the product 745 in second place for the user, after the product 725. The recommendation 780 may include a button or other UI element to initiate onboarding 785 of the user onto the product 745. The recommendation 790 is represented in FIG. 7 by a callout box with dashed lines reading "System: You're qualified for this product, and it's my tertiary recommendation for you," indicating that the user is qualified for the product 755, and that the multi-product qualification analysis system 700 ranks the product 755 in third place for the user, after the product 725 and the product 745. The recommendation 790 may include a button or other UI element to initiate onboarding 795 of the user onto the product 755.

The AI engines (e.g., AI engine(s) 722, AI engine(s) 732, AI engine(s) 742, and/or AI engine(s) 752) can include, for instance, one or more neural network (NN(s)), convolutional NN(s) (CNN(s)), trained time delay NN(s) (TDNN(s)), deep network(s), autoencoder(s) (AE(s)), variational AE(s) (VAE(s)), deep belief net(s) (DBN(s)), recurrent NN(s) (RNN(s)), generative adversarial network(s) (GAN(s)), conditional GAN(s) (cGAN(s)), support vector machine(s) (SVM(s)), random forest(s) (RF(s)), decision tree(s), NN(s) with fully connected (FC) layer(s), NN(s) with convolutional layer(s), computer vision system(s), deep learning system(s), classifier(s), transformer(s), clustering algorithm(s), reinforcement learning model(s), supervised learning model(s), unsupervised learning model(s), gradient boosting model(s), sequence-to-sequence (Seq2Seq) model(s), autoregressive (AR) model(s), large language model(s) (LLMs), or combinations thereof. Examples of LLMs that can be used can include, for instance, a Generative Pre-Trained Transformer (GPT) (e.g., GPT-2, GPT-3, GPT-3.5, GPT-4, and/or other GPT variant(s)). DaVinci, an LLM using Massachusetts Institute of Technology (MIT) langchain, Google® Bard®, Google® Gemini®, Large Language Model Meta AI (LLaMA), DeepSeek® R1, Alibaba® Qwen®, ByteDance® Doubao®, another LLM, or a combination thereof.

Within FIG. 7, a graphic representing the various AI engines (e.g., AI engine(s) 727, AI engine(s) 737, AI engine(s) 747, and/or AI engine(s) 757) illustrates a set of circles connected to another. Each of the circles can represent a node, a neuron, a perceptron, a layer, a portion thereof, or a combination thereof, for instance of a NN or other ML model. The circles are arranged in columns. The leftmost column of white circles represent an input layer. The rightmost column of white circles represent an output layer. Two columns of shaded circled between the leftmost column of white circles and the rightmost column of white circles each represent hidden layers. The lines between nodes can represent weights between nodes. Weights can be added, removed, strengthened, weakened, or otherwise updated as the AI engines are updated or further trained based on new training data.

In some examples, the product qualification criteria (e.g., product qualification criteria 720, product qualification criteria 730, product qualification criteria 740, product qualification criteria 750) can be stored in one or more data store(s), which can include, for instance, database(s), table(s), spreadsheet(s), list(s), array(s), arraylist(s), heap(s), tree(s), dictionar(ies), linked list(s), hash table(s), graph(s), stack(s), queue(s), trie(s), queap(s), distributed ledger(s), blockchain ledger(s), directed acyclic graph(s) (DAGs), data model(s), record(s), linked data structure(s), other data structure(s), or combination(s) thereof. In some examples, at least some of the user information 705 can be stored in any of the types of data store(s) discussed herein.

Figure 8:
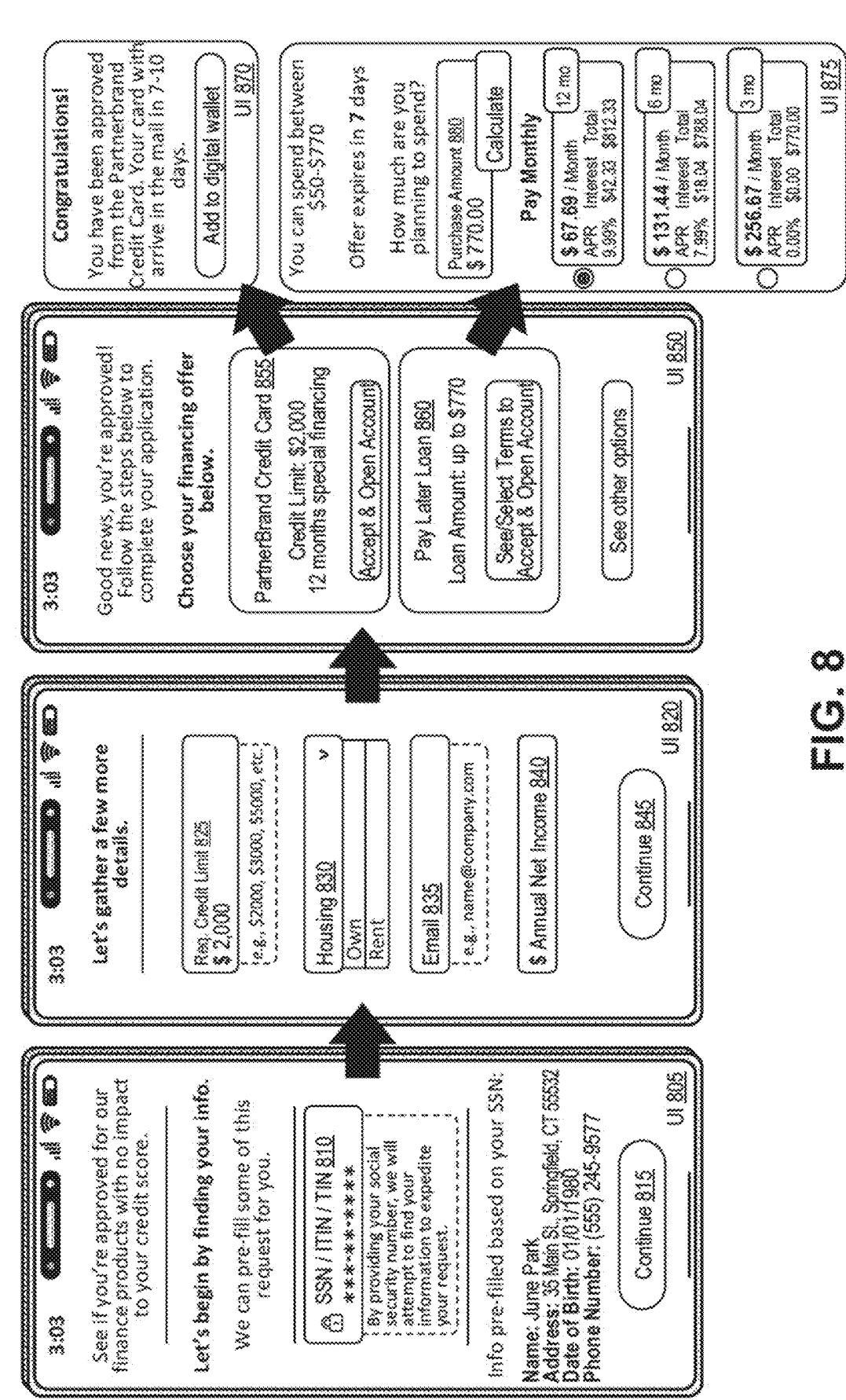
FIG. 8 is a conceptual diagram illustrating examples of user interfaces for obtaining user information associated with a user and providing an ordered list of recommendations for products that the user is qualified for, with the order of the list being based on one or more factors, in accordance with some examples.

FIG. 8 is a conceptual diagram 800 illustrating examples of user interfaces (UIs) (e.g., UI 805, UI 820, UI 850, UI 870, UI 875) for obtaining user information 705 associated with a user and providing an ordered list of recommendations for products that the user is qualified for, with the order of the list being based on one or more factors. The user interfaces are presented on a user device, illustrated as a mobile device (e.g., a phone, a tablet, a mobile handset, a portable game console, a portable media player device, a wearable device, a laptop, a desktop computer). In some examples, the user device can be a different type of device, such as a point of sale (POS) terminal, a card reader device, a payment instrument reader device, a server, or a combination thereof.

The user device (UI) 805 includes messages reading "see if you're approved for our finance products with no impact to your credit score," "let's begin by finding your info," and "we can pre-fill some of this request for you." The UI 805 includes a field 810 that requests that the user input an SSN of the user, an ITIN of the user, and/or a TIN of the user. The field 810 may be secured as indicated by the lock icon on the field 810, for instance indicating that the contents of the field will be encrypted before being transmitted further (e.g., to the management computer system(s) 710 and/or the AI engine(s) of FIG. 7), and/or that the contents of the field can be obscured (e.g., showing up in the UI 805 as a series of asterisks or other symbols rather than the actual characters entered by the user). For instance, the field 810 is illustrated in FIG. 8 as filled in with "*--****," which can represent an obscured variant of the SSN, ITIN, or TIN of the user. The UI 805 automatically pre-fills additional information about the user based on the information that the user enters into the field 810 (e.g., the user's SSN, ITIN, and/or TIN). For instance, the additional information that the UI 805 automatically pre-fills includes the name of the user (e.g., identified in FIG. 8 as "June Park"), the address of the user (e.g., identified in FIG. 8 as "35 Main St., Springfield, CT 55532"), the date of birth of the user (e.g., identified in FIG. 8 as Jan. 1, 1980), and the phone number of the user (e.g., identified in FIG. 8 as (1155) 845-9577). In some examples, the UI 805 receives the additional information that the UI 805 pre-fills by querying external source(s) (e.g., database(s)) using the information that the user enters into the field 810 (e.g., the user's SSN, ITIN, and/or TIN). In some examples, the UI 805 may include a button or other UI element that allows the user to edit any of the additional information that the UI 805 automatically pre-fills, for instance if the name, address, date of birth, or phone number includes error(s) and/or inaccuracie(s). The information that the user enters into the field 810 (e.g., the user's SSN, ITIN, and/or TIN) and the additional information pre-filled by the UI 805 can all be considered portion(s) of the user information 705. A continue button 815 allows the user device to proceed from the UI 805 to the UI 820.

The UI 820 includes a message reading "let's gather a few more details," and includes fields for collecting further user information (e.g., of the user information 705). For instance, the UI 820 includes a field 825 for identifying the user's requested credit limit. For instance, the user can identify, in the field 825, that the user would like a product with a credit limit (e.g., spend amount) of at least $2,000, at least $3,000, at least $5,000, at least $10,000, or another amount. The field 825 is illustrated in FIG. 8 as being filled in with a value of $2,000, as an illustrative example. The UI 820 includes a field 830 for identifying whether the user owns or rents their housing, which may impact the user's eligibility for certain products (e.g., product(s) that use a user's owned housing as collateral). The UI 820 includes a field 835 for identifying the user's email address, which the multi-product qualification analysis system 700 (e.g., the management computer system(s) 710) may in some cases use to send the recommendation(s) (e.g., recommendation 760, recommendation 770, recommendation 780, recommendation 790), information associated with product onboarding (e.g., onboarding 765, onboarding 775, onboarding 785, onboarding 795), and/or other notification(s) or alert(s) to. A continue button 845 allows the user device to proceed from the UI 822 to the UI 850.

The UI 850 includes a message reading "good news, you're approved!" The UI 850 also includes messages reading "follow the steps below to complete your application" and "choose your financing offer below." The UI 850 includes an ordered list of recommendations for two products that the user is approved for, including a PartnerBrand Credit Card 855 (with a credit limit of $2,000 and with 12 months of special financing) and a Pay Later Loan 860 (with a loan amount of up to $1570). In some examples, the PartnerBrand Credit Card 855 may be ranked higher than the Pay Later Loan 860 in the UI 850 because the credit limit of the PartnerBrand Credit Card 855 ($2,000) is higher than the maximum loan amount of the Pay Later Loan 860 ($1570). In fact, the credit limit of the PartnerBrand Credit Card 855 ($2,000) matches the requested credit limit filled into field 825 (also $2,000), making the PartnerBrand Credit Card 855 most suitable for the user's needs according to the user information 705 (e.g., according to the requested credit limit filled into field 825). The recommendation for the Partner-Brand Credit Card 855 includes a button with a message "accept & open account," which can initiate onboarding of the user to the PartnerBrand Credit Card 855 product, and can transfer the user device from the UI 850 to the UI 870. The recommendation for the Pay Later Loan 860 includes a button with a message "see/select terms to accept & open account," which can initiate onboarding of the user to the Pay Later Loan 860 product, and can transfer the user device from the UI 850 to the UI 875. The UI 850 also includes a "see other options" button that, in some examples, may show the user additional product(s) that the user qualifies for, but that are not recommended for the user (e.g., by the multi-product qualification analysis system 700), for instance because the additional product(s) are not suitable for the user's needs, the additional products have lower spend amount(s) than the recommended products, the additional product(s) go against the user's own stated preferences (e.g., not to use their home as collateral, for instance), and/or based on other factor(s).

The UI 870 includes messages reading "congratulations," "you have been approved from the Partnerbrand Credit Card," and "your card with arrive in the mail in 7-10 days." The UI 870 also includes a button with a message reading "add to digital wallet," which, if pressed by the user, can allow the Partnerbrand Credit Card to be added to a digital wallet (e.g., Apple® wallet, Google® wallet/pay, Samsung® pay, or another digital wallet service) so that the user can start using the Partnerbrand Credit Card immediately without having to wait for the physical card associated with the Partnerbrand Credit Card to arrive in the mail.

The UI 875 includes messages reading "you can spend between $50-$1570," indicating how much spending the Pay Later Loan 860 can cover, and "offer expires in 7 days," indicating that the user must decide whether to onboard onto the Pay Later Loan 860 product within 7 days or the offer to onboard onto the Pay Later Loan 860 product expires. The UI 875 includes a field 880 requesting a purchase amount, with a message asking "how much are you planning to spend?" The field 880 is illustrated in FIG. 8 as being filled in with a value of $1570, as an illustrative example. A "calculate" button next to the field 880 causes different selectable options for installment payment schedules to appear under a message reading "pay monthly." The different selectable options for installment payment schedules includes a first option for a 12-month installment loan at $67.69 per month, with 9.99% APR, $42.33 of total interest to be paid, and $1612.33 total amount to be paid. The different selectable options for installment payment schedules includes a second option for a 6-month installment loan at $731.44 per month, with 7.99% APR, $18.04 of total interest to be paid, and $1588.04 total amount to be paid. The different selectable options for installment payment schedules includes a third option for a 3-month installment loan at $856.67 per month, with 0.00% APR, $0.00 of total interest to be paid, and $1570.00 total amount to be paid. The UI 875 as illustrated in FIG. 8 illustrates the first option for the first installment payment schedule being selected via radio button, as an illustrative example. Selection of this installment payment schedule option can initiate onboarding of the user onto the Pay Later Loan 860 product using the selected installment payment schedule option.

In some examples, at least one of the recommendations for offers for products presented in the UI 850 (e.g., for the PartnerBrand Credit Card 855 product or for the Pay Later Loan 860 product) can be recalled from a previous round of decisioning, for instance being a previous offer that was previously offered to the user and is still valid. For instance, in an illustrative example, the user can have submitted a request for multi-product qualification analysis five days prior to the generation of the UI 850, and one of the offers from that previous multi-product qualification analysis can be the offer for the Pay Later Loan 860. Because the offer for the Pay Later Loan 860 is valid for 7 days, the offer for the Pay Later Loan 860 is still valid for the current multi-product qualification analysis. Thus, the previous offer for the Pay Later Loan 860 that is still valid can be included into the UI 850, without having to create a new offer.

In some examples, the multi-product qualification analysis system 700 (e.g., the management computer system(s) 710 and/or the AI engine(s)) can make decisions (e.g., that the user is qualified for the PartnerBrand Credit Card 855 product and for the Pay Later Loan 860 product) dynamically and in real-time as user information and/or the product qualification criteria continue to be received and/or modified. For instance, elements of user information can still be in gradually retrieved, as in the pre-filled content of UI 805 that may be queried based on content provided in the various fields of the UIs of FIG. 8, to ensure that up-to-date user information is used in determining what the user is qualified for and/or in generating the recommendations.

Figure 9:
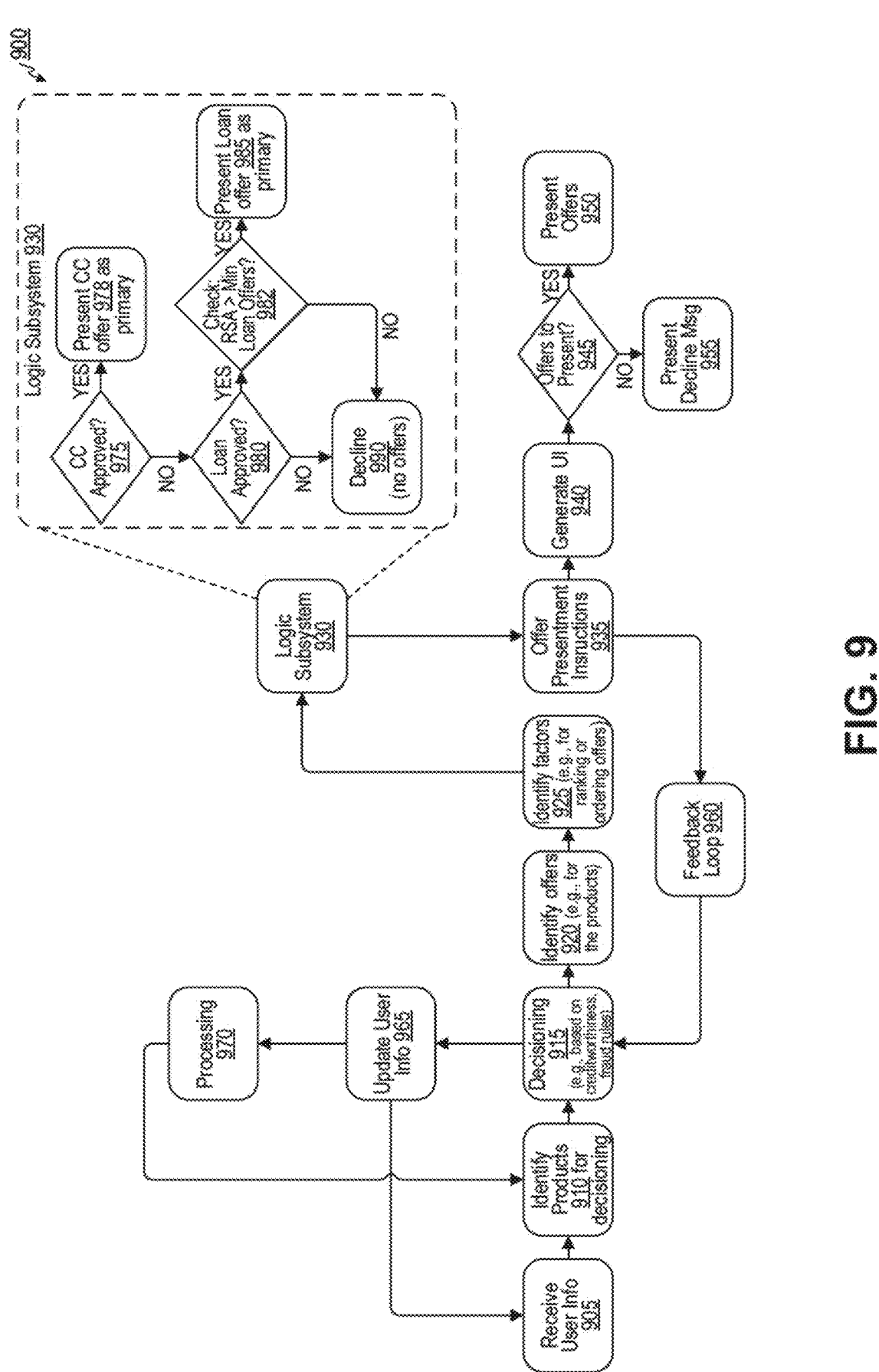
FIG. 9 is a block diagram illustrating an example architecture of a multi-product qualification analysis system that includes a logic subsystem and a feedback loop, in accordance with some examples.

FIG. 9 is a block diagram illustrating an example architecture of a multi-product qualification analysis system 900 that includes a logic subsystem 930 and a feedback loop 960. The multi-product qualification analysis system 900 performs a process for multi-product qualification analysis. The multi-product qualification analysis system 900 first receives user information 905, for instance as part of a request from a user for qualification decision(s) as to whether the user qualifies for various products. The user information 905 may be an example of the user information 705 and/or the user information of FIG. 8. The multi-product qualification analysis system 900 identifies products 910 about which qualification decisions should be made. For instance, the list of available products 910 (e.g., and/or offers available for those products) can update as time goes on, with different products 910 and/or offers being available at different times. For instance, in some examples, new products (e.g., and/or offers) can be newly added to the list of products 910 that are available. Similarly, in some examples, certain products (e.g., and/or offers) can be removed or discontinued from the list of products 910 that are available, and/or can be modified. The multi-product qualification analysis system 900 can retrieve product qualification criteria (e.g., product qualification criteria 720, product qualification criteria 730, product qualification criteria 740, product qualification criteria 750) for each of the products 910.

The multi-product qualification analysis system 900 performs decisioning 915 to identify which of the products 910 the user is qualified for, based on the user information 905, the respective product qualification criteria for each of the products 910, a creditworthiness analysis, fraud detection rules, additional considerations, or combinations thereof. For instance, in some examples, the product qualification criteria for a specific product can identify threshold(s) for creditworthiness for the specific product, and the multi-product qualification analysis system 900 can identify whether the user information 905 meets or exceeds the threshold(s) for creditworthiness for the specific product during the decisioning 915 to identify whether the user qualifies for the specific product. In some examples, the multi-product qualification analysis system 900 can analyze the user information 905 in light of fraud detection rules (e.g., the rules associated with the product qualification criteria and/or with the multi-product qualification analysis system 900 itself) to ensure that the probability of fraud is below a predetermined threshold (e.g., the threshold associated with the product qualification criteria and/or with the multi-product qualification analysis system 900 itself). In some examples, the decisioning 915 is performed using AI engine(s) and/or ML model(s) of the multi-product qualification analysis system 900.

Once the multi-product qualification analysis system 900 identifies the products that the user qualifies for during the decisioning 915, the multi-product qualification analysis system 900 can identify offers 920 associated with the products that the user qualifies for. The multi-product qualification analysis system 900 can also identify factors 925 to be used for ranking and/or ordering the offers 920 in a particular order. The factors 925 can include, for instance, a level of suitability of the user's needs (e.g., how well the product and/or offer suits the user's needs), amount that the product and/or offer allows a user to spend (e.g., credit limit, loan amount), amount of interest to be incurred through use of the product and/or offer (e.g., total and/or across a specific period of time), user preference(s) as to types of products and/or offers (e.g., user prefers credit cards over installment loans or vice versa), merchant preference(s) as to types of products and/or offers (e.g., merchant prefers that purchases be made using installment loans over credit cards or vice versa), of level of adherence to a specific rule or set of rules, another factor, or a combination thereof.

The multi-product qualification analysis system 900 includes a logic subsystem 930 that can make decisions as to how, and whether, to present certain offers (of the offers 920 for the subset of the products 910 that the user qualifies for) to the user through a UI 940 (e.g., UI 850) of a user device. The logic subsystem 930 generates offer presentment instructions 935 that are used by the multi-product qualification analysis system 900 to generate the UI 940. In some examples, the logic subsystem 930 can rank the offers to identify an order in which the offers are to be presented in the UI 940, for instance based on the factors 925. This ranking can be included in the offer presentment instructions 935 generated by the logic subsystem 930, so that the offers are presented in the UI 940 ordered according to the ranking. In some examples, logic subsystem 930 can remove specific offer(s) from the UI, for instance if the logic subsystem 930 determines that the specific offer(s) do not meet the user's needs (e.g., provide insufficient credit for the user to spend), and/or that the specific offer(s) fail to meet another threshold related to another one of the factor(s) 925. In some examples, such removals can be included in the offer presentment instructions 935 generated by the logic subsystem 930, so that the offers that are presented in the UI 940 omit the specific offer(s) that are to be removed. Ultimately, if offer presentment instructions 935 that are generated by the logic subsystem 930 indicate that there are offers to present (at decision 945), then the multi-product qualification analysis system 900 causes the user device to present the offers 950 through the UI generated via the offer presentment instructions 935. On the other hand, if offer presentment instructions 935 that are generated by the logic subsystem 930 indicate that there are no offers to present (at decision 945), then the multi-product qualification analysis system 900 causes the user device to present a decline message 955 through the UI generated via the offer presentment instructions 935, indicating that the user is either not qualified for any offers, or that the multi-product qualification analysis system 900 does not recommend any offers to the user (e.g., the user might qualify for one or more offers but the multi-product qualification analysis system 900 has determined that they are not recommended for the user based on the factors 925).

In an illustrative example, the logic subsystem 930 can check if the user is approved for a credit card 975 according to the decisioning 915. If the user is approved for the credit card 975 (e.g., as determined in the decisioning 915), the logic subsystem 930 can determine that the credit card offer 978 for the credit card 975 is to be presented as a primary offer (e.g., highest-ranked offer) and therefore presented first (before any other offer) in the UI 940. If the user is not approved for the credit card 975 (e.g., as determined in the decisioning 915), the logic subsystem 930 can next check if the user is approved for a loan 980 according to the decisioning 915. If the user is approved for the loan 980 (e.g., as determined in the decisioning 915), and if a check 982 confirms that a requested sale amount (RSA) associated with the loan 980 has a value greater than a minimum loan offer amount for the loan 980, then the logic subsystem 930 can determine that the loan offer 985 for the loan 980 is to be presented as a primary offer (e.g., highest-ranked offer) and therefore presented first (before any other offer) in the UI 940. If the user is not approved for the loan 980 (e.g., as determined in the decisioning 915), or if the check 982 indicates that the RSA associated with the loan 980 does not have a value greater than the minimum loan offer amount for the loan 980, the logic subsystem 930 can decline 990 to present either the CC offer 978 or the loan offer 985.

In some examples, the multi-product qualification analysis system 900 includes a feedback loop 960 through which the offer presentment instructions 935 can be fed into the decisioning 915 engine. For instance, in some examples, if the logic subsystem 930 determines that certain offers are not appropriate for a user (e.g., based on at least a subset of the factors 925) and should not be included in the UI 940, then in future rounds of decisioning 915, the decisioning 915 engine can in some cases decide not to identify those offers for the user in the first place. In some examples, through the feedback loop 960, the multi-product qualification analysis system 900 can perform an update 965 of the user information 905 based on the offer presentment instructions 935. For instance, the user information 905 can be updated (via the update 965) to include indications of which products the user has previously qualified for, which products and/or offers have previously been recommended to the user, or a combination thereof. In some examples, the multi-product qualification analysis system 900 can perform additional processing 970 to update the product qualification criteria for the products 910, and/or to modify the products 910 themselves, based on the offer presentment instructions 935. For instance, in some examples, the processing 970 can include modifying the product qualification criteria for the products 910 to avoid identifying products for users that the products would not be a good fit for (e.g., based on at least a subset of the factors 925). In some examples, the processing 970 can include modifying the products 910 themselves (and/or associated offers 920) to be more suitable for more users (e.g., based on at least a subset of the factors 925).

In some examples, the multi-product qualification analysis system 900 (e.g., the decisioning 915 and/or the logic subsystem 930) can generate the decisions as to whether the user has qualified for the products 910, the offer presentment instructions 935, and/or the UI 940 dynamically and in real-time as the user information 905, the product qualification criteria associated with the products 910, the offers 920, and/or the factors 925 continue to be received and/or updated by the multi-product qualification analysis system 900. This can ensure that the decisions as to whether the user has qualified for the products 910, the offer presentment instructions 935, and/or the UI 940 are generated based on up-to-date user information 905, the product qualification criteria associated with the products 910, the offers 920, and/or the factors 925.

Figure 10:
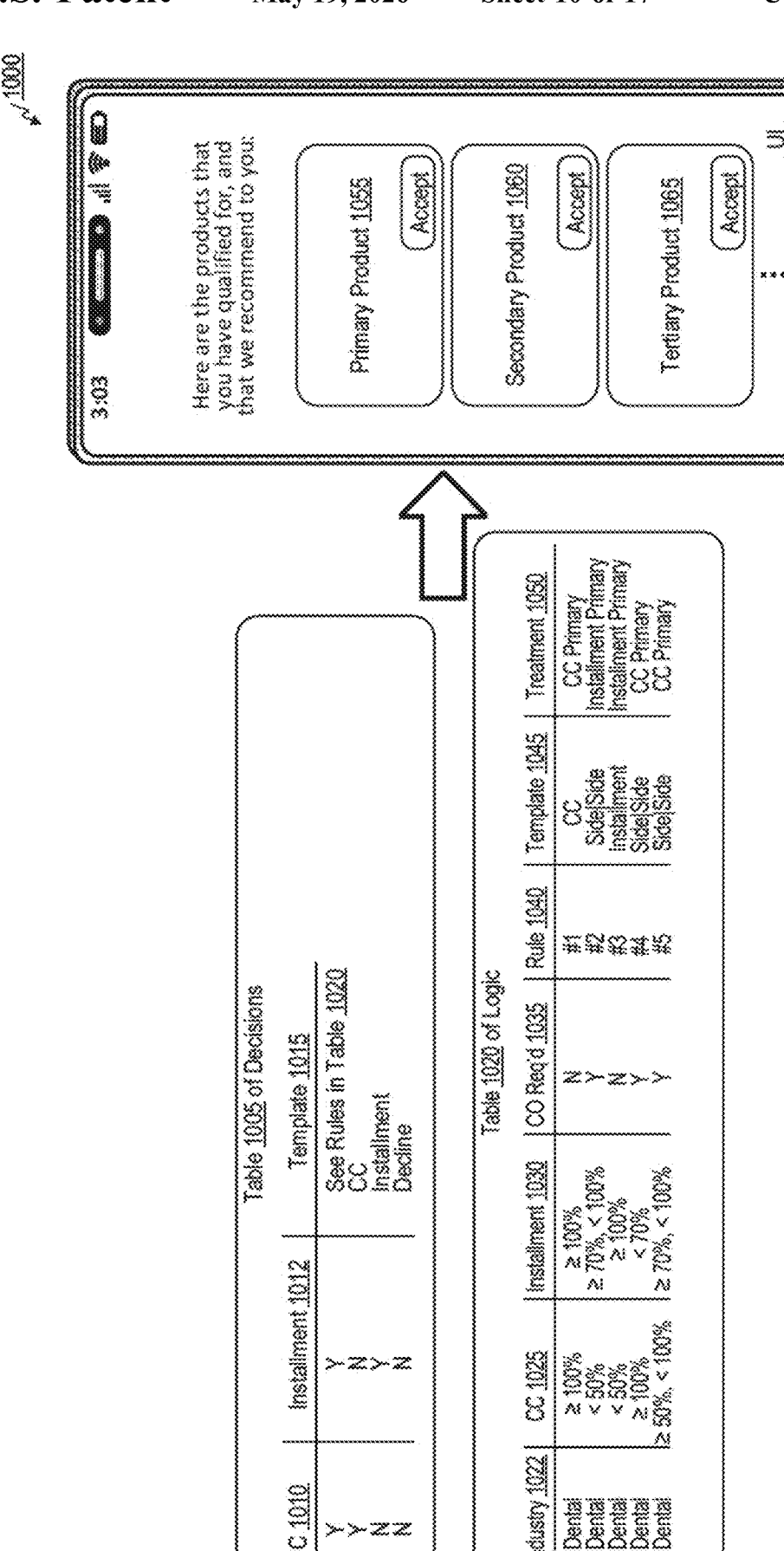
FIG. 10 is a conceptual diagram illustrating a table of decisions, a table of logic, and an example of a user interface that provides an ordered list of recommendations for products, with the order of the list being based on one or more factors associated with the table of decisions and the table of logic, in accordance with some examples.

FIG. 10 is a conceptual diagram 1000 illustrating a table 1005 of decisions, a table 1020 of logic, and an example of a user interface (UI) (UI 1070) that provides an ordered list of recommendations for products, with the order of the list being based on one or more factors associated with the table 1005 of decisions and the table 1020 of logic. The table 1005 of decisions indicates that, if a user is determined (at decisioning 915) to be eligible for both a credit card 1010 and an installment loan 1012, then the template 1015 for that user's offer(s) is determined by the table 1020 of logic. The table 1005 of decisions indicates that, if a user is determined (at decisioning 915) to be eligible for the credit card 1010 but not the installment loan 1012, then the template 1015 for that user's offer(s) is a credit card offering template to offer the credit card 1010. The table 1005 of decisions indicates that, if a user is determined (at decisioning 915) to be eligible for the installment loan 1012 but not the credit card 1010, then the template 1015 for that user's offer(s) is a installment loan offering template to offer the installment loan 1012. The table 1005 of decisions indicates that, if a user is determined (at decisioning 915) to be eligible for neither the credit card 1010 nor the installment loan 1012, then the template 1015 for that user's offer(s) is a decline template to indicate that the user has been declined qualification for either product.

The table 1020 of logic illustrates, an example in which a user requests to take out a $5000 loan for a dental procedure. The industry 1022 is listed as dental. In a first rule (of the rules 1040) in the first row of the table 1020 of logic, the credit card coverage 1025 indicates that the credit card 1010 covers greater than or equal to 700% of the user's needs, the installment loan coverage 1030 indicates that the installment loan 1012 covers greater than or equal to 700% of the user's needs, a counter-offer 1035 is not required, a template 1045 for the UI is a credit card template with a treatment 1050 indicating that the credit card should be provided as the primary product ranked above any other product(s) (e.g., because, in some examples, users and/or merchants may generally prefer credit cards over installment loans, all else being equal). In a second rule (of the rules 1040) in the second row of the table 1020 of logic, the credit card coverage 1025 indicates that the credit card 1010 covers less than 50% of the user's needs, the installment loan coverage 1030 indicates that the installment loan 1012 covers 70% to 700% of the user's needs, a counter-offer 1035 is required, a template 1045 for the UI is a side-to-side template with a treatment 1050 indicating that the installment loan should be provided as the primary product ranked above any other product(s) (e.g., because the installment loan here covers more of the user's needs than the credit card). In a third rule (of the rules 1040) in the third row of the table 1020 of logic, the credit card coverage 1025 indicates that the credit card 1010 covers less than 50% of the user's needs, the installment loan coverage 1030 indicates that the installment loan 1012 covers greater than or equal to 700% of the user's needs, a counter-offer 1035 is not required, a template 1045 for the UI is an installment loan template with a treatment 1050 indicating that the installment loan should be provided as the primary product ranked above any other product(s) (e.g., because the installment loan here covers more of the user's needs than the credit card). In a fourth rule (of the rules 1040) in the fourth row of the table 1020 of logic, the credit card coverage 1025 indicates that the credit card 1010 covers greater than or equal to 700% of the user's needs, the installment loan coverage 1030 indicates that the installment loan 1012 covers only up to 70% of the user's needs, a counter-offer 1035 is required, a template 1045 for the UI is a side-to-side template with a treatment 1050 indicating that the credit card should be provided as the primary product ranked above any other product(s) (e.g., because the credit card here covers more of the user's needs than the installment loan). In a fifth rule (of the rules 1040) in the fifth row of the table 1020 of logic, the credit card coverage 1025 indicates that the credit card 1010 covers 50% to 700% of the user's needs, the installment loan coverage 1030 indicates that the installment loan 1012 covers 70% to 700% of the user's needs, a counter-offer 1035 is required, a template 1045 for the UI is a side-to-side template with a treatment 1050 indicating that the credit card should be provided as the primary product ranked above any other product(s) (e.g., because, in some examples, users and/or merchants may generally prefer credit cards over installment loans, all else being equal).

An example user interface (UI) 1070 is illustrated. The UI 1070 is displayed on a user device (e.g., a mobile handset), and includes a message reading "here are the products that you have qualified for, and that we recommend to you." The UI 1070 lists a primary product 1055 (with an accept button that allows a user to onboard onto the primary product 1055), a secondary product 1060 (with an accept button that allows a user to onboard onto the secondary product 1060), and a tertiary product 1065 (with an accept button that allows a user to onboard onto the tertiary product 1065). An ellipsis at the bottom of the UI 1070 indicates that more products may also be listed after the tertiary product 1065. In some examples, the primary product 1055 may be the credit card 1010, the installment loan 1012, or another product. In some examples, different variations on a product may be listed as different products in the UI 1070. For instance, in reference to the UI 875, the 12-month installment loan variant of a loan may be listed as a first product in the in the UI 1070, the 6-month installment loan variant of the loan may be listed as a second product in the in the UI 1070, the 3-month installment loan variant of the loan may be listed as a third product in the in the UI 1070, and so forth.

In some examples, the template 1045 being the side-to-side template as referenced in the table 1020 of logic refers to a UI that displays multiple products that the user can select from, as in the UI 1070 or the UI 850. In some examples, the template 1045 being the credit card template may indicate that the credit card 1010 is the primary product 1055. In some examples, the template 1045 being the credit card template may indicate that the credit card 1010 is not only the primary product 1055, but the only product in the UI 1070, with the secondary product 1060 and tertiary product 1065 missing from the UI 1070. In some examples, the template 1045 being the installment loan template may indicate that the installment loan 1012 is the primary product 1055. In some examples, the template 1045 being the installment loan template may indicate that the installment loan 1012 is not only the primary product 1055, but the only product in the UI 1070, with the secondary product 1060 and tertiary product 1065 missing from the UI 1070.

Figure 11:
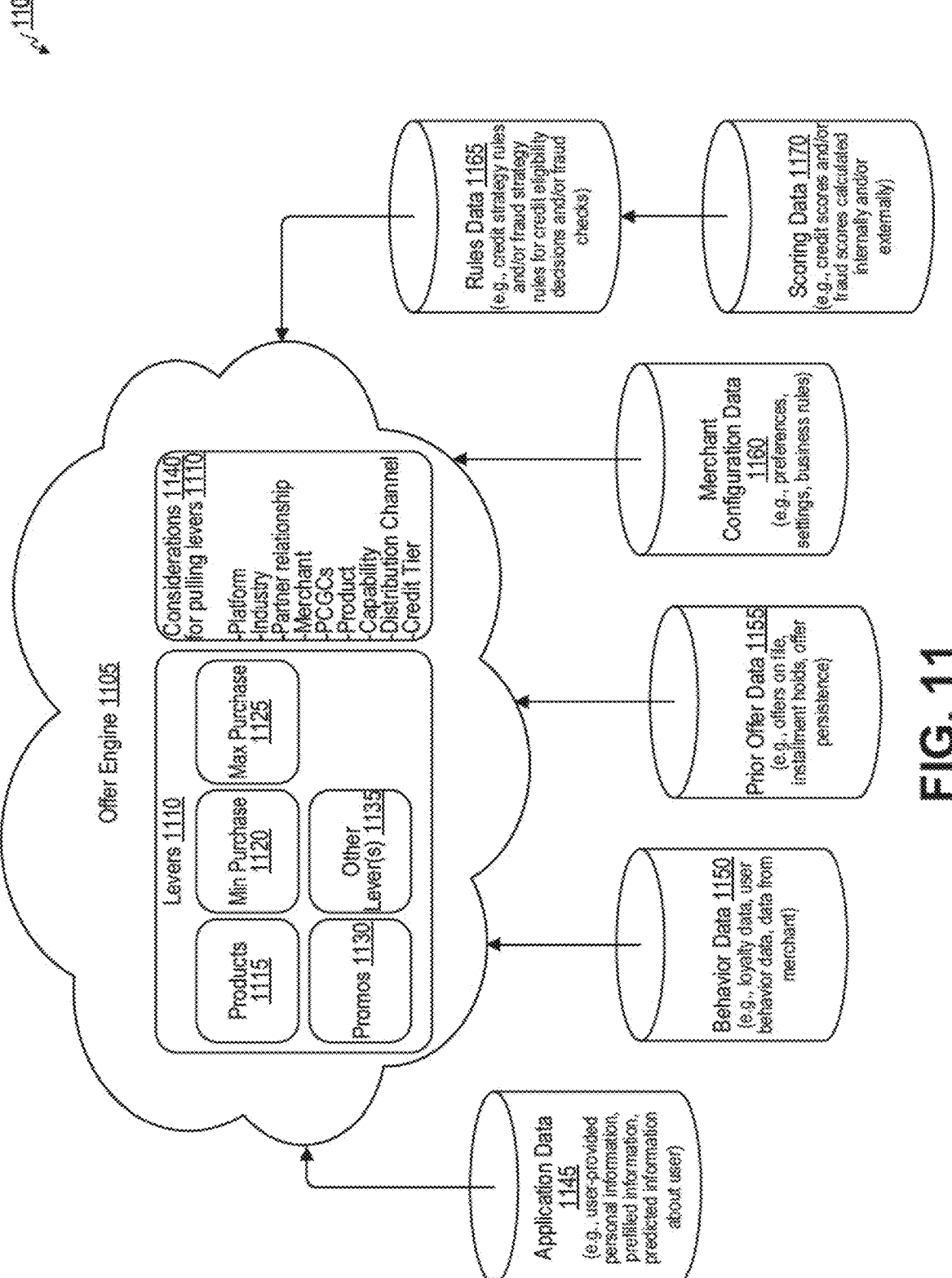
FIG. 11 is a block diagram illustrating an example architecture of a multi-product qualification analysis system that includes an offer engine that obtains information from various data sources and uses the information to pull various levers based on various considerations, in accordance with some examples.

FIG. 11 is a block diagram illustrating an example architecture of a multi-product qualification analysis system 1100 that includes an offer engine 1105 that obtains information from various data sources and uses the information to pull various levers 1110 based on various considerations 1140. The offer engine 1105 can serve as a model that is built on the various data from the data sources and that can be modified dynamically as the data is coming in. The model can be used to guide decisioning (e.g., decisioning 915), for instance with respect to which product(s) a user is qualified for or not, as well as a ranking or order in which product(s) (and/or associated offer(s)) are to be presented to a given user. The levers 1110 represent aspects of the model that can be modified to adjust decisioning, with "pulling" a specific lever referring to modifying that aspect of the model in the offer engine 1105. The levers 1110 that the offer engine 1105 can pull include the products 1115 (e.g., which products are offered), a minimum purchase 1120 threshold (e.g., a minimum loan and/or spend amount), a maximum purchase 1125 threshold (e.g., a maximum loan and/or spend amount), one or more promotions 1130 (e.g., discount(s), coupon(s), loyalty program(s), sale(s), bundle(s), giveaway(s), buy-one-get-one (BOGO) offer(s), free gift(s), competition(s), or combination(s) thereof), one or more other lever(s) 1135, or combination(s) thereof. The offer engine 1105 can pull lever(s) of the levers 1110 based on various considerations 1140, including platform, industry, partner relationship, merchant, product code-group codes (PCGCs), products, capabilities, distribution channels, credit tiers, other considerations, or combinations thereof.

The data sources that the offer engine 1105 can build and/or modify the model based on, and/or that the model associated with the offer engine 1105 can make decisions based on, include application data 1145 data store(s), behavior data 1150 data store(s), prior offer data 1155 data store(s), merchant configuration data 1160 data store(s), rules data 1165 data store(s), and/or scoring data 1170 data store(s). The application data 1145 in the application data 1145 data store(s) can include user-provided personal information (e.g., personal identifying information (PII) and/or other data received via a user interface), pre-filled information (e.g., as in the pre-filled information in the UI 805), predicted information (e.g., information about a user that is predicted based on their other information), other information about a user, and/or other information about a request or application submitted by the user. The behavior data 1150 in the behavior data 1150 data store(s) can include information about a user's loyalty to a merchant or store, a user purchase history, a purchase history associated with a merchant, data from merchant(s), other behavior data, or combinations thereof. The prior offer data 1155 in the prior offer data 1155 data store(s) can include information about prior offer(s) that a user qualified for, prior offer(s) that a user failed to qualify for, prior offer(s) that were recommended to a user, prior offer(s) that were not recommended to a user, prior offer(s) that are still open to a user (e.g., the offer(s) were provided to the user and still have not expired), prior offer(s) that have expired and are no longer open to the user, offer(s) on file, installment holds, data about persistence of offers, other prior offers, or combinations thereof. The merchant configuration data 1160 in the merchant configuration data 1160 data store(s) can include merchant preferences, merchant settings, merchant business rules, merchant-specific APRs, merchant-specific interest rates, merchant-preferred products, merchant-specific products (e.g., private label credit cards), or combinations thereof. The rules data 1165 in the rules data 1165 data store(s) can include credit strategy rules for credit eligibility decisions (e.g., to determine if a user qualifies for a given product), fraud strategy rules for fraud checks (e.g., for fraud attempt detection), or combinations thereof. The scoring data 1170 in the scoring data 1170 data store(s) can include credit scores, fraud scores, and/or other scores, with may be calculated internally (e.g., by the offer engine 1105 or an associated system) and/or externally (e.g., by a credit bureau or other institution).

In some examples, the multi-product qualification analysis system 1100 can generate the decisions regarding pulling the various levers 1110 dynamically and in real-time as the information from the various data sources (e.g., application data 1145 data store(s), behavior data 1150 data store(s), prior offer data 1155 data store(s), merchant configuration data 1160 data store(s), rules data 1165 data store(s), scoring data 1170 data store(s)) continues to be received by, and/or updated at, the multi-product qualification analysis system 1100. This can ensure that the decisions regarding pulling the various levers 1110 are made based on up-to-date information from the data sources and/or considerations 1140.

Figure 12:
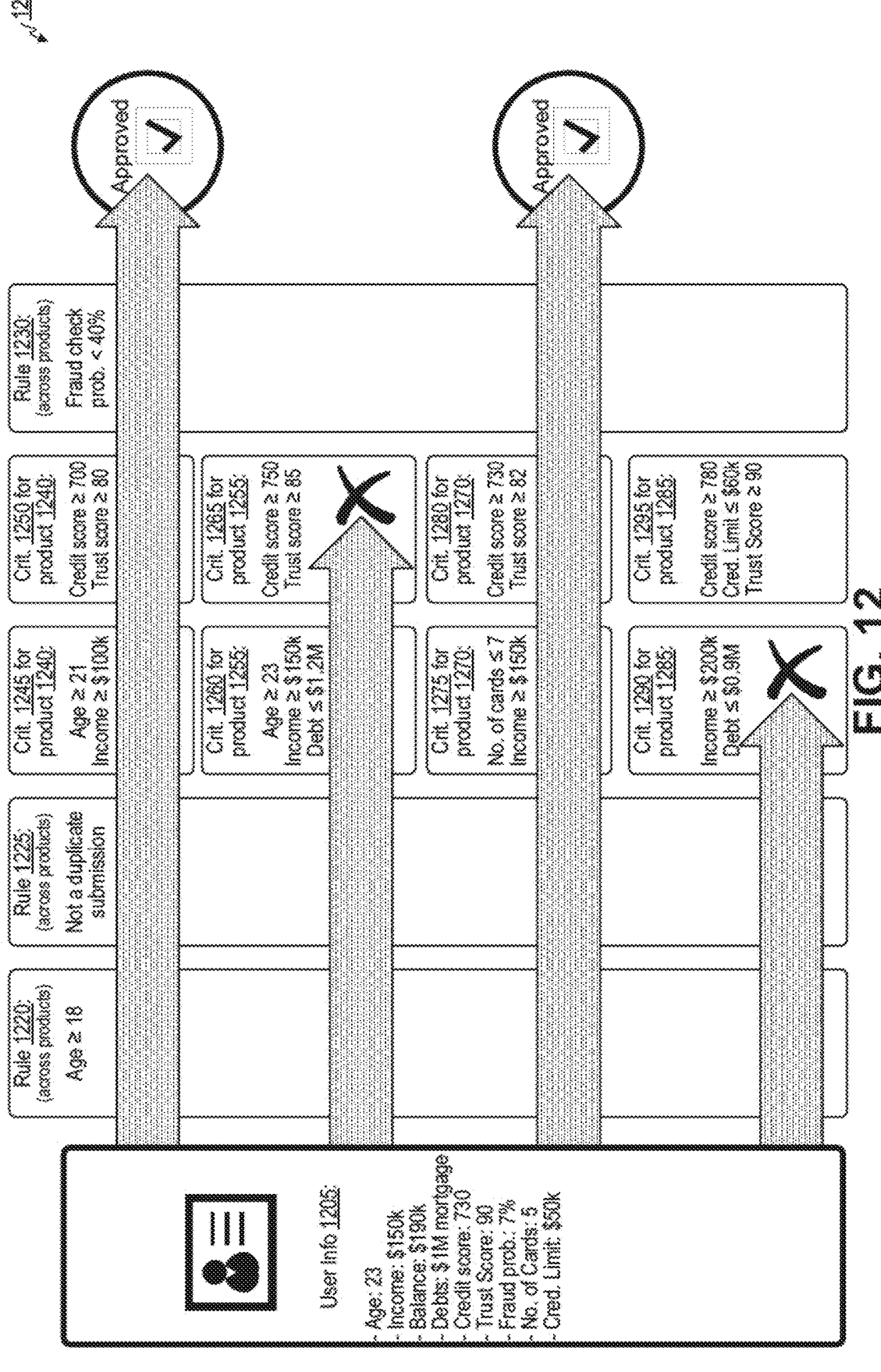
FIG. 12 is a block diagram illustrating an example of analyses of user data for a user using various rules and product qualification criteria, in accordance with some examples.

FIG. 12 is a block diagram illustrating an example of analyses 1200 of user data 1205 for a user using various rules and product qualification criteria. For instance, the user data 1205 for the example user of FIG. 12 shows that the example user is 23 years old, has an income of $150 k, has an account balance of $190 k, has debts of $1 M (for a mortgage), has a credit score of 730, has a trust score of 90 (e.g., an example of the score(s) 1332 generated by the ML model(s) 1325), has a fraud probability of only 7% (e.g., fraud probability 1338), has a total of 5 credit cards, and has a total credit limit (across all 5 cards) of $50 k.

A first rule 1220, which is product-agnostic (e.g., across all products) requires the user's age to be 18 or older. Because the user data 1205 indicates that the user is 23, the user is successful in passing the rule 1220.

A second rule 1225, which is also product-agnostic (e.g., across all products), requires that the request or application that the user has submitted requesting qualification analysis for one or more products, services, or programs (or that another entity such as a merchant has submitted on behalf of the user) is not a duplicate (e.g., as in the duplicate check 250B and/or the duplicate check 525).

A first product 1240 has a first set of qualification criteria 1245 indicating that, to qualify for the product 1240, a user's age must be at least 21 and the user's income must be at least $100 k. Based on the user data 1205, the user passes these qualification criteria 1245 for the first product 1240.

The first product 1240 has a second set of qualification criteria 1250 indicating that, to qualify for the product 1240, a user's credit score must be at least 700 and the user's trust score must be at least 80. Based on the user data 1205, the user passes these qualification criteria 1245 for the first product 1240. The second set of qualification criteria 1250 can be checked after the first set of qualification criteria 1245 to avoid running a credit check on the user until the user passes the first set of qualification criteria 1245, and/or to reduce computational resource expenditure (and thus improve efficiency) by avoiding a potentially computationally expensive trust score calculation (e.g., calculation of the score(s) 1332 by the ML model(s) 1325).

A second product 1255 has a first set of qualification criteria 1260 indicating that, to qualify for the product 1255, a user's age must be at least 23, the user's income must be at least $150 k, and the user must have no more than $1.2 M in debt. Based on the user data 1205, the user passes these qualification criteria 1260 for the second product 1255.

The second product 1255 has a second set of qualification criteria 1265 indicating that, to qualify for the product 1255, a user's credit score must be at least 750 and the user's trust score must be at least 85. Based on the user data 1205, the user does not pass these qualification criteria 1265 for the second product 1255. Thus, the user does not qualify for the second product 1255. The user is not eligible of the second product 1255.

A third product 1270 has a first set of qualification criteria 1275 indicating that, to qualify for the product 1270, a user must have no more than 7 cards and the user's income must be at least $150 k. Based on the user data 1205, the user passes these qualification criteria 1275 for the third product 1270.

The third product 1270 has a second set of qualification criteria 1280 indicating that, to qualify for the product 1270, a user's credit score must be at least 730 and the user's trust score must be at least 82. Based on the user data 1205, the user passes these qualification criteria 1280 for the third product 1270.

A fourth product 1285 has a first set of qualification criteria 1290 indicating that, to qualify for the product 1285, a user's income must be at least $200 k, and the user's debt can be no more than $0.9 M. Based on the user data 1205, the user does not pass these qualification criteria 1290 for the fourth product 1285. Thus, the user does not qualify for the fourth product 1285. The user is not eligible of the fourth product 1285.

The fourth product 1285 has a second set of qualification criteria 1295 indicating that, to qualify for the product 1285, a user's credit score must be at least 780, the user's total credit limit can be no more than $60 k, and the user's trust score must be at least 90. Based on the user data 1205, the user does not pass these qualification criteria 1295 for the fourth product 1285. However, because the user already did not pass the first set of qualification criteria 1290 for the fourth product 1285, the system does not need to check the user data 1205 against the second set of qualification criteria 1295 at all. Thus, the system avoid running a credit check on the user and reduces computational resource expenditure (improving efficiency) by avoiding a potentially computationally expensive trust score calculation.

A third rule 1230, which is also product-agnostic (e.g., across all products), requires that a fraud check probability (e.g., fraud check 275, fraud probability 1338) be under 40%. The third rule 1230 can be checked after various qualification criteria to reduce computational resource expenditure (and thus improve efficiency) by avoiding a potentially computationally expensive fraud probability calculation (e.g., calculation of the fraud probability 1338 by the ML model(s) 1325). In some examples, the fraud probability calculation can rely in part on a credit score, and thus, the third rule 1230 can be checked after various qualification criteria to avoid running a credit check on the user until the user passes the first set of qualification criteria for at least one of the products. Because the user data 1205 indicates that the user's fraud probability is only 7% (e.g., less than the 40% threshold of the third rule 1230), the user passes the third rule 1230 for any products for which the user is otherwise qualified.

Thus, at the end of the analyses 1200, the user (corresponding to the user data 1205) is approved (e.g., eligible, qualified) for the first product 1240 and the third product 1270, and is denied (e.g., ineligible, unqualified) from the second product 1255 and the fourth product 1285.

Figure 13:
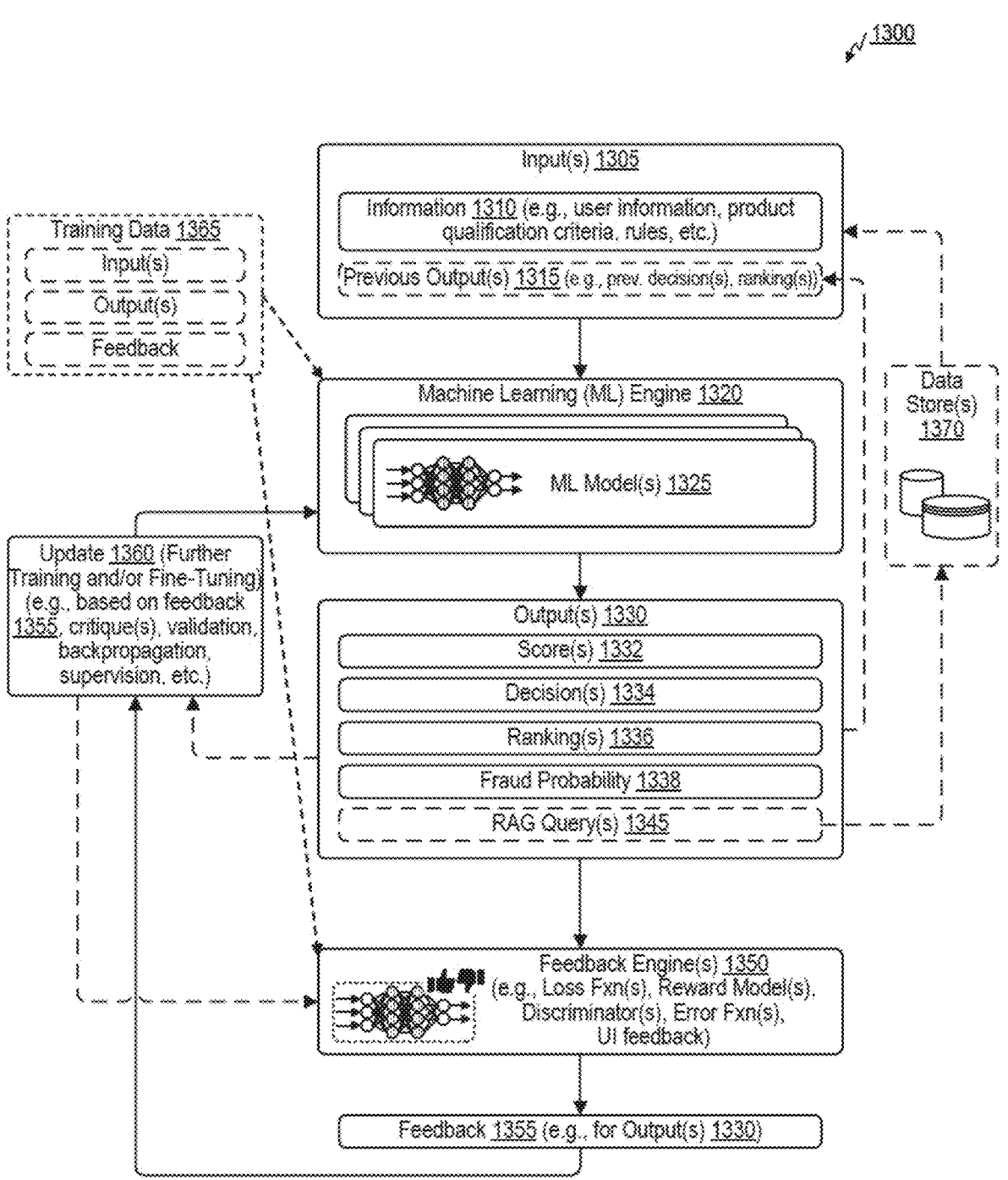
FIG. 13 is a block diagram illustrating an example of a machine learning system for training, use of, and/or updating of one or more machine learning model(s) that are used to generate score(s), decision(s), and/or ranking(s), in accordance with some examples.

FIG. 13 is a block diagram illustrating an example of a machine learning system 1300 for training, use of, and/or updating of one or more machine learning model(s) 1325 that are used to generate score(s) 1332, decision(s) 1334, and/or ranking(s) 1336. The machine learning (ML) system 1300 includes an ML engine 1320 that generates, trains, uses, and/or updates one or more ML model(s) 1325. In some examples, the AI engine(s) 195, the AI engine(s) 295, the choreography engine 515, the strategy engine 545, ML model(s) 640, the AI engine(s) 727, the AI engine(s) 737, the AI engine(s) 747, the AI engine(s) 757, the analyses 1200, the analysis system that performs the process 1400, the analysis system that performs the process 1500, and/or the computing system 1700 include the ML system 1300, the ML engine 1320, the ML model(s) 1325, and/or the feedback engine(s) 1350, or vice versa.

The ML model(s) 1325 can include, for instance, one or more neural network(s) (NN(s)), one or more convolutional NN(s) (CNN(s)), one or more time delay NN(s) (TDNN(s)), one or more deep network(s) (DN(s)), one or more autoencoder(s) (AE(s)), one or more variational autoencoder(s) (VAE(s)), one or more deep belief net(s) (DBN(s)), one or more recurrent NN(s) (RNN(s)), one or more generative adversarial network(s) (GAN(s)), one or more conditional GAN(s) (cGAN(s)), one or more feed-forward network(s), one or more network(s) having fully connected layers, one or more support vector machine(s) (SVM(s)), one or more random forest(s) (RF), one or more computer vision (CV) system(s), one or more autoregressive (AR) model(s), one or more Sequence-to-Sequence (Seq2Seq) model(s), one or more large language model(s) (LLM(s)), one or more deep learning system(s), one or more classifier(s), one or more transformer(s), or a combination thereof. In examples where the ML model(s) 1325 include LLMs, the LLMs can include, for instance, a Generative Pre-Trained Transformer (GPT) (e.g., GPT-2, GPT-3, GPT-3.5, GPT-4, etc.), DaVinci or a variant thereof, an LLM using Massachusetts Institute of Technology (MIT)® langchain, Pathways Language Model (PaLM), Large Language Model Meta® AI (LLaMA), Language Model for Dialogue Applications (LaMDA), Bidirectional Encoder Representations from Transformers (BERT), Falcon (e.g., 40B, 7B, 1B), Orca, Phi-1, StableLM, variant(s) of any of the previously-listed LLMs, or a combination thereof.

Within FIG. 13, a graphic representing the ML model(s) 1325 illustrates a set of circles connected to one another. Each of the circles can represent a node, a neuron, a perceptron, a layer, a portion thereof, or a combination thereof. The circles are arranged in columns. The leftmost column of white circles represent an input layer. The right-most column of white circles represent an output layer. Two columns of shaded circled between the leftmost column of white circles and the rightmost column of white circles each represent hidden layers. An ML model can include more or fewer hidden layers than the two illustrated, but includes at least one hidden layer. In some examples, the layers and/or nodes represent interconnected filters, and information associated with the filters is shared among the different layers with each layer retaining information as the information is processed. The lines between nodes can represent node-to-node interconnections along which information is shared. The lines between nodes can also represent weights (e.g., numeric weights) between nodes, which can be tuned, updated, added, and/or removed as the ML model(s) 1325 are trained and/or updated. In some cases, certain nodes (e.g., nodes of a hidden layer) can transform the information of each input node by applying activation functions (e.g., filters) to this information, for instance applying convolutional functions, downscaling, upscaling, data transformation, and/or any other suitable functions.

In some examples, the ML model(s) 1325 can include a feed-forward network, in which case there are no feedback connections where outputs of the network are fed back into itself. In some cases, the ML model(s) 1325 can include a recurrent neural network, which can have loops that allow information to be carried across nodes while reading in input. In some cases, the network can include a convolutional neural network, which may not link every node in one layer to every other node in the next layer.

One or more input(s) 1305 can be provided to the ML model(s) 1325. The ML model(s) 1325 can be trained by the ML engine 1320 (e.g., based on training data 1365) to generate one or more output(s) 1330. In some examples, the input(s) 1305 include information 1310. The information 1310 can include user information, such as data from the data lake system 130, data from the data source(s) 160, data from the client terminal(s) 190, the request 210, data from the core subsystem 205, data from the analysis subsystem 230, data from the data store 280, the JSON payload of operation 305, the client information of operation 310 or operation 315, the data from the services in operation 420, data analyzed by the analysis engine 505, data generated and/or received by the analysis engine 505, data generated and/or received by the choreography engine 515, data generated and/or received by the strategy engine 545, the request of operation 620, user information about the user of operation 620, the user information 705, the user information provided into the UIs of FIG. 8, the user information pre-filled in the UI 805, product(s) that a user may be interested in (e.g., the requested credit limit in field 825 of the UI 820 or the housing ownership in field 830 of the UI 820), information relevant to whether or not a user might qualify for a given product (e.g., annual net income as in field 840, asset(s) owned by the user, debts that the user already owes), the user information 905, user information from the data store(s) of FIG. 11 (e.g., application data 1145 data store(s), behavior data 1150 data store(s), prior offer data 1155 data store(s), merchant configuration data 1160 data store(s), rules data 1165 data store(s), scoring data 1170 data store(s)), the user data 1205, the user account data of operation 1505, the user information of operation 1605, other user information discussed herein, or a combination thereof.

The information 1310 can include rules and/or product qualification criteria, such as the rules of the rules engine of FIG. 1, rules associated with the analyses of FIG. 2 (e.g., of the analysis subsystem 230, the fraud check 275, and/or the AI engine(s) 295), the user-based rules 550, the request-based rules of FIG. 5, the transaction-based rules 555, the fraud detection rules 560, the product qualification criteria 720, the product qualification criteria 730, the product qualification criteria 740, the product qualification criteria 750, the rule 1220, the rule 1225, the rule 1230, the qualification criteria 1245, the qualification criteria 1250, the qualification criteria 1260, the qualification criteria 1265, the qualification criteria 1275, the criteria 1280, the qualification criteria 1290, the qualification criteria 1295, the first set of rules of operation 1505, the second set of rules of operation 1520, the qualification criteria of operation 1610, other rules discussed herein, other product qualification criteria discussed herein, or combinations thereof. The rules and/or product qualification criteria may identify criteria (e.g., minimum thresholds, maximum thresholds, acceptable ranges, unacceptable ranges, conditions) for various values (e.g., user income, user assets, user debts) associated with the user information 1310 that dictate whether or not a user qualifies for a given product.

In some examples, the input(s) 1305 can include prompt(s) (e.g., to an LLM). In some examples, the input(s) 1305 can include information retrieved from data store(s) 1370, for instance via retrieval augmented generation (RAG) (e.g., via RAG query(s) 1345). In some examples, the input(s) 1305 can include prompt(s) that are modified and/or enhanced using information retrieved from data store(s) 1370, for instance via retrieval augmented generation (RAG) (e.g., via RAG query(s) 1345).

The output(s) 1330 that ML model(s) 1325 generate by processing the input(s) 1305 (e.g., the information 1310 and/or the previous output(s) 1315) can include score(s) 1332, decision(s) 1334, ranking(s) 1336, fraud probability(s) 1338, and/or RAG query(s) 1345. The score(s) 1332 can include, for instance, the ML output 645, score(s) associated with the scoring data 1170, the trust scores of the 1200, risk scores, reputation scores, credit scores, other scores discussed herein, score(s) in the output 1440, scores used in the analyses of the process 1500, scores used in the analyses of the process 1600, or a combination thereof.

The decision(s) 1334 can include, for instance, decisions made by the computing system 105, the decision 290, a decision in the response of operation 335, a decision in the response of operation 440, a decision associated with the decisioning 575, the decision of operation 650, the recommendation 760, the recommendation 770, the recommendation 780, the recommendation 790, decision(s) indicated in the UI 850, decision(s) indicated in the UI 870, decision(s) indicated in the UI 875, the decisions that the user is qualified for the Partnerbrand Credit Card 855 and the Pay Later Loan 860 presented in the UI 850, decision(s) associated with the decisioning 915, decision(s) associated with the offers of the multi-product qualification analysis system 900, decision(s) in the table 1005 of the decisions (e.g., under the template 1015 column), decision(s) in the table 1020 of logic (e.g., under the template 1045 and/or treatment 1050 column(s)), decision(s) indicated in the UI 1070 (e.g., that the user is qualified for the primary product 1055, the secondary product 1060, the tertiary product 1065), decision(s) made by the offer engine 1105, the approval of the user for the first product 1240 and the third product 1270 as a result of the analyses 1200, the disapproval of the user for the second product 1255 and the fourth product 1285 as a result of the analyses 1200, decision(s) in the output 1440, decision(s) reached as a result of the of the analyses of the process 1500 (e.g., the preliminary validation decision, the secondary validation decision, the ultimate decision for eligibility for the program), decision(s) reached as a result of the of the analyses of the process 1600 (e.g., the preliminary decision, the qualification decision, the recommendations of operation 1630), other decisions discussed herein, other recommendations discussed herein, or a combination thereof. In some examples, the decision(s) 1334 can be used as input(s) 1305 to the ML model(s) 1325 (e.g., as one of the previous output(s) 1315) for generating future decision(s) 1334, for generating ranking(s) 1336, for generating probability(s) 1338, and/or for generating other output(s) 1330.

The ranking(s) 1336 can indicate the order in which certain products (and/or offers associated with the products, and/or recommendations associated with the products or offers) are to be presented and/or output to the user in a user interface. The ranking(s) 1336 can include, for instance, the ranking or order of the recommendations of FIG. 7 (e.g., with the recommendation 760 being primary, the recommendation 780 being secondary, and the recommendation 790 being tertiary as illustrated in the callouts with dashed lines), a ranking or order in which the products are presented in the UI 850 (e.g., with the Partnerbrand Credit Card 855 being primary and the Pay Later Loan 860 being secondary), a ranking or order in which the variants of the Pay Later Loan 860 product are presented in the UI 875, a ranking or order indicated in the offer presentment instructions 935 generated by the logic subsystem 930, a ranking or order indicated in the table 1005 of the decisions (e.g., under the template 1015 column), a ranking or order indicated in the table 1020 of logic (e.g., under the template 1045 and/or treatment 1050 column(s)), the ranking or order according to which the products are listed in the UI 1070 (e.g., the primary product 1055, then the secondary product 1060, then the tertiary product 1065), a ranking or order determined by the offer engine 1105, a ranking or order in which the approvals for the first product 1240 and the third product 1270 are output, a ranking or order in which the recommendations for the subset of the plurality of products are output in operation 1630, other rankings discussed herein, other recommendations discussed herein, or a combination thereof.

The fraud probability(s) 1338 can be an estimate or prediction of how likely a given user, request (e.g., request 210) or application for qualification for product(s), program(s), and/or service(s) is to be fraudulent, fraud-related, or associated with a fraud attempt. The fraud probability(s) 1338 can be associated with the internal risk analysis 240A, the card and/or CRMS analysis 250A, the internal fraud check 250C, the account exposure analysis 250D, the location analysis 250E, the filtering decisioning 260, the external analysis 270, the fraud check 275, the fraud detection rules 560, the processing 970, trust or fraud scores associated with the scoring data 1170, fraud rules associated with the rules data 1165, the fraud probability of the user data 1205, the fraud probability threshold of the rule 1230, fraud probabilities used in the process 1500, fraud probabilities used in the process 1600, other fraud probabilities discussed herein, or a combination thereof.

The ML model(s) 1325 can generate the each of the output(s) 1330 based on the information 1310, information from the data store(s) 1370, and/or other types of input(s) 1305 (e.g., previous output(s) 1315).

In some examples, the ML model(s) 1325 can identify something in the input(s) 1305 about which the data store(s) 1370 include additional information, and can fashion at least one query (e.g., the RAG query(s) 1345) for the data store(s) 1370 to retrieve the additional information from the data store(s) 1370. For instance, if the information 1310 references a specific model of device, the RAG query(s) 1345 can include one or more queries of the data store(s) 1370 for additional information about the specific model of device, for instance to retrieve its components, configurations, settings, firmware updates, ranges of optimal operating parameters (e.g., temperature, clock speed, and so forth), or a combination thereof. The additional information retrieved from the data store(s) 1370 using the RAG query(s) 1345 can be used as part of the input(s) 1305 (e.g., as part of the information 1310 and/or part of the previous output(s) 1315) for further passes of data processing by the ML model(s) 1325.

In some examples, certain output(s) 1330 (e.g., the score(s) 1332, the decision(s) 1334, the ranking(s) 1336, the fraud probability(s) 1338, the RAG query(s) 1345) can be used as part of the input(s) 1305 to the ML model(s) 1325 (e.g., as part of previous output(s) 1315) for identifying other output(s) 1330 (e.g., the score(s) 1332, the decision(s) 1334, the ranking(s) 1336, the fraud probability(s) 1338, the RAG query(s) 1345). For instance, in an illustrative example, the score(s) 1332 can be processed, as previous output(s) 1315, by the ML model(s) 1325 to generate the decision(s) 1334, the ranking(s) 1336, the fraud probability(s) 1338, the RAG query(s) 1345, and/or other output(s) 1330. In some examples, at least some of the previous output(s) 1315 in the input(s) 1305 represent previously-identified instances of some of the output(s) 1330 that are input into the ML model(s) 1325 to generate other types of the output(s) 1330. In some examples, based on receipt of the input(s) 1305, the ML model(s) 1325 can select the output(s) 1330 from a list of possible outputs, for instance by ranking the list of possible outputs by likelihood, probability, and/or confidence based on the input(s) 1305. In some examples, based on receipt of the input(s) 1305, the ML model(s) 1325 can identify the output(s) 1330 at least in part using generative artificial intelligence (AI) content generation techniques, for instance using an LLM to generate custom text and/or graphics identifying the output(s) 1330. In some examples, the LLM-based output(s) 1330 are conversationally responsive to a prompt in the input(s) 1305 (e.g., in the information 1310 and/or in the previous output(s) 1315).

In some examples, the ML system repeats the process illustrated in FIG. 13 multiple times to generate the output(s) 1330 in multiple passes, using some of the output(s) 1330 from earlier passes as some of the input(s) 1305 in later passes (e.g., as some of the previous output(s) 1315). For instance, in a first illustrative example, in a first pass, the ML model(s) 1325 can identify the score(s) 1332 and/or the fraud probability(s) 1338 based on input of the information 1310 into the ML model(s) 1325. In a second pass, the ML model(s) 1325 can identify the decision(s) 1334 based on input of the information 1310 and the previous output(s) 1315 (that includes the score(s) 1332 and/or the fraud probability(s) 1338 from the first pass) into the ML model(s) 1325. In a third pass, the ML model(s) 1325 can identify the ranking(s) 1336 based on input of the information 1310 and the previous output(s) 1315 (that includes the score(s) 1332 and/or the fraud probability(s) 1338 from the first pass and the decision(s) 1334 from the second pass) into the ML model(s) 1325.

In some examples, the ML system includes one or more feedback engine(s) 1350 that generate and/or provide feedback 1355 about the output(s) 1330. In some examples, the feedback 1355 indicates how well the output(s) 1330 align to corresponding expected output(s), how well the output(s) 1330 serve their intended purpose, or a combination thereof. In some examples, the feedback engine(s) 1350 include loss function(s), reward model(s) (e.g., other ML model(s) that are used to score the output(s) 1330), discriminator(s), error function(s) (e.g., in back-propagation), user interface feedback received via a user interface from a user, or a combination thereof. In some examples, the feedback 1355 can include one or more alignment score(s) that score a level of alignment between the output(s) 1330 and the expected output(s) and/or intended purpose.

The ML engine 1320 of the ML system can update (further train) the ML model(s) 1325 based on the feedback 1355 to perform an update 1360 (e.g., further training) of the ML model(s) 1325 based on the feedback 1355. In some examples, the feedback 1355 includes positive feedback, for instance indicating that the output(s) 1330 closely align with expected output(s) and/or that the output(s) 1330 serve their intended purpose. In some examples, the feedback 1355 includes negative feedback, for instance indicating a mismatch between the output(s) 1330 and the expected output(s), and/or that the output(s) 1330 do not serve their intended purpose. For instance, high amounts of loss and/or error (e.g., exceeding a threshold) can be interpreted as negative feedback, while low amounts of loss and/or error (e.g., less than a threshold) can be interpreted as positive feedback. Similarly, high amounts of alignment (e.g., exceeding a threshold) can be interpreted as positive feedback, while low amounts of alignment (e.g., less than a threshold) can be interpreted as negative feedback.

In response to positive feedback in the feedback 1355, the ML engine 1320 can perform the update 1360 to update the ML model(s) 1325 to strengthen and/or reinforce weights (and/or connections and/or hyperparameters) associated with generation of the output(s) 1330 to encourage the ML engine 1320 to generate similar output(s) 1330 given similar input(s) 1305. In this way, the update 1360 can improve the ML model(s) 1325 itself by improving the accuracy of the ML model(s) 1325 in generating output(s) 1330 that are similarly accurate given similar input(s) 1305. In response to negative feedback in the feedback 1355, the ML engine 1320 can perform the update 1360 to update the ML model(s) 1325 to weaken and/or remove weights (and/or connections and/or hyperparameters) associated with generation of the output(s) 1330 to discourage the ML engine 1320 from generating similar output(s) 1330 given similar input(s) 1305. In this way, the update 1360 can improve the ML model(s) 1325 itself by improving the accuracy of the ML model(s) 1325 in generating output(s) 1330 are more accurate given similar input(s) 1305. In some examples, for instance, the update 1360 can improve the accuracy of the ML model(s) 1325 in generating output(s) 1330 by reducing false positive(s) and/or false negative(s) in the output(s) 1330.

For instance, here, if the score(s) 1332, decision(s) 1334, ranking(s) 1336, fraud probability(s) 1338, and/or query(s) 1345 are used in onboarding the user onto a product (e.g., program or service, such as a credit card or Pay Later loan), and the onboarding of the user onto the product is successful (e.g., the user agrees, and the user does not fall below a threshold balance after or as a result of the onboarding, and the user's request is confirmed to be non-fraudulent), the success of the onboarding can be interpreted as feedback 1355 that is positive (e.g., positive feedback). For instance, here, if the score(s) 1332, decision(s) 1334, ranking(s) 1336, fraud probability(s) 1338, and/or query(s) 1345 are used in onboarding the user onto a product (e.g., program or service), and the onboarding fails or is unsuccessful (e.g., the user declines, or the user falls below a threshold balance after or as a result of the onboarding, or the user's request turns out to be a fraud attempt), the failure or lack of success of the onboarding can be interpreted as feedback 1355 that is negative (e.g., negative feedback). Either way, the update 1360 can improve the machine learning system 1300 and the overall system by improving the consistency with which the onboarding the user is successful.

In some examples, the ML engine 1320 can also perform an initial training of the ML model(s) 1325 before the ML model(s) 1325 are used to generate the output(s) 1330 based on the input(s) 1305. During the initial training, the ML engine 1320 can train the ML model(s) 1325 based on training data 1365. In some examples, the training data 1365 includes examples of input(s) (of any input types discussed with respect to the input(s) 1305), output(s) (of any output types discussed with respect to the output(s) 1330), and/or feedback (of any feedback types discussed with respect to the feedback 1355). In some cases, positive feedback in the training data 1365 can be used to perform positive training, to encourage the ML model(s) 1325 to generate output(s) similar to the output(s) in the training data given input of the corresponding input(s) in the training data. In some cases, negative feedback in the training data 1365 can be used to perform negative training, to discourage the ML model(s) 1325 from generate output(s) similar to the output(s) in the training data given input of the corresponding input(s) in the training data. In some examples, the training of the ML model(s) 1325 (e.g., the initial training with the training data 1365, update(s) 1360 based on the feedback 1355, and/or other modification(s)) can include fine-tuning of the ML model(s) 1325, retraining of the ML model(s) 1325, or a combination thereof.

In some examples, the ML model(s) 1325 can include an ensemble of multiple ML models, and the ML engine 1320 can curate and manage the ML model(s) 1325 in the ensemble. The ensemble can include ML model(s) 1325 that are different from one another to produce different respective outputs, which the ML engine 1320 can average (e.g., mean, median, and/or mode) to identify the output(s) 1330. In some examples, the ML engine 1320 can calculate the standard deviation of the respective outputs of the different ML model(s) 1325 in the ensemble to identify a level of confidence in the output(s) 1330. In some examples, the standard deviation can have an inverse relationship with confidence. For instance, if the respective outputs of the different ML model(s) 1325 are very different from one another (and thus have a high standard deviation above a threshold), the confidence that the output(s) 1330 are accurate may be low (e.g., below a threshold). On the other hand, if the respective outputs of the different ML model(s) 1325 are equal or very similar to one another (and thus have a low standard deviation below a threshold), the confidence that the output(s) 1330 are accurate may be high (e.g., above a threshold). In some examples, different ML models(s) 1325 in the ensemble can include different types of models. For instance, in some examples, an ensemble can include a NN and a SVM that are both trained to process the input(s) 1305 to generate at least a subset of the output(s) 1330. In some examples, the ensemble may include different ML model(s) 1325 that are trained to process different inputs of the input(s) 1305 and/or to generate different outputs of the output(s) 1330. For instance, in some examples, a first model (or set of models) can process the input(s) 1305 to generate the score(s) 1332, a second model (or set of models) can process the input(s) 1305 to generate the decision(s) 1334, a third model (or set of models) can process the input(s) 1305 to generate the ranking(s) 1336, a fourth model (or set of models) can process the input(s) 1305 to generate the fraud probability(s) 1338, and a fifth model (or set of models) can process the input(s) 1305 to generate the RAG query(s) 1345. In some examples, the ML engine 1320 can choose specific ML model(s) 1325 to be included in the ensemble because the chosen ML model(s) 1325 are effective at accurately processing particular types of input(s) 1305, are effective at accurately generating particular types of output(s) 1330, are generally accurate, process input(s) 1305 quickly, generate output(s) 1330 quickly, are computationally efficient, have higher or lower degrees of uncertainty than other models in the ensemble, or a combination thereof.

In some examples, one or more of the ML model(s) 1325 can be initialized with weights, connections, and/or hyperparameters that are selected randomly. This can be referred to as random initialization. These weights, connections, and/or hyperparameters are modified over time through training (e.g., initial training with the training data 1365 and/or update(s) 1360 based on the feedback 1355), but the random initialization can still influence the way the ML model(s) 1325 process data, and thus can still cause different ML model(s) 1325 (with different random initializations) to produce different output(s) 1330. Thus, in some examples, different ML model(s) 1325 in an ensemble can have different random initializations.

As an ML model (of the ML model(s) 1325) is trained (e.g., along the initial training with the training data 1365, update(s) 1360 based on the feedback 1355, and/or other modification(s)), different versions of the ML model at different stages of training can be referred to as checkpoints. In some examples, after each new update to a model (e.g., update 1360) generates a new checkpoint for the model, the ML engine 1320 tests the new checkpoint (e.g., against testing data and/or validation data where the correct output(s) are known) to identify whether the new checkpoint improves over older checkpoints or not, and/or if the new checkpoint introduces new errors (e.g., false positive(s) and/or false negative(s)). This testing can be referred to as checkpoint benchmark scoring. In some examples, in checkpoint benchmark scoring, the ML engine 1320 produces a benchmark score for one or more checkpoint(s) of one or more ML model(s) 1325, and keeps the checkpoint(s) that have the best (e.g., highest or lowest) benchmark scores in the ensemble. In some examples, if a new checkpoint is worse than an older checkpoint, the ML engine 1320 can revert to the older checkpoint. The benchmark score for a can represent a level of accuracy of the checkpoint and/or number of errors (e.g., false positive or false negative) by the checkpoint during the testing (e.g., against the testing data and/or the validation data). In some examples, an ensemble of the ML model(s) 1325 can include multiple checkpoints of the same ML model.

In some examples, the ML model(s) 1325 can be modified, either through the initial training (with the training data 1365), an update 1360 based on the feedback 1355, or another modification to introduce randomness, variability, and/or uncertainty into an ensemble of the ML model(s) 1325. In some examples, such modification(s) to the ML model(s) 1325 can include dropout (e.g., Monte Carlo dropout), in which one or more weights or connections are selected at random and removed. In some examples, dropout can also be performed during inference, for instance to modify the output(s) 1330 generated by the ML model(s) 1325. The term Bayesian Machine Learning (BML) can refer to random dropout, random initialization, and/or other randomization-based modifications to the ML model(s) 1325. In some examples, the modification(s) to the ML model(s) 1325 can include a hyperparameter search and/or adjustment of hyperparameters. The hyperparameter search can involve training and/or updating different ML models 1325 with different values for hyperparameters and evaluating the relative performance of the ML models 1325 (e.g., against (e.g., against testing data and/or validation data where the correct output(s) are known) to identify which of the ML models 1325 performs best. Hyperparameters can include, for instance, temperature (e.g., influencing level creativity and/or randomness), top P (e.g., influencing level creativity and/or randomness), frequency penalty (e.g., to prevent repetitive language between one of the output(s) 1330 and another), presence penalty (e.g., to encourage the ML model(s) 1325 to introduce new data in the output(s) 1330), other parameters or settings, or a combination thereof.

In some examples, the ML engine 1320 can perform retrieval-augmented generation (RAG) using the model(s) 1325. For instance, in some examples, the ML engine 1320 can pre-process the input(s) 1305 by retrieving additional information from one or more data store(s) 1370 (e.g., any of the databases and/or other data structures discussed herein) and using the additional information to enhance the input(s) 1305 before the input(s) 1305 are processed by the ML model(s) 1325 to generate the output(s) 1330. For instance, in some examples, the enhanced versions of the input(s) 1305 can include the additional information that the ML engine 1320 retrieved from the from one or more data store(s) 1370. In some examples, the machine learning system 1300 can retrieve the additional information from one or more data store(s) 1370 by querying the data store(s) 1370 using RAG query(s) 1345 generated by the ML model(s) 1325 (or extracted from the input(s) 1305 using the ML model(s) 1325). In some examples, this RAG process provides the ML model(s) 1325 with more relevant information, allowing the ML model(s) 1325 to generate more accurate and/or personalized output(s) 1330.

Figure 14:
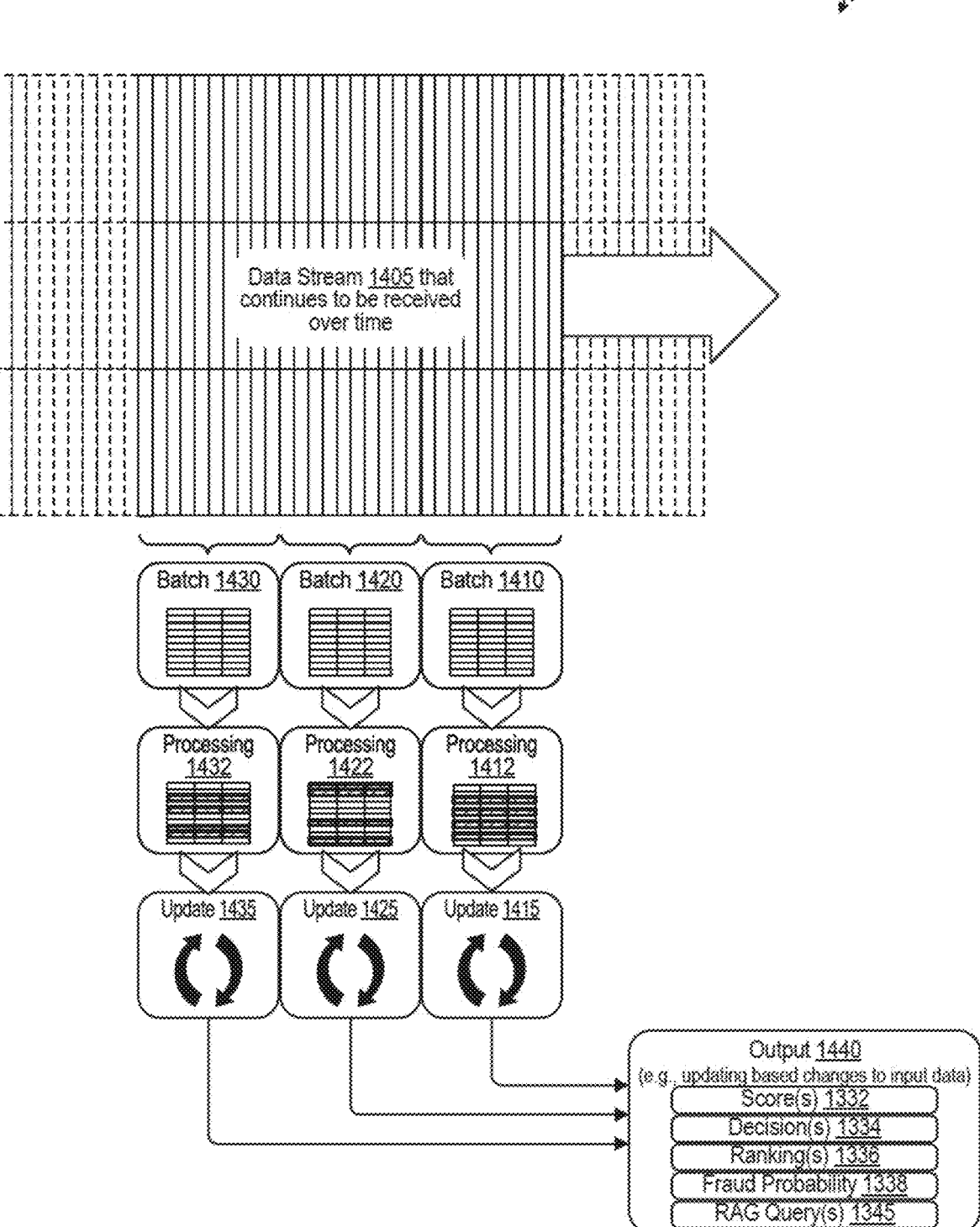
FIG. 14 is a conceptual diagram illustrating a process for dynamically updating an output (that is generated using machine learning model(s) in a continuous fashion as further data continues to be received over time, in accordance with some examples.

FIG. 14 is a conceptual diagram illustrating a process 1400 for dynamically updating an output 1440 (that is generated using machine learning model(s) 1325) in a continuous fashion as further data continues to be received over time. A data stream 1405 is illustrated, and can represent, for instance, a stream of data to be input into the ML model(s) 1325 to generate an output 1440 (e.g., of one or more of the types of the output(s) 1330, such as the score(s) 1332, the decision(s) 1334, the ranking(s) 1336, the fraud probability(s) 1338, or the RAG query(s) 1345). In some examples, the data stream 1405 is an example of at least a portion of the information 1310. In some examples, the data stream 1405 can include any of the types of data discussed with respect to the information 1310, such as user information, product qualification criteria, rules, or a combination thereof. The data stream 1405 includes large quantities of data that continue to be received over a long period of time. For instance, the data stream 1405 can include records of transactions that continue to occur over time. The output 1440 can be an example of one or more of the output(s) 1335, or vice versa.

In some examples, a system (e.g., the machine learning system 1300, other systems discussed herein, or a combination thereof) can extract batches of data (e.g., batch 1410, batch 1420, batch 1430) from the data stream 1405 dynamically and in real-time (or near-real-time) as the data from the data stream 1405 continues to be received by the system. In some examples, the system can process the batches of data (e.g., using the ML model(s) 1325) dynamically and in real-time (or near-real-time) as the data from the data stream

1405 continues to be received by the system to generate update(s) to an output 1440 of the output(s) 1330. For instance, the batch 1410 undergoes processing 1412 to generate the update 1415. The batch 1420 undergoes processing 1422 to generate the update 1425. The batch 1430 undergoes processing 1432 to generate the update 1435. The system updates the output 1440 (e.g., using the ML model(s) 1325 of the machine learning system 1300) based on the update 1415, the update 1425, and/or the update 1435, sequentially, in parallel, and/or in further batches of updates. For instance, the batch 1410, the batch 1420, the batch 1430, the update 1415, the update 1425, and/or the update 1435 can be added into the information 1310, the previous output(s) 1315, and/or can otherwise be added into the input(s) 1305. In this way, the system continues to update the output 1440 as the data from the data stream 1405 continues to be received by the system, so that the output 1440 is up-to-date with the changes to the data stream 1405.

In some examples, the data stream 1405 may include, for instance, at least a portion of the information 1310. In some examples, the processing 1412, the processing 1422, and/or the processing 1432, can include processing operations applied by the ML model(s) 1325 to the input(s) 1305 to generate the output(s) 1330. In some examples, the processing 1412, the processing 1422, and/or the processing 1432, can include processing operations such as normalization, reformatting, conversion between data types, rearrangement of data, removal of outliers, correction of errors, or a combination thereof. In some examples, the processing 1412, the processing 1422, and/or the processing 1432, can include processing operations using trained machine learning model(s) (e.g., the ML model(s) 1325) to generate updates to the output 1440. In some examples, the updates to the output 1440 (e.g., update 1415, update 1425, update 1435) can represent additional information (e.g., updates to the information 1310) to be input into the ML model(s) 1325 for analysis and updating of the output(s) 1330 (e.g., the output 1440). In some examples, the updates to the output 1440 are each new and updated instances of the output 1440. In some examples, the updates to the output 1440 include differences compared to a previous instance of the output 1440, so that the updates to the output 1440 can be combined with the previous instance of the output 1440 to generate an updated output 1440.

In some examples, the updates (e.g., update 1415, update 1425, update 1435) can include feedback 1355, training data, fine-tuning data, context data, model parameters (e.g., temperature, top P, frequency penalty, presence penalty and/or other parameters or settings) for training, re-training, fine-tuning, and/or updating the ML model(s) 1325 (e.g., as in the update 1360) in addition to, or instead of, updating the output 1440.

FIG. 15 is a flow diagram illustrating a process 1500 for multi-stage account analysis. The process 1500 is performed by an analysis system. The analysis system may be, and/or may include, the system architecture 100, the computing system 105, the core layer 110, the orchestration layer 115, the domain services layer 120, the data source layer 125, the data lake system 130, the network 150, the data sources 160, the client terminals 190, the AI engine(s) 195, the decisioning system 200, the core subsystem 205 the choreography subsystem 215, the evaluation subsystem 220, the data component handler subsystem 225, the analysis subsystem 230, the fraud check 275, the data store 280, the user interface 285, the AI engine(s) 295, the analysis engine 505, the choreography engine 515, the strategy engine 545, the communication system 605, the analysis system 610, the strategy system 615, the multi-product qualification analysis system 700, the user device that displays the user interfaces of FIG. 8 (e.g., UI 805, UI 820, UI 850, UI 870, UI 875), the multi-product qualification analysis system 900, the user device that displays the UI 1070, the multi-product qualification analysis system 1100, system(s) that perform the analyses 1200, the machine learning system 1300, the ML model(s) 1325, the feedback engine(s) 1350, the analysis system that performs the process 1600, the computing system 1700, a processor that executes instructions stored in a memory, a processor that executes instructions stored in a non-transitory computer-readable medium, a system, or a combination thereof.

At operation 1505, the analysis system is configured to, and can, analyze user account data according to a first set of rules to perform a preliminary validation that a user account is eligible for a program to be applied to the user account. The user account data is associated with the user account.

Examples of the user account data can include data from the data lake system 130, data from the data source(s) 160, data from the client terminal(s) 190, the request 210, data from the core subsystem 205, data from the analysis subsystem 230, data from the data store 280, the JSON payload of operation 305, the client information of operation 310 or operation 315, the data from the services in operation 420, data analyzed by the analysis engine 505, data generated and/or received by the analysis engine 505, data generated and/or received by the choreography engine 515, data generated and/or received by the strategy engine 545, the request of operation 620, user information about the user of operation 620, the user information 705, the user information provided into the UIs of FIG. 8, the user information pre-filled in the UI 805, product(s) that a user may be interested in (e.g., the requested credit limit in field 825 of the UI 820 or the housing ownership in field 830 of the UI 820), information relevant to whether or not a user might qualify for a given product (e.g., annual net income as in field 840, asset(s) owned by the user, debts that the user already owes), the user information 905, user information from the data store(s) of FIG. 11 (e.g., application data 1145 data store(s), behavior data 1150 data store(s), prior offer data 1155 data store(s), merchant configuration data 1160 data store(s), rules data 1165 data store(s), scoring data 1170 data store(s)), the user data 1205, the input(s) 1305, the user information of operation 1605, other user information discussed herein, or a combination thereof.

Examples of the first set of rules include the rules of the rules engine of FIG. 1, rules associated with the analyses of FIG. 2 (e.g., of the analysis subsystem 230, the fraud check 275, and/or the AI engine(s) 295), the user-based rules 550, the request-based rules of FIG. 5, the transaction-based rules 555, the fraud detection rules 560, the product qualification criteria 720, the product qualification criteria 730, the product qualification criteria 740, the product qualification criteria 750, the rule 1220, the rule 1225, the rule 1230, the qualification criteria 1245, the qualification criteria 1250, the qualification criteria 1260, the qualification criteria 1265, the qualification criteria 1275, the criteria 1280, the qualification criteria 1290, the qualification criteria 1295, the first set of rules of operation 1505, the second set of rules of operation 1520, the qualification criteria of operation 1610, or a combination thereof.

In some examples, the user account data does not include information from an external analysis system. In some examples, the external analysis system refers to a credit agency, and the information from the external analysis system refers to a credit score such as a FICO® score. Thus, in some examples, the user account data analyzed in the preliminary validation does not include a credit score from a credit agency.

At operation 1510, the analysis system is configured to, and can, determine whether the preliminary validation indicates that the user is eligible for the program (in which case the process 1500 proceeds from operation 1510 to operation 1515) or whether the preliminary validation indicates that the user is ineligible for the program (in which case the process 1500 proceeds from operation 1510 to operation 1535).

In some examples, the first set of rules include an age threshold (e.g., user-based rules 550, rule 1220), the preliminary validation includes a comparison of an age of a user to the age threshold, and the user is associated with the user account. In some examples, the first set of rules include a duplicate check (e.g., duplicate check 250B, duplicate check 525, rule 1225), the preliminary validation includes a comparison of a request for the program (that is associated with the user account) with one or more other requests (e.g., to check whether the request is a duplicate of the one or more other requests).

At operation 1515, in response to the preliminary validation that the user account is eligible for the program, the analysis system is configured to, and can, retrieve secondary user account data from the external analysis system via the communication interface and over the network.

At operation 1520, the analysis system is configured to, and can, analyze the user account data and the secondary user account data according to a second set of rules to perform a secondary validation that the user account is eligible for the program to be applied to the user account.

Examples of the second set of rules include the rules of the rules engine of FIG. 1, rules associated with the analyses of FIG. 2 (e.g., of the analysis subsystem 230, the fraud check 275, and/or the AI engine(s) 295), the user-based rules 550, the request-based rules of FIG. 5, the transaction-based rules 555, the fraud detection rules 560, the product qualification criteria 720, the product qualification criteria 730, the product qualification criteria 740, the product qualification criteria 750, the rule 1220, the rule 1225, the rule 1230, the qualification criteria 1245, the qualification criteria 1250, the qualification criteria 1260, the qualification criteria 1265, the qualification criteria 1275, the criteria 1280, the qualification criteria 1290, the qualification criteria 1295, the first set of rules of operation 1505, the second set of rules of operation 1520, the qualification criteria of operation 1610, or a combination thereof.

In some examples, the external analysis system refers to a credit agency, and the secondary user account data from the external analysis system refers to a credit score such as a FICO® score. Thus, in some examples, the secondary user account data analyzed in the secondary validation includes a credit score from a credit agency.

At operation 1525, the analysis system is configured to, and can, determine whether the secondary validation indicates that the user is eligible for the program (in which case the process 1500 proceeds from operation 1525 to operation 1530) or whether the secondary validation indicates that the user is ineligible for the program (in which case the process 1500 proceeds from operation 1525 to operation 1535).

In some examples, the second set of rules include a credit score threshold, and the secondary validation includes a comparison of a credit score (e.g., retrieved via the bureau service 535) associated with the user account to the credit score threshold. In some examples, the second set of rules include a threshold probability of fraud (e.g., as in rule 1230), and the secondary validation includes a determination of a probability of fraud associated with the user account (e.g., fraud probability(s) 1338) and a comparison of the probability of fraud to the threshold probability of fraud.

In some examples, the first set of rules apply to a plurality of programs (e.g., are program-agnostic). In some examples, the second set of rules are specific to the program (e.g., are program-specific). The plurality of programs includes the program. In such scenarios, examples of the first set of rules can include the rule 1220, the rule 1225, and the rule 1230; while examples of the second set of rules can include the qualification criteria 1245, the qualification criteria 1250, the qualification criteria 1260, the qualification criteria 1265, the qualification criteria 1275, the criteria 1280, the qualification criteria 1290, and the qualification criteria 1295.

In some examples, the first set of rules are specific to the program (e.g., are program specific). In some examples, wherein the second set of rules apply to a plurality of programs (that includes the program) (e.g., are program-agnostic). In such scenarios, examples of the first set of rules can include the qualification criteria 1245, the qualification criteria 1250, the qualification criteria 1260, the qualification criteria 1265, the qualification criteria 1275, the criteria 1280, the qualification criteria 1290, and the qualification criteria 1295; while examples of the second set of rules can include the rule 1220, the rule 1225, and the rule 1230.

At operation 1530, in response to the secondary validation that the user account is eligible for the program, the analysis system is configured to, and can, apply the program to the user account (e.g., onboard the user account onto the program).

At operation 1535, in response either the primary validation or the secondary validation indicating that the user account is ineligible for the program, the analysis system is configured to, and can, prevent the program from being applied to the user account (e.g., bar or ban the user account from access to the program).

In some examples, the analysis of the user account data and the secondary user account data according to the second set of rules includes processing of the user account data and the secondary user account data using a trained machine learning model (e.g., the AI engine(s) 195, the AI engine(s) 295, the ML model(s) 640, the AI engine(s) 727, the AI engine(s) 737, the AI engine(s) 747, the AI engine(s) 757, the ML model(s) 1325). In some examples, the analysis system is configured to, and can, extract feedback (e.g., feedback 1355) associated with the secondary validation (and/or the preliminary validation and/or the application of the program to the user account in operation 1530), and can update (e.g., update 1360) the trained machine learning model based on the feedback to improve an accuracy of the trained machine learning model for further user validations (e.g., preliminary validations and/or secondary validations). In some examples, the preliminary validations and/or secondary validations are associated with a first level of accuracy, and the further user validations are associated with a second level of accuracy that is higher than the first level of accuracy.

In some examples, the analysis of the user account data according to the first set of rules includes processing of the user account data using a trained machine learning model (e.g., the AI engine(s) 195, the AI engine(s) 295, the ML model(s) 640, the AI engine(s) 727, the AI engine(s) 737, the AI engine(s) 747, the AI engine(s) 757, the ML model(s) 1325). In some examples, the analysis system is configured to, and can, extract feedback (e.g., feedback 1355) associated with the preliminary validation (and/or the secondary validation and/or the application of the program to the user account in operation 1530), and can update (e.g., update 1360) the trained machine learning model based on the feedback to improve an accuracy of the trained machine learning model for further user validations (e.g., preliminary validations and/or secondary validations). In some examples, the preliminary validations and/or secondary validations are associated with a first level of accuracy, and the further user validations are associated with a second level of accuracy that is higher than the first level of accuracy.

In some examples, the analysis system is configured to, and can, receive an update for the first set of rules, and update the first set of rules based on the update and before the preliminary validation (before the preliminary validation of operation 1505 and operation 1510). In some examples, before the update to the first set of rules (and before the preliminary validation of operation 1505 and operation 1510), a previous analysis of the user account based on the first set of rules indicated ineligibility of the user for the program. In some examples, the update to the first set of rules causes a change in eligibility of the user account for the program.

In some examples, the analysis system is configured to, and can, receive an update for the second set of rules, and update the second set of rules based on the update and before the secondary validation (before the secondary validation of operation 1505 and operation 1510). In some examples, before the update to the second set of rules (and before the secondary validation of operation 1520 and operation 1525), a previous analysis of the user account based on the second set of rules indicated ineligibility of the user for the program. In some examples, the update to the second set of rules causes a change in eligibility of the user account for the program.

In some examples, the analysis system is configured to, and can, initiate an asset transfer involving the user account. The asset transfer is associated with the program. For instance, in some examples, initiating the asset transfer can be part of applying the program to the user account. In some examples, initiating the asset transfer can be enabled as a result of applying the program to the user account. In some examples, the asset transfer is a transfer of asset(s) (e.g., funds, fiat currencies, cryptocurrencies, digital assets, physical objects) from a secondary account to the user account, such as for a loan, or payment for a purchase or service from the user. In some examples, the asset transfer is a transfer of asset(s) (e.g., funds, fiat currencies, cryptocurrencies, digital assets, physical objects) from the user account to a secondary account, such as a payment by the user for a purchase or service.

In some examples, the first set of rules and the preliminary validation correspond to less computationally-intensive analyses, such as analyses that do not make use of the ML model(s) 1325; while the second set of rules and the secondary validation correspond to more computationally-intensive analyses, such as analyses that make use of the ML model(s) 1325 (e.g., analyses that make use of the score(s) 1332, the decision(s) 1334, the ranking(s) 1336, the probability(s) 1338, and/or the query(s) 1345). This can represent a technical improvement in that, if the user is determined to be ineligible for the program through the less computationally-intensive first set of rules and the preliminary validation, then the more computationally-intensive second set of rules and the secondary validation can be omitted, improving efficiency.

In some examples, the first set of rules and the preliminary validation correspond to a first stage of analysis, while the second set of rules and the secondary validation correspond to a second stage of analysis. Examples of the first stage of analysis and the second stage of analysis, respectively, can include the orchestration layer 115, the domain services layer 120, the AI engine(s) 195, the first stage 235, the second stage 245, the third stage 255, the fourth stage 265, the fraud check 275, the AI engine(s) 295, the choreography engine 515, the strategy engine 545, analysis system 610, the strategy system 615, the ML model(s) 640, UI 805, the UI 820, the decisioning 915, the offers 920, the table 1005, the table 1020, the different data types and/or considerations associated with the multi-product qualification analysis system 1100, the rule 1220, the rule 1225, the rule 1230, the qualification criteria 1245, the qualification criteria 1250, the qualification criteria 1260, the qualification criteria 1265, the qualification criteria 1275, the criteria 1280, the qualification criteria 1290, the qualification criteria 1295, different decision(s) 1334, the program-agnostic qualification criteria of the operation 1615, the preliminary decision of operation 1615 and operation 1620, the qualification decision of operation 1625 and operation 1630, or a combination thereof.

Figure 16:
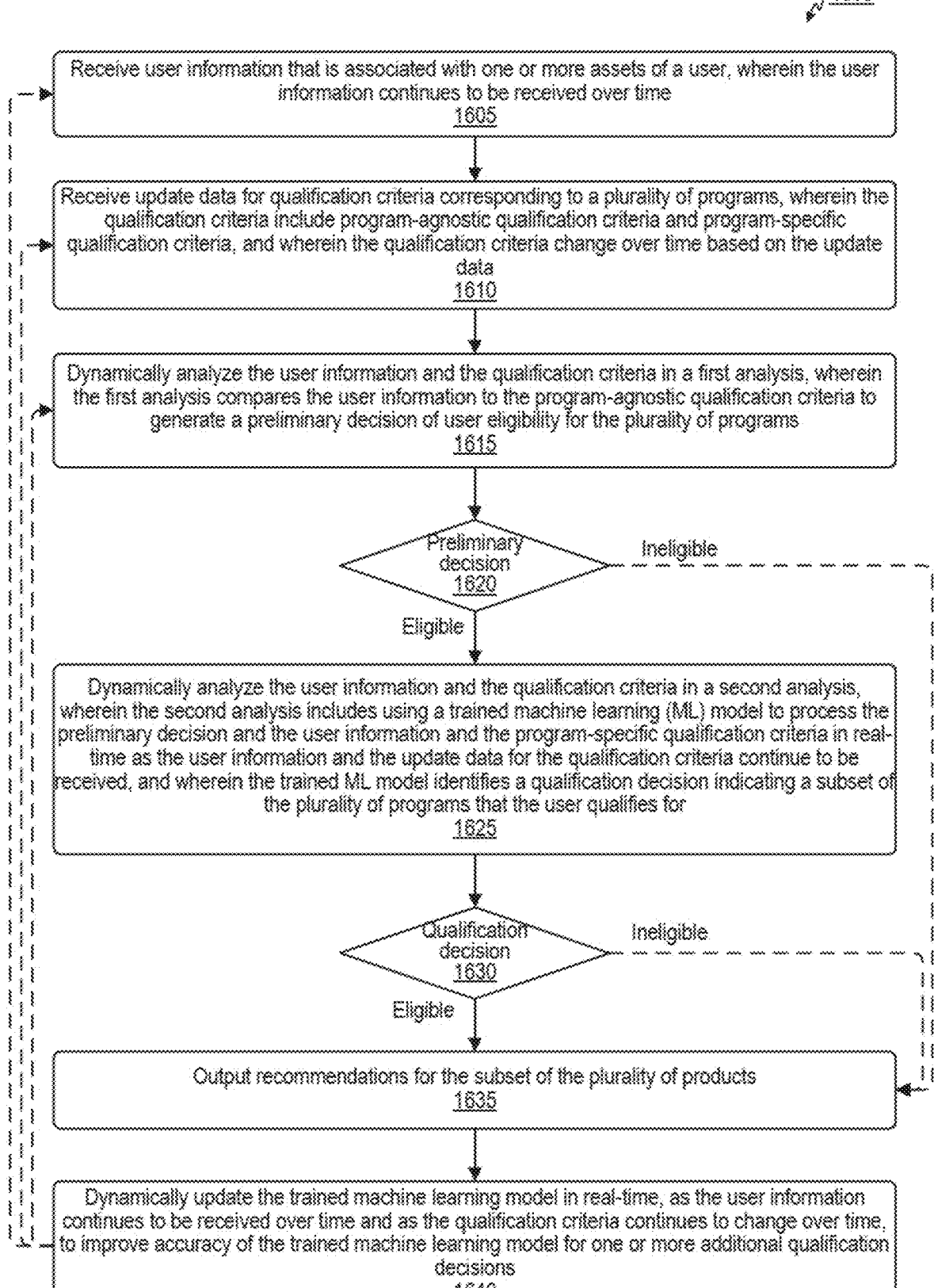
FIG. 16 is a flow diagram illustrating a process for multi-stage multi-product qualification analysis, in accordance with some examples.

FIG. 16 is a flow diagram illustrating a process 1600 for multi-stage multi-product qualification analysis. The process 1600 is performed by an analysis system. The analysis system may be, and/or may include, the system architecture 100, the computing system 105, the core layer 110, the orchestration layer 115, the domain services layer 120, the data source layer 125, the data lake system 130, the network 150, the data sources 160, the client terminals 190, the AI engine(s) 195, the decisioning system 200, the core subsystem 205 the choreography subsystem 215, the evaluation subsystem 220, the data component handler subsystem 225, the analysis subsystem 230, the fraud check 275, the data store 280, the user interface 285, the AI engine(s) 295, the analysis engine 505, the choreography engine 515, the strategy engine 545, the communication system 605, the analysis system 610, the strategy system 615, the multi-product qualification analysis system 700, the user device that displays the user interfaces of FIG. 8 (e.g., UI 805, UI 820, UI 850, UI 870, UI 875), the multi-product qualification analysis system 900, the user device that displays the UI 1070, the multi-product qualification analysis system 1100, the machine learning system 1300, the ML model(s) 1325, the feedback engine(s) 1350, the analysis system that performs the process 1500, the computing system 1700, a processor that executes instructions stored in a memory, a processor that executes instructions stored in a non-transitory computer-readable medium, a system, or a combination thereof.

At operation 1605, the analysis system is configured to, and can, receive user information that is associated with one or more assets of a user. The user information continues to be received over time.

Examples of the user information can include data from the data lake system 130, data from the data source(s) 160, data from the client terminal(s) 190, the request 210, data from the core subsystem 205, data from the analysis subsystem 230, data from the data store 280, the JSON payload of operation 305, the client information of operation 310 or operation 315, the data from the services in operation 420, data analyzed by the analysis engine 505, data generated and/or received by the analysis engine 505, data generated and/or received by the choreography engine 515, data generated and/or received by the strategy engine 545, the request of operation 620, user information about the user of operation 620, the user information 705, the user information provided into the UIs of FIG. 8, the user information pre-filled in the UI 805, product(s) that a user may be interested in (e.g., the requested credit limit in field 825 of the UI 820 or the housing ownership in field 830 of the UI 820), information relevant to whether or not a user might qualify for a given product (e.g., annual net income as in field 840, asset(s) owned by the user, debts that the user already owes), the user information 905, user information from the data store(s) of FIG. 11 (e.g., application data 1145 data store(s), behavior data 1150 data store(s), prior offer data 1155 data store(s), merchant configuration data 1160 data store(s), rules data 1165 data store(s), scoring data 1170 data store(s)), the user data 1205, the input(s) 1305, the user account data of operation 1505, other user information discussed herein, or a combination thereof.

At operation 1610, the analysis system is configured to, and can, receive update data for qualification criteria corresponding to a plurality of programs. The qualification criteria include program-agnostic qualification criteria (that can apply to a plurality of programs) and program-specific qualification criteria (that is specific to certain programs). The qualification criteria change over time based on the update data.

Examples of the qualification criteria (e.g., the program-agnostic qualification criteria and/or the program-specific qualification criteria) include the rules of the rules engine of FIG. 1, rules associated with the analyses of FIG. 2 (e.g., of the analysis subsystem 230, the fraud check 275, and/or the AI engine(s) 295), the user-based rules 550, the request-based rules of FIG. 5, the transaction-based rules 555, the fraud detection rules 560, the product qualification criteria 720, the product qualification criteria 730, the product qualification criteria 740, the product qualification criteria 750, the rule 1220, the rule 1225, the rule 1230, the qualification criteria 1245, the qualification criteria 1250, the qualification criteria 1260, the qualification criteria 1265, the qualification criteria 1275, the criteria 1280, the qualification criteria 1290, the qualification criteria 1295, the first set of rules of operation 1505, the second set of rules of operation 1520, the qualification criteria of operation 1610, or a combination thereof.

At operation 1615, the analysis system is configured to, and can, dynamically analyze the user information and the qualification criteria in a first analysis. The first analysis compares the user information to the program-agnostic qualification criteria to generate a preliminary decision of user eligibility for the plurality of programs.

At operation 1515, the analysis system is configured to, and can, determine whether the preliminary decision (based on the first analysis) indicates that the user is eligible for the program (in which case the process 1500 proceeds from operation 1515 to operation 1525 for further analysis) or whether the preliminary validation indicates that the user is ineligible for the program (in which case the process 1500 can proceed from operation 1515 to operation 1530 in that this specific program will not be recommended in the recommendations of operation 1535, but further analyses of other programs may continue at operation 1625).

At operation 1625, the analysis system is configured to, and can, dynamically analyze the user information and the qualification criteria in a second analysis, wherein the second analysis includes using a trained machine learning (ML) model to process the preliminary decision and the user information and the program-specific qualification criteria in real-time as the user information and the update data for the qualification criteria continue to be received. The trained ML model identifies a qualification decision indicating a subset of the plurality of programs that the user qualifies for.

At operation 1530, the analysis system is configured to, and can, determine whether the qualification decision (based on the second analysis) indicates that the user is eligible for the program (in which case the process 1500 proceeds from operation 1530 to operation 1535 to indicate eligibility via the recommendations) or whether the preliminary validation indicates that the user is ineligible for the program (in which case the process 1500 proceeds from operation 1530 to operation 1535 to indicate ineligibility via the recommendations).

In some examples, the analysis system is configured to, and can, rank the subset of the plurality of programs (e.g., via the ranking(s) 1336) to determine an order in which to recommend the subset of the plurality of programs, and output the recommendations for the subset of the plurality of programs (in operation 1635) according to the order.

At operation 1635, the analysis system is configured to, and can, output recommendations for the subset of the plurality of programs.

In some examples, the subset of the plurality of programs includes at least a first program of a first type and a second program of a second type. The first type and the second type can be different types, for instance credit cards, debit cards, Pay Later loans, mortgages, auto loans, student loans, home equity loans, medical loans, small business loans, financing, or a combination thereof. In some examples, the subset of the plurality of programs includes at least one of a credit card or a loan.

At operation 1640, the analysis system is configured to, and can, dynamically update (e.g., update 1360, based on feedback 1355 or otherwise) the trained machine learning model in real-time, as the user information continues to be received over time and as the qualification criteria continues to change over time, to improve accuracy of the trained ML model for one or more additional qualification decisions (e.g., future iterations of the preliminary decision and/or the qualification decision). In some examples, the qualification decision is associated with a first level of accuracy, and the one or more additional qualification decisions are associated with a second level of accuracy that is higher than the first level of accuracy.

In some examples, at least a subset of the user information is received through a graphical user interface (GUI), such as the user information received through the UI 805 and/or the UI 820. In some examples, a first portion of the user information is received through a graphical user interface (GUI) (e.g., the user information received through the UI 805 and/or the UI 820), and a second portion of the user information is retrieved from a database based on a query using the first portion of the user information (e.g., the pre-filled information at the bottom of the UI 805).

In some examples, the recommendations for the subset of the plurality of programs include a first recommendation for a first program of the subset of the plurality of programs and a second recommendation for a second program of the subset of the plurality of programs. For instance, the recommendations can include the decisions made by the computing system 105, the decision 290, a decision in the response of operation 335, a decision in the response of operation 440, a decision associated with the decisioning 575, the decision of operation 650, the recommendation 760, the recommendation 770, the recommendation 780, the recommendation 790, decision(s) indicated in the UI 850, decision(s) indicated in the UI 870, decision(s) indicated in the UI 875, the decisions that the user is qualified for the Partnerbrand Credit Card 855 and the Pay Later Loan 860 presented in the UI 850, decision(s) associated with the decisioning 915, decision(s) associated with the offers of the multi-product qualification analysis system 900, decision(s) in the table 1005 of the decisions (e.g., under the template 1015 column), decision(s) in the table 1020 of logic (e.g., under the template 1045 and/or treatment 1050 column(s)), decision(s) indicated in the UI 1070 (e.g., that the user is qualified for the primary product 1055, the secondary product 1060, the tertiary product 1065), decision(s) made by the offer engine 1105, the approval of the user for the first product 1240 and the third product 1270 as a result of the analyses 1200, the disapproval of the user for the second product 1255 and the fourth product 1285 as a result of the analyses 1200, decision(s) in the output 1440, decision(s) reached as a result of the of the analyses of the process 1500 (e.g., the preliminary validation decision, the secondary validation decision, the ultimate decision for eligibility for the program), decision(s) reached as a result of the of the analyses of the process 1600 (e.g., the preliminary decision, the qualification decision, the recommendations of operation 1630), other decisions discussed herein, other recommendations discussed herein, or a combination thereof.

In some examples, the analysis system is configured to, and can, receive a selection of a particular program from the subset of the plurality of programs in response to outputting the recommendations, and can initiate an onboarding of the user for the particular program based on the selection and based on the user qualifying for the particular program.

In some examples, the analysis system is configured to, and can, initiate an asset transfer involving an account of the user. The asset transfer is associated with at least one of the subset of the plurality of programs. For instance, in some examples, the user can select a particular program from the subset of the plurality of programs via the recommendations. Initiating the asset transfer can be part of onboarding the user onto the program (e.g., applying the program to the user's account). In some examples, initiating the asset transfer can be enabled as a result of onboarding the user onto the program (e.g., applying the program to the user's account). In some examples, the asset transfer is a transfer of asset(s) (e.g., funds, fiat currencies, cryptocurrencies, digital assets, physical objects) from a secondary account to the user account, such as for a loan, or payment for a purchase or service from the user. In some examples, the asset transfer is a transfer of asset(s) (e.g., funds, fiat currencies, cryptocurrencies, digital assets, physical objects) from the user account to a secondary account, such as a payment by the user for a purchase or service.

In some examples, the first analysis processes the user information and the program-agnostic qualification criteria using a second trained ML model to generate the preliminary decision. In some examples, the analysis system is configured to, and can, dynamically update (e.g., update 1360) the second trained ML model in real-time based on feedback (e.g., feedback 1355) associated with the recommendations, as the user information continues to be received over time and as the qualification criteria continues to change over time, to improve accuracy of the second trained ML model for one or more additional qualification decisions (e.g., future iterations of the preliminary decision and/or the qualification decision). In some examples, the trained ML model is the second trained ML model (e.g., the trained ML model and the second trained ML model are the same ML model).

In some examples, the analyzing includes using a second trained machine learning (ML) model in real-time as the user information and the qualification criteria continue to be received, and wherein the second trained ML model ranks the subset of the plurality of programs (e.g., by generating the ranking(s) 1336) to determine an order in which to recommend the subset of the plurality of programs. In such examples, outputting the recommendations for the subset of the plurality of programs (in operation 1635) is done according to the order. In some examples, the analysis system is configured to, and can, dynamically update (e.g., update 1360) the second trained ML model in real-time based on feedback (e.g., feedback 1355) associated with the recommendations, as the user information continues to be received over time and as the qualification criteria continues to change over time, to improve accuracy of the second trained ML model for one or more additional ranking determinations (e.g., future determinations of the ranking(s) 1336). In some examples, the trained ML model is the second trained ML model (e.g., the trained ML model and the second trained ML model are the same ML model).

In some examples, the analysis system is configured to, and can, identify or detect a change in the user information, and can identify or determine a change in the subset of the plurality of programs that the user qualifies for based on the change in the user information. For instance, as the user grows older, the user can become eligible for certain age-gated programs that they were not eligible for previously. As the user's trust scores, credit scores, or fraud probabilities change over time, the user can become eligible for certain programs that they were not eligible for previously (or can become ineligible for certain programs that they were eligible for previously).

In some examples, the analysis system is configured to, and can, identify or detect a change in the qualification criteria data, and can identify or determine a change in the subset of the plurality of programs that the user qualifies for based on the change in the program qualification criteria data. For instance, if the threshold requirement for a program changes, a user can become eligible for certain programs that they were not eligible for previously (or can become ineligible for certain programs that they were eligible for previously).

In some examples, the program-agnostic qualification criteria and the first analysis correspond to less computationally-intensive analyses, such as analyses that do not make use of the ML model(s) 1325; while the program qualification criteria and the second analysis correspond to more computationally-intensive analyses, such as analyses that make use of the ML model(s) 1325 (e.g., analyses that make use of the score(s) 1332, the decision(s) 1334, the ranking(s) 1336, the probability(s) 1338, and/or the query(s) 1345). This can represent a technical improvement in that, if the user is determined to be ineligible for the program through the less computationally-intensive program-agnostic qualification criteria and first analysis, then the more computationally-intensive program qualification criteria and second analysis can be omitted, improving efficiency.

In some examples, the program-agnostic qualification criteria and the first analysis correspond to a first stage of analysis, while the program qualification criteria and the second analysis correspond to a second stage of analysis. Examples of the first stage of analysis and the second stage of analysis, respectively, can include the orchestration layer 115, the domain services layer 120, the AI engine(s) 195, the first stage 235, the second stage 245, the third stage 255, the fourth stage 265, the fraud check 275, the AI engine(s) 295, the choreography engine 515, the strategy engine 545, analysis system 610, the strategy system 615, the ML model(s) 640, UI 805, the UI 820, the decisioning 915, the offers 920, the table 1005, the table 1020, the different data types and/or considerations associated with the multi-product qualification analysis system 1100, the rule 1220, the rule 1225, the rule 1230, the qualification criteria 1245, the qualification criteria 1250, the qualification criteria 1260, the qualification criteria 1265, the qualification criteria 1275, the criteria 1280, the qualification criteria 1290, the qualification criteria 1295, different decision(s) 1334, the first set of rules and the preliminary validation of operation 1505 and operation 1510, the second set of rules and the secondary validation of operation 1520 and operation 1525, or a combination thereof.

Figure 17:
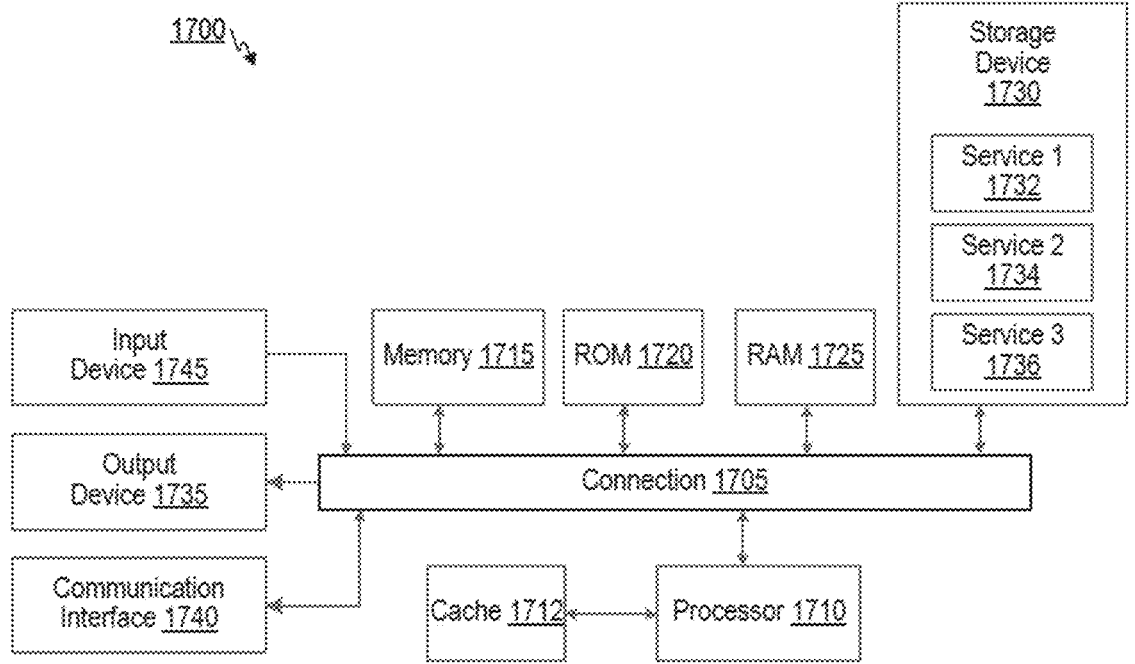
FIG. 17 is a block diagram of an exemplary computing device that may be used to implement some aspects of the technology.

FIG. 17 illustrates an exemplary computing system 1700 that may be used to implement some aspects of the technology. For example, any of the computing devices, computing systems, network devices, network systems, servers, and/or arrangements of circuitry described herein may include at least one computing system 1700, or may include at least one component of the computer system 1700 identified in FIG. 17. The computing system 1700 of FIG. 17 includes one or more processors 1710 and memory 1720. Each of the processor(s) 1710 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 1710 may include one or more cores, either integrated onto a single chip or spread across multiple chips connected or coupled together. Memory 1720 stores, in part, instructions and data for execution by processor 1710. Memory 1720 can store the executable code when in operation. The computing system 1700 of FIG. 17 further includes a mass storage device 1730, portable storage device(s) 1740 (e.g., drive(s) and/or other storage media), output devices 1750, user input devices 1760, a display system 1770 (e.g., graphics display), and peripheral device(s) 1780.

The components shown in FIG. 17 are depicted as being connected via a single bus 1790. However, the components may be connected through one or more data transport means. For example, processor 1710 and memory 1720 may be connected via a local microprocessor bus, and the mass storage device 1730, peripheral device(s) 1780, portable storage device 1740, and display system 1770 may be connected via one or more input/output (I/O) buses.

Mass storage device 1730, which may be implemented with a magnetic disk drive or an optical disk drive, is a non-volatile storage device for storing data and instructions for use by processor 1710. Mass storage device 1730 can store the system software for implementing some aspects of the subject technology for purposes of loading that software into memory 1720.

Portable storage device 1740 operates in conjunction with a portable non-volatile storage medium, such as a floppy disk, compact disk or Digital video disc, to input and output data and code to and from the computer system 1700 of FIG. 17. The system software for implementing aspects of the subject technology may be stored on such a portable medium and input to the computer system 1700 via the portable storage device 1740.

The memory 1720, mass storage device 1730, or portable storage device 1740 may in some cases store sensitive information, such as transaction information, health information, or cryptographic keys, and may in some cases encrypt or decrypt such information with the aid of the processor 1710. The memory 1720, mass storage device 1730, or portable storage device 1740 may in some cases store, at least in part, instructions, executable code, or other data for execution or processing by the processor 1710.

Output devices 1750 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 1770. The printer may be inkjet, laserjet, thermal, or some combination thereof. In some cases, the output device 1750 (and/or associated circuitry) may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 502.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Output devices 1750 may include any ports, plugs, antennae, wired or wireless transmitters, wired or wireless transceivers, or any other components necessary for or usable to implement the communication types listed above, such as cellular Subscriber Identity Module (SIM) cards.

Input devices 1760 may include circuitry providing a portion of a user interface. Input devices 1760 may include an alpha-numeric keypad, such as a keyboard, for inputting alpha-numeric and other information, or a pointing device, such as a mouse, a trackball, stylus, or cursor direction keys. Input devices 1760 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 502.11 Wi-Fi wireless signal transfer, wireless local area network (WLAN) signal transfer, Visible Light Communication (VLC), Worldwide Interoperability for Microwave Access (WiMAX), Infrared (IR)

communication wireless signal transfer, Public Switched Telephone Network (PSTN) signal transfer, Integrated Services Digital Network (ISDN) signal transfer, 3G/4G/5G/LTE cellular data network wireless signal transfer, personal area network (PAN) signal transfer, wide area network (WAN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Input devices 1760 may include any ports, plugs, antennae, wired or wireless receivers, wired or wireless transceivers, or any other components necessary for or usable to implement the communication types listed above, such as cellular SIM cards.

Input devices 1760 may include receivers or transceivers used for positioning of the computing system 1700 as well. These may include any of the wired or wireless signal receivers or transceivers. For example, a location of the computing system 1700 can be determined based on signal strength of signals as received at the computing system 1700 from three cellular network towers, a process known as cellular triangulation. Fewer than three cellular network towers can also be used-even one can be used-though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 1700 such as a router, modem, switch, hub, bridge, gateway, or repeater. These may also include Global Navigation Satellite System (GNSS) receivers or transceivers that are used to determine a location of the computing system 1700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 1760 may include receivers or transceivers corresponding to one or more of these GNSS systems.

Display system 1770 may include a liquid crystal display (LCD), a plasma display, an organic light-emitting diode (OLED) display, a low-temperature poly-silicon (LTPO) display, an electronic ink or "e-paper" display, a projector-based display, a holographic display, or another suitable display device. Display system 1770 receives textual and graphical information, and processes the information for output to the display device. The display system 1770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripheral device(s) 1780 may include any type of computer support device to add additional functionality to the computer system. For example, peripheral device(s) 1780 may include one or more additional output devices of any of the types discussed with respect to output device 1750, one or more additional input devices of any of the types discussed with respect to input device 1760, one or more additional display systems of any of the types discussed with respect to display system 1770, one or more memories or mass storage devices or portable storage devices of any of the types discussed with respect to memory 1720 or mass storage device 1730 or portable storage device 1740, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 1700 of FIG. 17 can include those typically found in computer systems that may be suitable for use with some aspects of the subject technology and represent a broad category of such computer components that are well known in the art. That said, the computer system 1700 of FIG. 17 can be customized and specialized for the purposes discussed herein and to carry out the various operations discussed herein, with specialized hardware components, specialized arrangements of hardware components, and/or specialized software. Thus, the computer system 1700 of FIG. 17 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 1700 may in some cases be a virtual computer system executed by another computer system. The computer can also include different bus configurations, networked platforms, multiprocessor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNUR, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 1700 may also use a Basic Input/Output System (BIOS) or Unified Extensible Firmware Interface (UEFI) as a layer upon which the operating system(s) are run.

In some cases, the computer system 1700 may be part of a multi-computer system that uses multiple computer systems 1700, each for one or more specific tasks or purposes. For example, the multi-computer system may include multiple computer systems 1700 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1700 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 1720, the mass storage device 1730, the portable storage device 1740, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L7), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 1710 for execution. A bus 1790 carries the data to system RAM or another memory 1720, from which a processor 1710 retrieves and executes the instructions. The instructions received by system RAM or another memory 1720 can optionally be stored on a fixed disk (mass storage device 1730/portable storage device 1740) either before or after execution by processor 1710. Various forms of storage may likewise be implemented as well as the necessary network interfaces and network topologies to implement the same.

While various flow diagrams and block diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 1700 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

Illustrative examples of the disclosure include:

Aspect 1. An apparatus for account analysis, the apparatus comprising: a communication interface coupled to a network; a memory that stores instructions; and a processor that executes the instructions, wherein execution of the instructions by the processor causes the processor to: analyze user account data according to a first set of rules to perform a preliminary validation that a user account is eligible for a program to be applied to the user account, wherein the user account data is associated with the user account, wherein the user account data does not include information from an external analysis system; in response to the preliminary validation that the user account is eligible for the program, retrieve secondary user account data from the external analysis system via the communication interface and over the network; analyze the user account data and the secondary user account data according to a second set of rules to perform a secondary validation that the user account is eligible for the program to be applied to the user account; and in response to the secondary validation that the user account is eligible for the program, apply the program to the user account.

Aspect 2. The apparatus of Aspect 1, wherein the analysis of the user account data and the secondary user account data according to the second set of rules includes processing of the user account data and the secondary user account data using a trained machine learning model.

Aspect 3. The apparatus of Aspect 2, wherein the execution of the instructions by the processor causes the processor to: extract feedback associated with the secondary validation; and updating the trained machine learning model based on the feedback to improve an accuracy of the trained machine learning model for further user validations.

Aspect 4. The apparatus of any one of Aspects 1 to 3, wherein the analysis of the user account data according to the first set of rules includes processing of the user account data using a trained machine learning model.

Aspect 5. The apparatus of Aspect 4, wherein the execution of the instructions by the processor causes the processor to: extract feedback associated with the preliminary validation; and updating the trained machine learning model based on the feedback to improve an accuracy of the trained machine learning model for further user validations.

Aspect 6. The apparatus of any one of Aspects 1 to 5, wherein the first set of rules include an age threshold, wherein the preliminary validation includes a comparison of an age of a user to the age threshold, and wherein the user is associated with the user account.

Aspect 7. The apparatus of any one of Aspects 1 to 6, wherein the first set of rules include a duplicate check, wherein the preliminary validation includes a comparison of a request for the program with one or more other requests, wherein the request for the program is associated with the user account.

Aspect 8. The apparatus of any one of Aspects 1 to 7, wherein the second set of rules include a credit score threshold, and wherein the secondary validation includes a comparison of a credit score associated with the user account to the credit score threshold.

Aspect 9. The apparatus of any one of Aspects 1 to 8, wherein the second set of rules include a threshold probability of fraud, and wherein the secondary validation includes a determination of a probability of fraud associated with the user account and a comparison of the probability of fraud to the threshold probability of fraud.

Aspect 10. The apparatus of any one of Aspects 1 to 9, wherein the first set of rules apply to a plurality of programs, and wherein the second set of rules are specific to the program, and wherein the plurality of programs includes the program.

Aspect 11. The apparatus of any one of Aspects 1 to 10, wherein the first set of rules are specific to the program, wherein the second set of rules apply to a plurality of programs, and wherein the plurality of programs includes the program.

Aspect 12. The apparatus of any one of Aspects 1 to 11, wherein the execution of the instructions by the processor causes the processor to: receive an update for the first set of rules; and update the first set of rules based on the update and before the preliminary validation.

Aspect 13. The apparatus of Aspect 12, wherein, before the update to the first set of rules, a previous analysis of the user account based on the first set of rules indicated ineligibility of the user for the program, and wherein the update to the first set of rules causes a change in eligibility of the user account for the program.

Aspect 14. The apparatus of any one of Aspects 1 to 13, wherein the execution of the instructions by the processor causes the processor to: receive an update for the second set of rules; and update the second set of rules based on the update and before the secondary validation.

Aspect 15. The apparatus of Aspect 14, wherein, before the update to the second set of rules, a previous analysis of the user account based on the second set of rules indicated ineligibility of the user for the program, and wherein the update to the second set of rules causes a change in eligibility of the user account for the program.

Aspect 16. The apparatus of any one of Aspects 1 to 15, wherein the execution of the instructions by the processor causes the processor to: initiate an asset transfer involving the user account, wherein the asset transfer is associated with the program.

Aspect 17. A method of account analysis, the method comprising: analyzing user account data according to a first set of rules to perform a preliminary validation that a user account is eligible for a program to be applied to the user account, wherein the user account data is associated with the user account, wherein the user account data does not include information from an external analysis system; in response to the preliminary validation that the user account is eligible for the program, retrieving secondary user account data from the external analysis system via a communication interface and over a network; analyzing the user account data and the secondary user account data according to a second set of rules to perform a secondary validation that the user account is eligible for the program to be applied to the user account; and in response to the secondary validation that the user account is eligible for the program, applying the program to the user account.

Aspect 18. The method of Aspect 17, wherein the analysis of the user account data and the secondary user account data according to the second set of rules includes processing of the user account data and the secondary user account data using a trained machine learning model.

Aspect 19. The method of Aspect 18, further comprising: extract feedback associated with the secondary validation; and updating the trained machine learning model based on the feedback to improve an accuracy of the trained machine learning model for further user validations.

Aspect 20. The method of any one of Aspects 17 to 19, wherein the analysis of the user account data according to the first set of rules includes processing of the user account data using a trained machine learning model.

Aspect 21. The method of Aspect 20, further comprising: extract feedback associated with the preliminary validation; and updating the trained machine learning model based on the feedback to improve an accuracy of the trained machine learning model for further user validations.

Aspect 22. The method of any one of Aspects 17 to 21, wherein the first set of rules include an age threshold, wherein the preliminary validation includes a comparison of an age of a user to the age threshold, and wherein the user is associated with the user account.

Aspect 23. The method of any one of Aspects 17 to 22, wherein the first set of rules include a duplicate check, wherein the preliminary validation includes a comparison of a request for the program with one or more other requests, wherein the request for the program is associated with the user account.

Aspect 24. The method of any one of Aspects 17 to 23, wherein the second set of rules include a credit score threshold, and wherein the secondary validation includes a comparison of a credit score associated with the user account to the credit score threshold.

Aspect 25. The method of any one of Aspects 17 to 24, wherein the second set of rules include a threshold probability of fraud, and wherein the secondary validation includes a determination of a probability of fraud associated with the user account and a comparison of the probability of fraud to the threshold probability of fraud.

Aspect 26. The method of any one of Aspects 17 to 25, wherein the first set of rules apply to a plurality of programs, and wherein the second set of rules are specific to the program, and wherein the plurality of programs includes the program.

Aspect 27. The method of any one of Aspects 17 to 26, wherein the first set of rules are specific to the program, wherein the second set of rules apply to a plurality of programs, and wherein the plurality of programs includes the program.

Aspect 28. The method of any one of Aspects 17 to 27, further comprising: receive an update for the first set of rules; and update the first set of rules based on the update and before the preliminary validation.

Aspect 29. The method of Aspect 28, wherein, before the update to the first set of rules, a previous analysis of the user account based on the first set of rules indicated ineligibility of the user for the program, and wherein the update to the first set of rules causes a change in eligibility of the user account for the program.

Aspect 30. The method of any one of Aspects 17 to 29, further comprising: receive an update for the second set of rules; and update the second set of rules based on the update and before the secondary validation.

Aspect 31. The method of Aspect 30, wherein, before the update to the second set of rules, a previous analysis of the user account based on the second set of rules indicated ineligibility of the user for the program, and wherein the update to the second set of rules causes a change in eligibility of the user account for the program.

Aspect 32. The method of any one of Aspects 17 to 31, further comprising: initiate an asset transfer involving the user account, wherein the asset transfer is associated with the program.

Aspect 33. A method for automated multi-program qualification analysis, the method comprising: receiving user information that is associated with one or more assets of a user, wherein the user information continues to be received over time; receiving update data for qualification criteria corresponding to a plurality of programs, wherein the qualification criteria include program-agnostic qualification criteria and program-specific qualification criteria, and wherein the qualification criteria change over time based on the update data; dynamically analyzing the user information and the qualification criteria in a first analysis, wherein the first analysis compares the user information to the program-agnostic qualification criteria to generate a preliminary decision of user eligibility for the plurality of programs; dynamically analyzing the user information and the qualification criteria in a second analysis, wherein the second analysis includes using a trained machine learning (ML) model to process the preliminary decision and the user information and the program-specific qualification criteria in real-time as the user information and the update data for the qualification criteria continue to be received, and wherein the trained ML model identifies a qualification decision indicating a subset of the plurality of programs that the user qualifies for; outputting recommendations for the subset of the plurality of programs; and dynamically updating the trained ML model in real-time based on feedback associated with the recommendations, as the user information continues to be received over time and as the qualification criteria continues to change over time, to improve accuracy of the trained ML model for one or more additional qualification decisions.

Aspect 34. The method of Aspect 33, wherein the subset of the plurality of programs includes at least a first program of a first type and a second program of a second type.

Aspect 35. The method of any one of Aspects 33 to 34, wherein at least a subset of the user information is received through a graphical user interface (GUI).

Aspect 36. The method of any one of Aspects 33 to 35, wherein a first portion of the user information is received through a graphical user interface (GUI), and wherein a second portion of the user information is retrieved from a database based on a query using the first portion of the user information.

Aspect 37. The method of any one of Aspects 33 to 36, wherein the recommendations for the subset of the plurality of programs include a first recommendation for a first program of the subset of the plurality of programs and a second recommendation for a second program of the subset of the plurality of programs.

Aspect 38. The method of any one of Aspects 33 to 37, further comprising: receiving a selection of a particular program from the subset of the plurality of programs in response to outputting the recommendations; and initiating an onboarding of the user for the particular program based on the selection and based on the user qualifying for the particular program.

Aspect 39. The method of any one of Aspects 33 to 38, further comprising: initiating an asset transfer involving an account of the user, wherein the asset transfer is associated with at least one of the subset of the plurality of programs.

Aspect 40. The method of any one of Aspects 33 to 39, wherein the first analysis processes the user information and the program-agnostic qualification criteria using a second trained ML model to generate the preliminary decision.

Aspect 41. The method of Aspect 40, further comprising: dynamically updating the second trained ML model in real-time based on feedback associated with the recommendations, as the user information continues to be received over time and as the qualification criteria continues to change over time, to improve accuracy of the second trained ML model for one or more additional qualification decisions.

Aspect 42. The method of any one of Aspects 33 to 41, further comprising: ranking the subset of the plurality of programs to determine an order in which to recommend the subset of the plurality of programs, wherein outputting the recommendations for the subset of the plurality of programs is done according to the order.

Aspect 43. The method of any one of Aspects 33 to 42, wherein the analyzing includes using a second trained machine learning (ML) model in real-time as the user information and the qualification criteria continue to be received, and wherein the second trained ML model ranks the subset of the plurality of programs to determine an order in which to recommend the subset of the plurality of programs, wherein outputting the recommendations for the subset of the plurality of programs is done according to the order.

Aspect 44. The method of Aspect 43, wherein the trained ML model is the second trained ML model.

Aspect 45. The method of any one of Aspects 33 to 44, further comprising: identifying a change in the user information; and identifying a change in the subset of the plurality of programs that the user qualifies for based on the change in the user information.

Aspect 46. The method of any one of Aspects 33 to 45, further comprising: identifying a change in the program qualification criteria data; and identifying a change in the subset of the plurality of programs that the user qualifies for based on the change in the program qualification criteria data.

Aspect 47. The method of any one of Aspects 33 to 46, wherein the subset of the plurality of programs includes at least one of a credit card or a loan.

Aspect 48. The method of any one of Aspects 33 to 47, wherein the qualification decision is associated with a first level of accuracy, and wherein the one or more additional qualification decisions are associated with a second level of accuracy that is higher than the first level of accuracy.

Aspect 49. A system for automated multi-program qualification analysis, the system comprising: at least one memory storing instructions; and at least one processor, wherein execution of the instructions by the at least one processor causes the at least one processor to: receive user information that is associated with one or more assets of a user, wherein the user information continues to be received over time; receive update data for qualification criteria corresponding to a plurality of programs, wherein the qualification criteria include program-agnostic qualification criteria and program-specific qualification criteria, and wherein the qualification criteria change over time based on the update data; dynamically analyze the user information and the qualification criteria in a first analysis, wherein the first analysis compares the user information to the program-agnostic qualification criteria to generate a preliminary decision of user eligibility for the plurality of programs; dynamically analyze the user information and the qualification criteria in a second analysis, wherein the second analysis includes using a trained machine learning (ML) model to process the preliminary decision and the user information and the program-specific qualification criteria in real-time as the user information and the update data for the qualification criteria continue to be received, and wherein the trained ML model identifies a qualification decision indicating a subset of the plurality of programs that the user qualifies for; output recommendations for the subset of the plurality of programs; and dynamically update the trained ML model in real-time based on feedback associated with the recommendations, as the user information continues to be received over time and as the qualification criteria continues to change over time, to improve accuracy of the trained ML model for one or more additional qualification decisions.

Aspect 50. The system of Aspect 49, wherein the subset of the plurality of programs includes at least a first program of a first type and a second program of a second type Aspect 51. The system of any one of Aspects 49 to 50, wherein at least a subset of the user information is received through a graphical user interface (GUI).

Aspect 52. The system of any one of Aspects 49 to 51, wherein a first portion of the user information is received through a graphical user interface (GUI), and wherein a second portion of the user information is retrieved from a database based on a query using the first portion of the user information.

Aspect 53. The system of any one of Aspects 49 to 52, wherein the recommendations for the subset of the plurality of programs include a first recommendation for a first program of the subset of the plurality of programs and a second recommendation for a second program of the subset of the plurality of programs.

Aspect 54. The system of any one of Aspects 49 to 53, wherein the execution of the instructions by the at least one processor causes the at least one processor to: receive a selection of a particular program from the subset of the plurality of programs in response to outputting the recommendations; and initiate an onboarding of the user for the particular program based on the selection and based on the user qualifying for the particular program.

Aspect 55. The system of any one of Aspects 49 to 54, wherein the execution of the instructions by the at least one processor causes the at least one processor to: initiate an asset transfer involving an account of the user, wherein the asset transfer is associated with at least one of the subset of the plurality of programs.

Aspect 56. The method of any one of Aspects 33 to 55, wherein the first analysis processes the user information and the program-agnostic qualification criteria using a second trained ML model to generate the preliminary decision.

Aspect 57. The method of Aspect 56, wherein the execution of the instructions by the at least one processor causes the at least one processor to: dynamically update the second trained ML model in real-time based on feedback associated with the recommendations, as the user information continues to be received over time and as the qualification criteria continues to change over time, to improve accuracy of the second trained ML model for one or more additional qualification decisions.

Aspect 58. The system of any one of Aspects 49 to 57, wherein the execution of the instructions by the at least one processor causes the at least one processor to: rank the subset of the plurality of programs to determine an order in which to recommend the subset of the plurality of programs, wherein outputting the recommendations for the subset of the plurality of programs is done according to the order.

Aspect 59. The system of any one of Aspects 49 to 58, wherein the analyzing includes using a second trained machine learning (ML) model in real-time as the user information and the qualification criteria continue to be received, and wherein the second trained ML model ranks the subset of the plurality of programs to determine an order in which to recommend the subset of the plurality of programs, wherein outputting the recommendations for the subset of the plurality of programs is done according to the order.

Aspect 60. The system of Aspect 59, wherein the trained ML model is the second trained ML model.

Aspect 61. The system of any one of Aspects 49 to 60, wherein the execution of the instructions by the at least one processor causes the at least one processor to: identify a change in the user information; and identify a change in the subset of the plurality of programs that the user qualifies for based on the change in the user information.

Aspect 62. The system of any one of Aspects 49 to 61, wherein the execution of the instructions by the at least one processor causes the at least one processor to: identify a change in the program qualification criteria data; and identify a change in the subset of the plurality of programs that the user qualifies for based on the change in the program qualification criteria data.

Aspect 63. The system of any one of Aspects 49 to 62, wherein the subset of the plurality of programs includes at least one of a credit card or a loan.

Aspect 64. The system of any one of Aspects 49 to 63, wherein the qualification decision is associated with a first level of accuracy, and wherein the one or more additional qualification decisions are associated with a second level of accuracy that is higher than the first level of accuracy.

Aspect 65. A non-transitory computer-readable medium having stored thereon instructions that, when executed by one or more processors, cause the one or more processors to perform operations according to any one of Aspects 1 to 64.

Aspect 66. An apparatus comprising one or more means for performing operations according to any one of Aspects 1 to 64.

What is claimed is:

1. A computer-implemented method for automated multi-program qualification analysis using an eligibility analysis system that analyzes user data in at least two stages according to rules, stage-specific product qualification criteria, and at least one machine learning model, the computer-implemented method comprising:

receiving a request to determine an eligibility of a user for a plurality of programs, wherein the request identifies a threshold amount of time from receipt of the request to make a decision regarding the eligibility that is responsive to the request;

receiving update data for qualification criteria corresponding to the plurality of programs, wherein the qualification criteria include program-agnostic qualification criteria that apply across the plurality of programs and that are used in a first stage analysis, wherein the qualification criteria also include program-specific qualification criteria that are distinct from the program-agnostic qualification criteria and that are specific to certain programs and that are used in a second stage analysis, and wherein the qualification criteria change over time based on the update data as the update data continues to be received;

dynamically analyzing user information and the program-agnostic qualification criteria in the first stage analysis to generate a preliminary decision that the user is eligible for the plurality of programs;

processing the user information and the program-specific qualification criteria through a trained machine learning model in the second stage analysis to generate a prediction associated with the user and the plurality of programs, wherein a comparison between the prediction and a threshold indicates that the user is ineligible for a first program and that the user is eligible for a second program, wherein the second stage analysis is performed in real-time as the user information and the update data continue to be received, wherein the trained machine learning model includes a plurality of nodes that are arranged in a plurality of layers, wherein the trained machine learning model includes a plurality of numeric weights stored in a plurality of memory elements, wherein the plurality of memory elements correspond to connections between the plurality of nodes, wherein the plurality of layers represent interconnected filters corresponding to the connections between the plurality of nodes, and wherein information associated with the interconnected filters is shared and retained among the plurality of layers;

generating the decision that the user is ineligible for the first program and eligible for the second program within the threshold amount of time and based on the second stage analysis;

preventing access to the first program through an account of the user based on the decision that the user is ineligible for the first program; and granting access to the second program through the account based on the decision that the user is eligible for the second program.

2. The computer-implemented method of claim 1, wherein the first program is of a first type, and wherein the second program is of a second type.

3. The computer-implemented method of claim 1, wherein at least a subset of the user information is received through a graphical user interface (GUI).

4. The computer-implemented method of claim 1, wherein a first portion of the user information is received through a graphical user interface (GUI), and wherein a second portion of the user information is retrieved from a database based on a query using the first portion of the user information.

5. The computer-implemented method of claim 1, further comprising:

outputting a recommendation for the second program based on the second stage analysis indicating that the user is eligible for the second program; and receiving an input associated with the recommendation.

6. The computer-implemented method of claim 1, further comprising:

processing the user information and additional qualification criteria in a third stage analysis for the second program, wherein the third stage analysis confirms that the user is eligible for the second program, and wherein granting access to the second program through the account is based on the third stage analysis for the second program.

7. The computer-implemented method of claim 1, further comprising: initiating an asset transfer involving the account of the user, wherein the asset transfer is associated with the second program.

8. The computer-implemented method of claim 1, wherein the first stage analysis processes the user information and the program-agnostic qualification criteria using a second trained machine learning model to generate the preliminary decision.

9. The computer-implemented method of claim 8, further comprising: dynamically updating the second trained machine learning model in real-time based on feedback associated with the decision, as the user information and the update data continue to be received over time.

10. The computer-implemented method of claim 1, further comprising:

ranking a subset of the plurality of programs that the user is eligible for to determine an order in which to recommend the subset of the plurality of programs to the user, wherein the subset includes the second program; and outputting recommendations for the subset of the plurality of programs according to the order.

11. The computer-implemented method of claim 1, wherein the first stage analysis analyzing includes using a second trained machine learning model in real-time as the user information and the update data continue to be received, and wherein the second trained machine learning model ranks the plurality of programs to determine an order associated with the preliminary decision that the user is eligible for the plurality of programs.

12. The computer-implemented method of claim 11, wherein the trained machine learning model is the second trained machine learning model.

13. The computer-implemented method of claim 1, further comprising:

identifying a change in the user information; and generating a change to the decision on the change in the user information.

14. The computer-implemented method of claim 1, further comprising:

identifying a change in the qualification criteria; and generating a change to the decision based on the change in the qualification criteria.

15. The computer-implemented method of claim 1, wherein the plurality of programs includes a credit card and an installment loan.

16. The computer-implemented method of claim 1, wherein the preliminary decision is associated with a first level of accuracy, and wherein the decision is associated with a second level of accuracy that is higher than the first level of accuracy.

17. A system for automated multi-program qualification analysis of user data in at least two stages according to rules, stage-specific product qualification criteria, and at least one machine learning model, the system comprising:

at least one memory storing instructions; and at least one processor, wherein execution of the instructions by the at least one processor causes the at least one processor to:

receive a request to determine an eligibility of a user for a plurality of programs, wherein the request identifies a threshold amount of time from receipt of the request to make a decision regarding the eligibility that is responsive to the request;

receive update data for qualification criteria corresponding to a plurality of programs, wherein the qualification criteria include program-agnostic qualification criteria that apply across the plurality of programs and that are used in a first stage analysis, wherein the qualification criteria also include program-specific qualification criteria that are distinct from the program-agnostic qualification criteria and that are specific to certain programs and that are used in a second stage analysis, and wherein the qualification criteria change over time based on the update data as the update data continues to be received;

dynamically analyze user information and the program-agnostic qualification criteria in the first stage analysis to generate a preliminary decision that the user is eligible for the plurality of programs;

process the user information and the program-specific qualification criteria through a trained machine learning model in the second stage analysis to generate a prediction associated with the user and the plurality of programs, wherein a comparison between the prediction and a threshold indicates that the user is ineligible for a first program and that the user is eligible for a second program, wherein the second stage analysis is performed in real-time as the user information and the update data continue to be received, wherein the trained machine learning model includes a plurality of nodes that are arranged in a plurality of layers, wherein the trained machine learning model includes a plurality of numeric weights stored in a plurality of memory elements, wherein the plurality of memory elements correspond to connections between the plurality of nodes, wherein the plurality of layers represent interconnected filters corresponding to the connections between the plurality of nodes, and wherein information associated with the interconnected filters is shared and retained among the plurality of layers;

generate the decision that the user is ineligible for the first program and eligible for the second program within the threshold amount of time and based on the second stage analysis;

prevent access to the first program through an account of the user based on the decision that the user is ineligible for the first program; and grant access to the second program through the account based on the decision that the user is eligible for the second program.

18. The system of claim 17, wherein the first program is of a first type, and wherein the second program is of a second type.

19. The system of claim 17, wherein a first portion of the user information is received through a graphical user interface (GUI), and wherein a second portion of the user information is retrieved from a database based on a query using the first portion of the user information.

20. The system of claim 17, wherein the execution of the instructions by the at least one processor causes the at least one processor to:

output a recommendation for the second program based on the second stage analysis indicating that the user is eligible for the second program; and receive an input associated with the recommendation.

21. The system of claim 17, wherein the execution of the instructions by the at least one processor causes the at least one processor to:

process the user information and additional qualification criteria in a third stage analysis for the second program, wherein the third stage analysis confirms that the user is eligible for the second program, and wherein granting access to the second program through the account is based on the third stage analysis for the second program.

22. The system of claim 17, wherein the execution of the instructions by the at least one processor causes the at least one processor to:

initiate an asset transfer involving the account of the user, wherein the asset transfer is associated with the second program.

23. The system of claim 17, wherein the first stage analysis processes the user information and the program-agnostic qualification criteria using a second trained machine learning model to generate the preliminary decision.

24. The system of claim 17, wherein the execution of the instructions by the at least one processor causes the at least one processor to:

rank a subset of the plurality of programs that the user is eligible for to determine an order in which to recommend the subset of the plurality of programs to the user, wherein the subset includes the second program; and output recommendations for the subset of the plurality of programs according to the order.

25. The system of claim 17, wherein the first stage analysis includes using a second trained machine learning model in real-time as the user information and the update data continue to be received, and wherein the second trained machine learning model ranks the plurality of programs to determine an order associated with the preliminary decision that the user is eligible for the plurality of programs.

26. The system of claim 17, wherein the execution of the instructions by the at least one processor causes the at least one processor to:

identify a change in the user information; and generate a change to the decision based on the change in the user information.

27. The system of claim 17, wherein the execution of the instructions by the at least one processor causes the at least one processor to:

identify a change in the qualification criteria; and generate a change to the decision based on the change in the qualification criteria.

28. The system of claim 17, wherein the plurality of programs includes a credit card and an installment loan.

29. The system of claim 17, wherein the preliminary decision is associated with a first level of accuracy, and wherein the decision is associated with a second level of accuracy that is higher than the first level of accuracy.

30. A non-transitory computer readable storage medium of an eligibility analysis system having embodied thereon a program, wherein the program is executable by a processor of the eligibility analysis system to perform a method of automated multi-program qualification analysis of user data in at least two stages according to rules, stage-specific product qualification criteria, and at least one machine learning model, the method comprising:

receiving a request to determine an eligibility of a user for a plurality of programs, wherein the request identifies a threshold amount of time from receipt of the request to make a decision regarding the eligibility that is responsive to the request;

receiving update data for qualification criteria corresponding to the plurality of programs, wherein the qualification criteria include program-agnostic qualification criteria that apply across the plurality of programs and that are used in a first stage analysis, wherein the qualification criteria also include program-specific qualification criteria that are distinct from the program-agnostic qualification criteria and that are specific to certain programs and that are used in a second stage analysis, and wherein the qualification criteria change over time based on the update data as the update data continues to be received;

dynamically analyzing user information and the program-agnostic qualification criteria in the first stage analysis to generate a preliminary decision that the user is eligible for the plurality of programs;

processing the user information and the program-specific qualification criteria through a trained machine learning model in the second stage analysis to generate a prediction associated with the user and the plurality of programs, wherein a comparison between the prediction and a threshold indicates that the user is ineligible for a first program and that the user is eligible for a second program, wherein the second stage analysis is performed in real-time as the user information and the update data continue to be received, wherein the trained machine learning model includes a plurality of nodes that are arranged in a plurality of layers, wherein the trained machine learning model includes a plurality of numeric weights stored in a plurality of memory elements, wherein the plurality of memory elements correspond to connections between the plurality of nodes, wherein the plurality of layers represent interconnected filters corresponding to the connections between the plurality of nodes, and wherein information associated with the interconnected filters is shared and retained among the plurality of layers;

generating the decision that the user is ineligible for the first program and eligible for the second program within the threshold amount of time and based on the second stage analysis;

preventing access to the first program through an account of the user based on the decision that the user is ineligible for the first program; and granting access to the second program through the account based on the decision that the user is eligible for the second program.

* * * * *